US008102418B2

(12) United States Patent
Kojima

(10) Patent No.: US 8,102,418 B2
(45) Date of Patent: Jan. 24, 2012

(54) MICROSCOPE OBSERVATION SYSTEM

(75) Inventor: Jitsunari Kojima, Tokyo (JP)

(73) Assignee: Olympus Corporation, Tokyo (JP)

( * ) Notice: Subject to any disclaimer, the term of this patent is extended or adjusted under 35 U.S.C. 154(b) by 671 days.

(21) Appl. No.: 12/275,419

(22) Filed: Nov. 21, 2008

(65) Prior Publication Data

US 2009/0296203 A1 Dec. 3, 2009

(30) Foreign Application Priority Data

Nov. 26, 2007 (JP) .................................. 2007-303890

(51) Int. Cl.
*G02B 21/00* (2006.01)

(52) U.S. Cl. ............ 348/80; 348/79; 359/368; 359/383; 359/385; 359/410

(58) Field of Classification Search .................... 348/79, 348/80; 359/368, 383, 385, 410, 363; 362/259; 382/274; 250/201.3
See application file for complete search history.

(56) References Cited

U.S. PATENT DOCUMENTS

| 6,724,419 | B1 | 4/2004 | Green et al. | |
|---|---|---|---|---|
| 2001/0045506 | A1* | 11/2001 | Masuyama | 250/201.3 |
| 2002/0041438 | A1* | 4/2002 | Takahama et al. | 359/363 |
| 2003/0016301 | A1 | 1/2003 | Aizaki et al. | |
| 2006/0098895 | A1* | 5/2006 | Westphal | 382/274 |
| 2007/0274075 | A1* | 11/2007 | Nagamune | 362/259 |
| 2010/0033811 | A1* | 2/2010 | Westphal et al. | 359/368 |

FOREIGN PATENT DOCUMENTS

| JP | 2001-292369 A | 10/2001 |
|---|---|---|
| JP | 2003-507766 A | 2/2003 |
| JP | 2004-128582 A | 4/2004 |
| JP | 2004-177307 A | 6/2004 |
| WO | WO 01/13640 A1 | 2/2001 |

* cited by examiner

*Primary Examiner* — Le Luu
(74) *Attorney, Agent, or Firm* — Holtz, Holtz, Goodman & Chick, P.C.

(57) ABSTRACT

This is a microscope observation system comprising a microscope, a camera unit, a light-amount adjustment unit for controlling adjustment parts included the microscope in order to suppress the amount of reflected light of a specimen image formed on the camera unit, a camera adjustment unit for controlling an adjustment part group of the camera unit in order to adjust image signals photo-electrically converted by the camera unit to a desired state, a light measurement unit for measuring the brightness of the specimen, a display unit for displaying a captured image, a control unit for controlling continuous display speed indicating the continuous display interval of an image continuously displayed on the display unit and at least one of an observation position shifting unit for changing the observation position or observation magnification of the specimen or an observation state detection unit for detecting the observation position or the observation magnification.

36 Claims, 61 Drawing Sheets

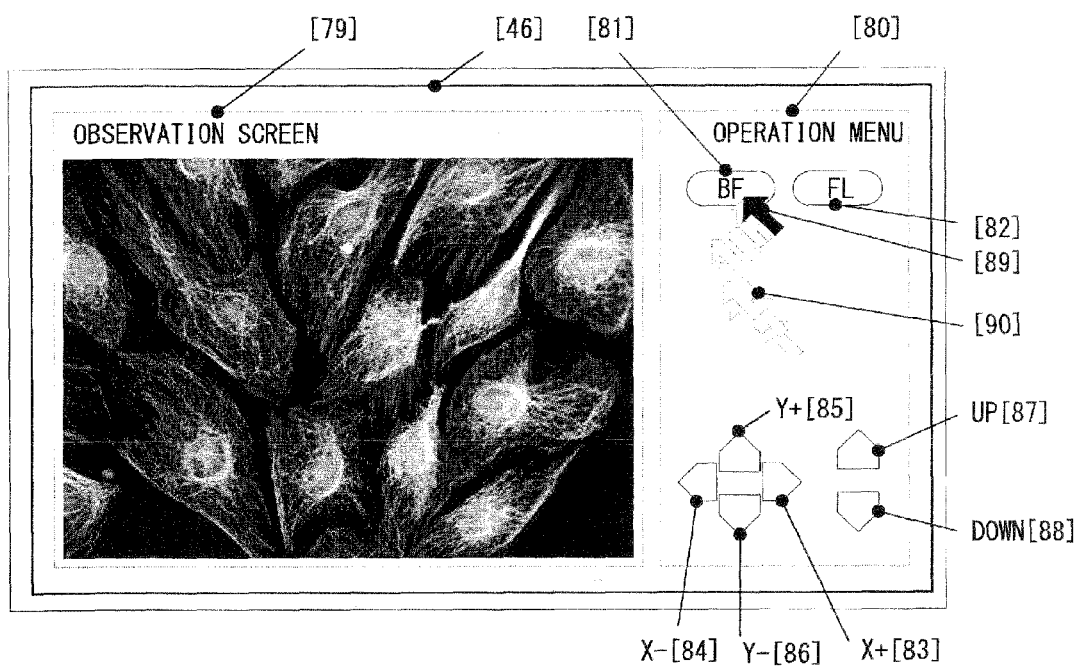
F I G. 1 1

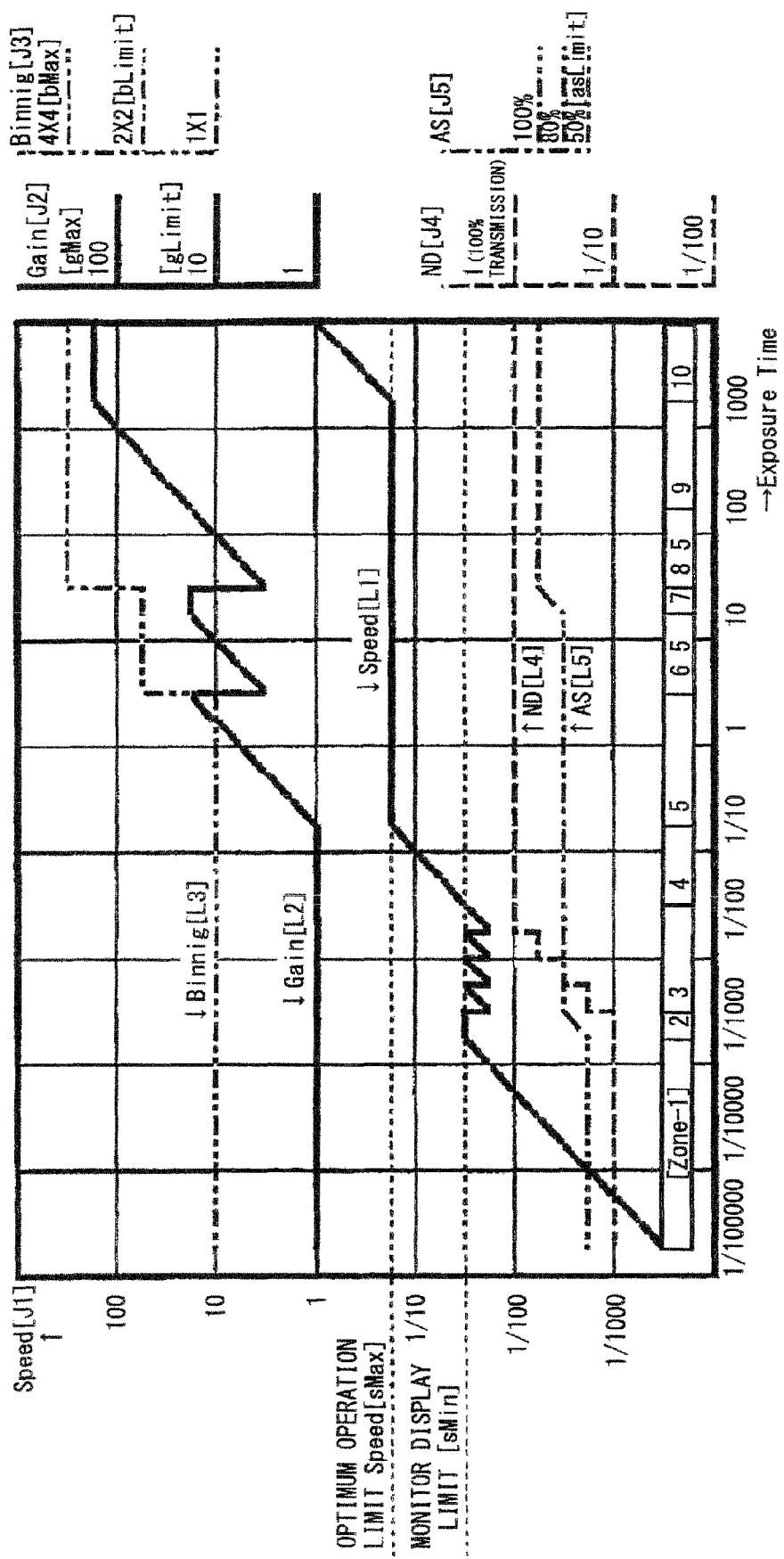
F I G. 19

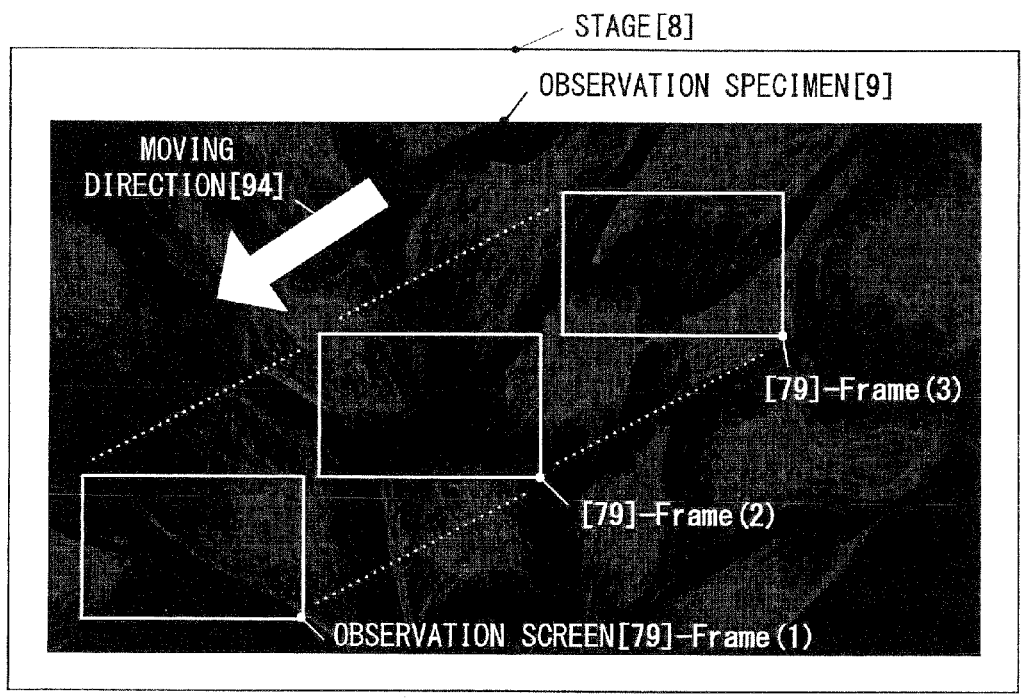
F I G. 35

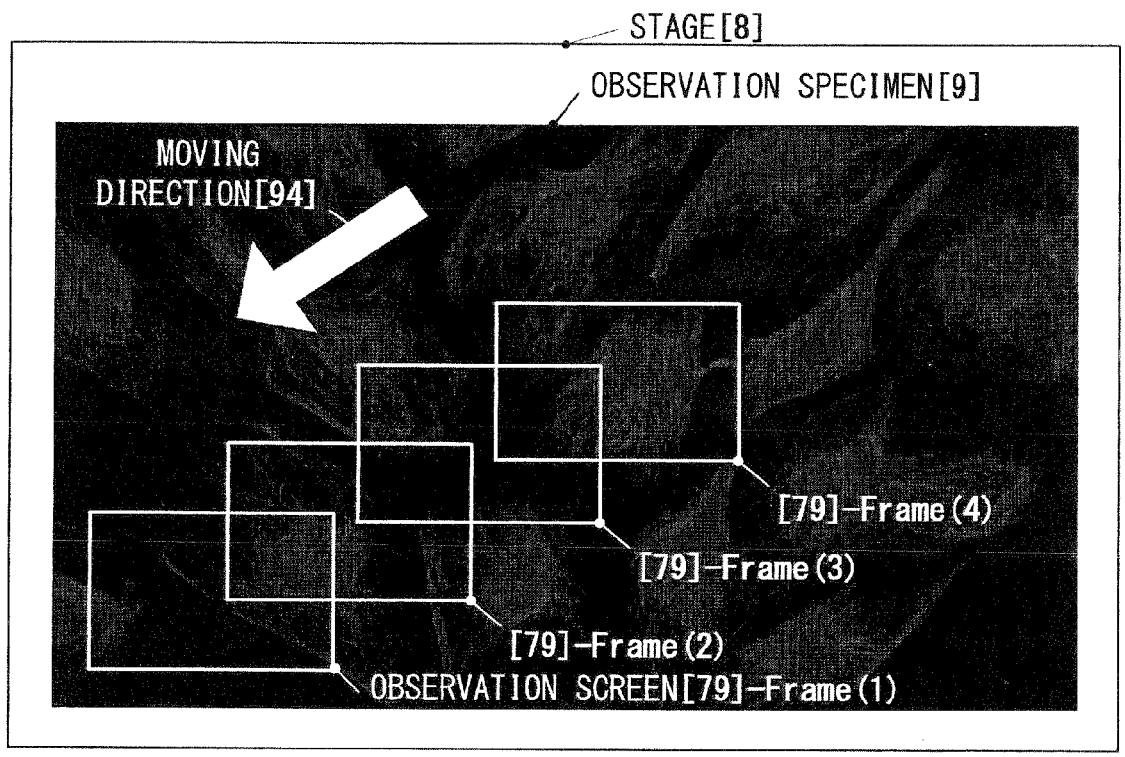
F I G. 36

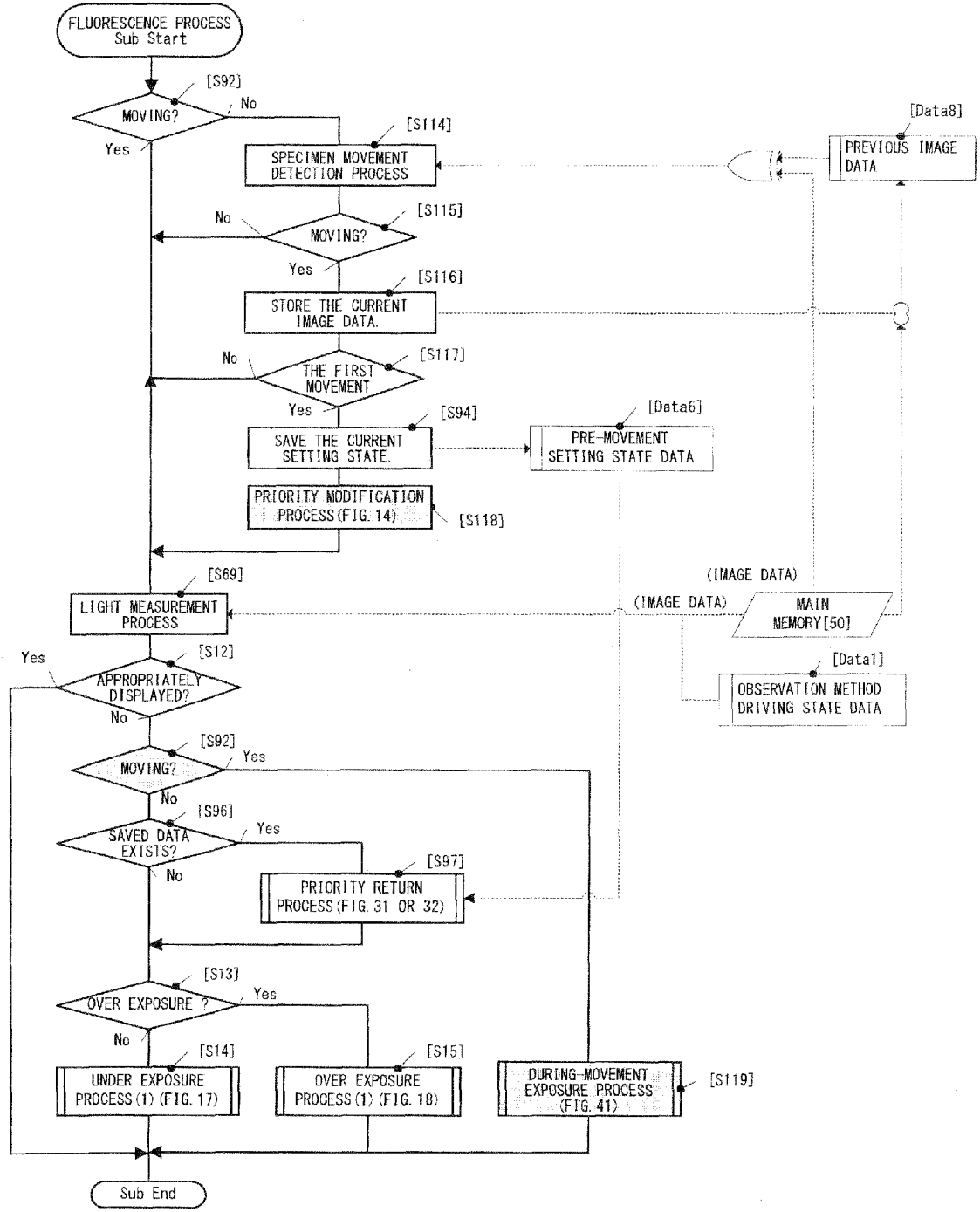
F I G. 4 0

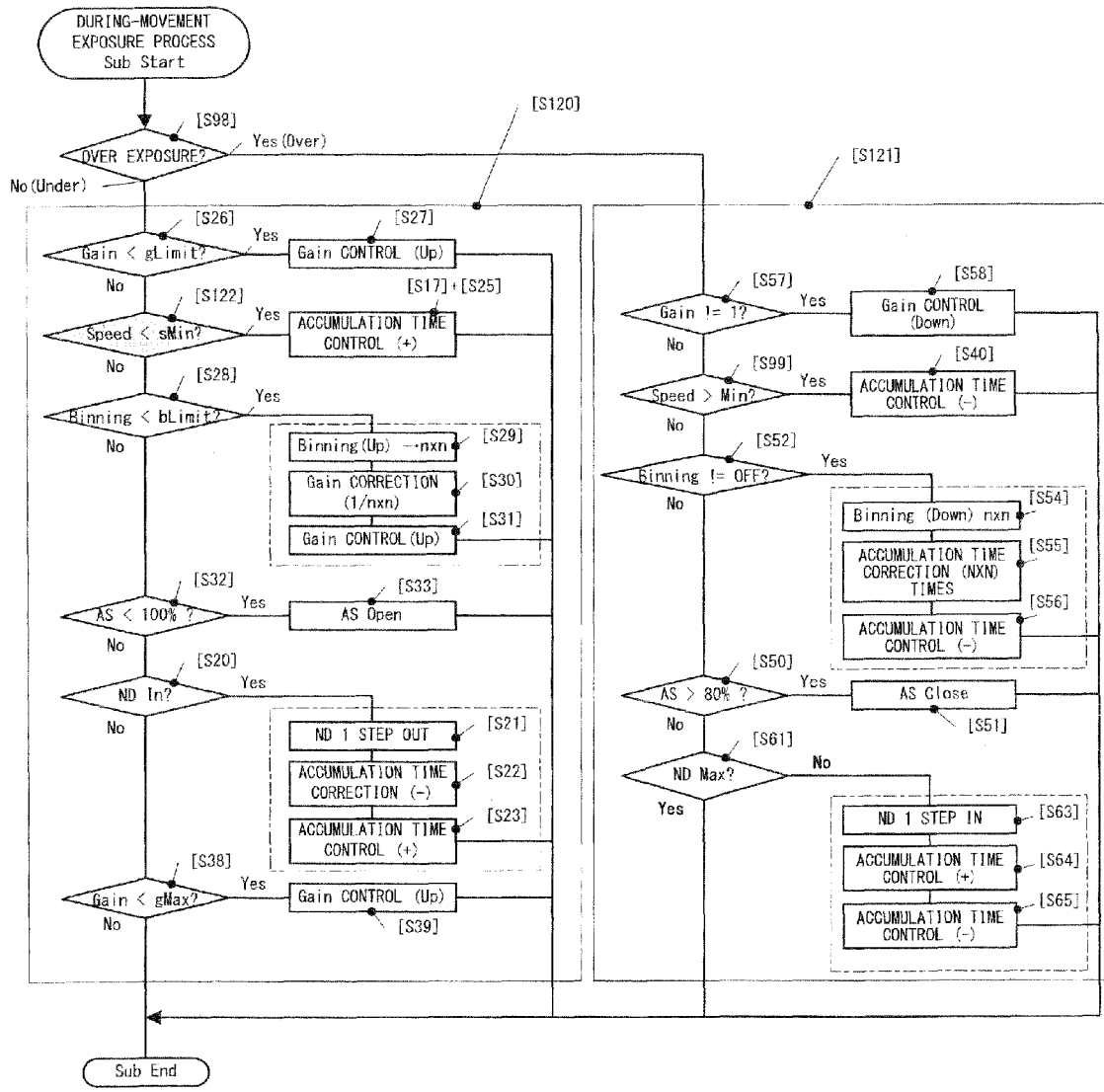
F I G. 4 1

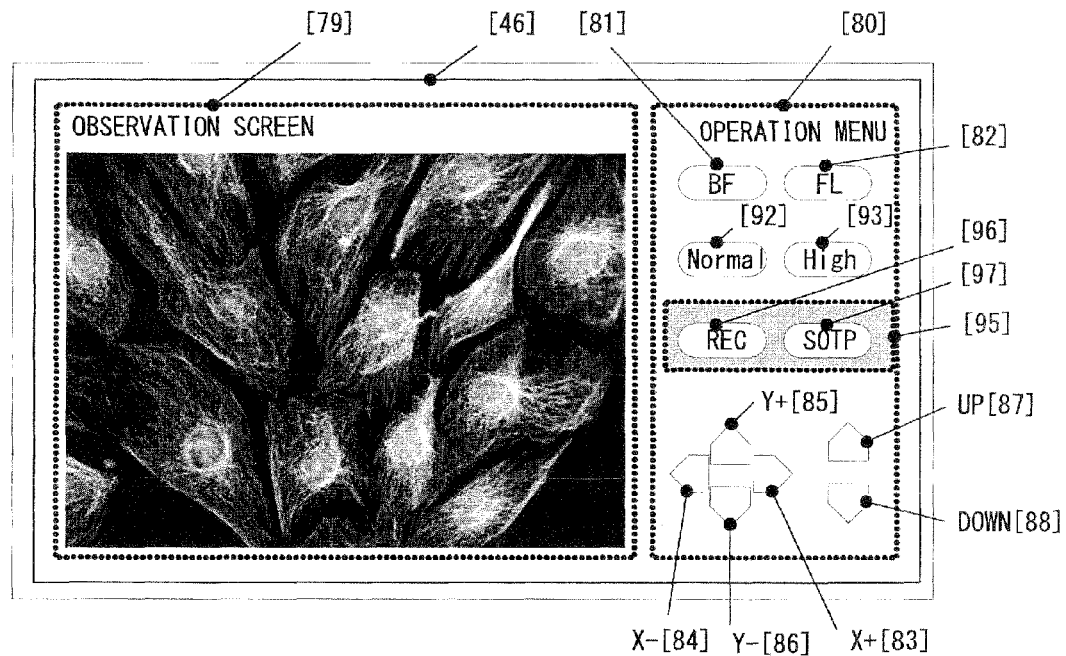
F I G. 4 2

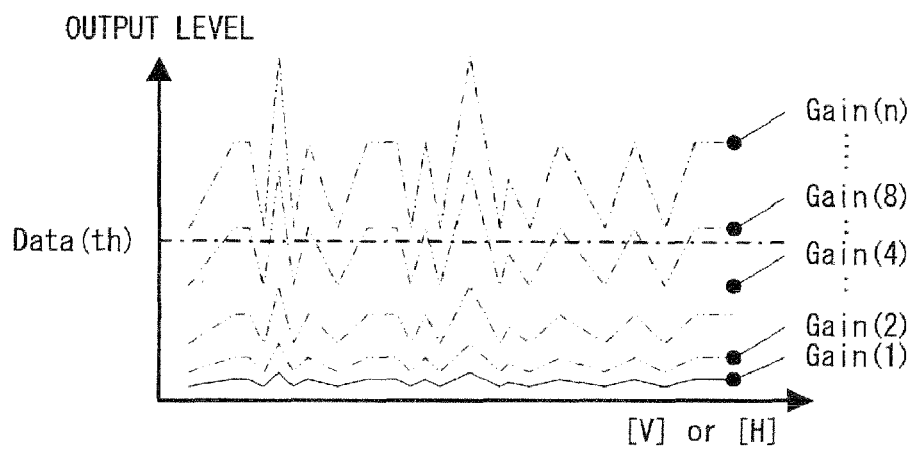
F I G. 46

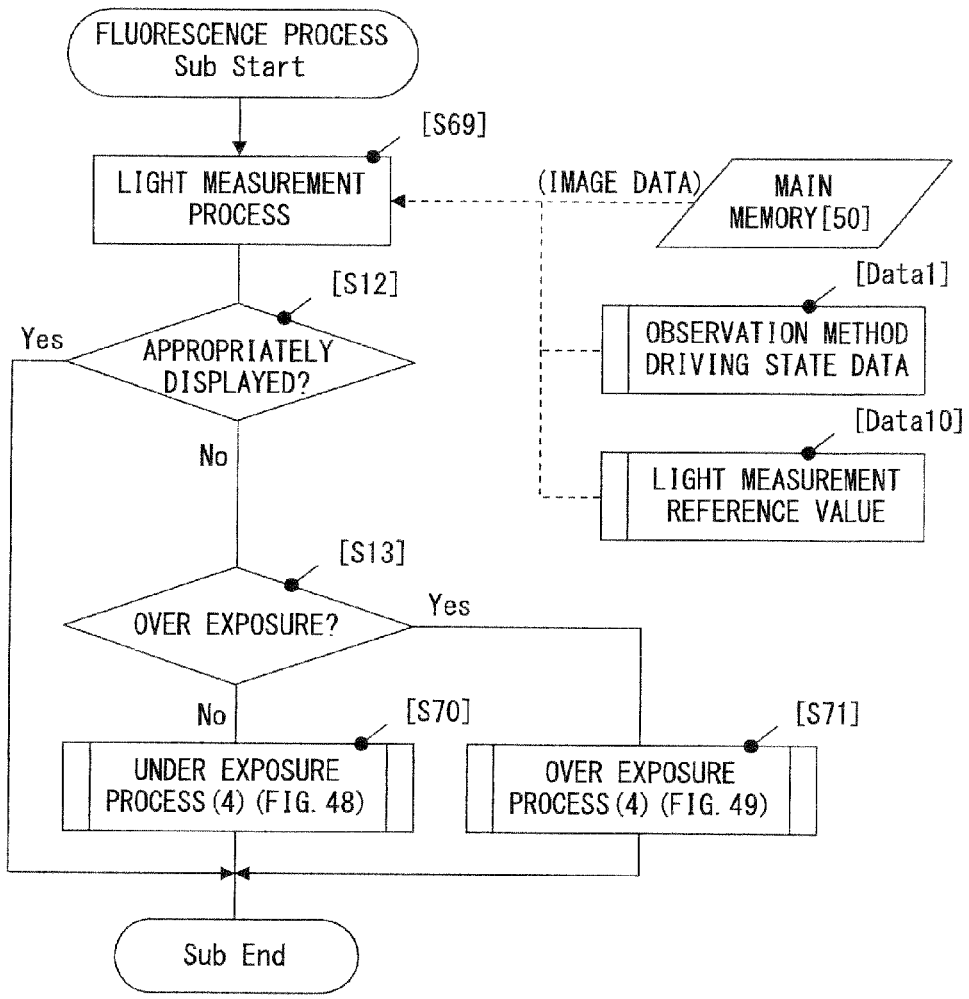
F I G. 50

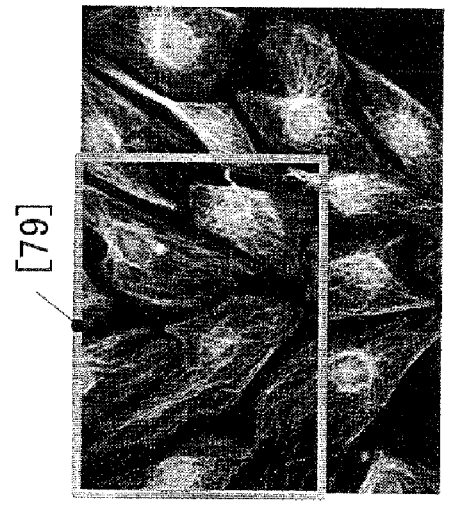
F I G. 52C
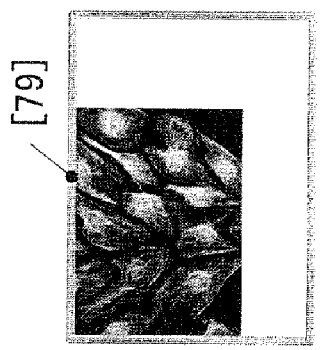
F I G. 52B
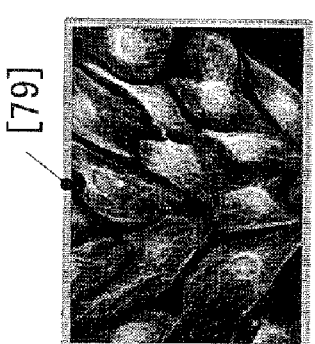
F I G. 52A

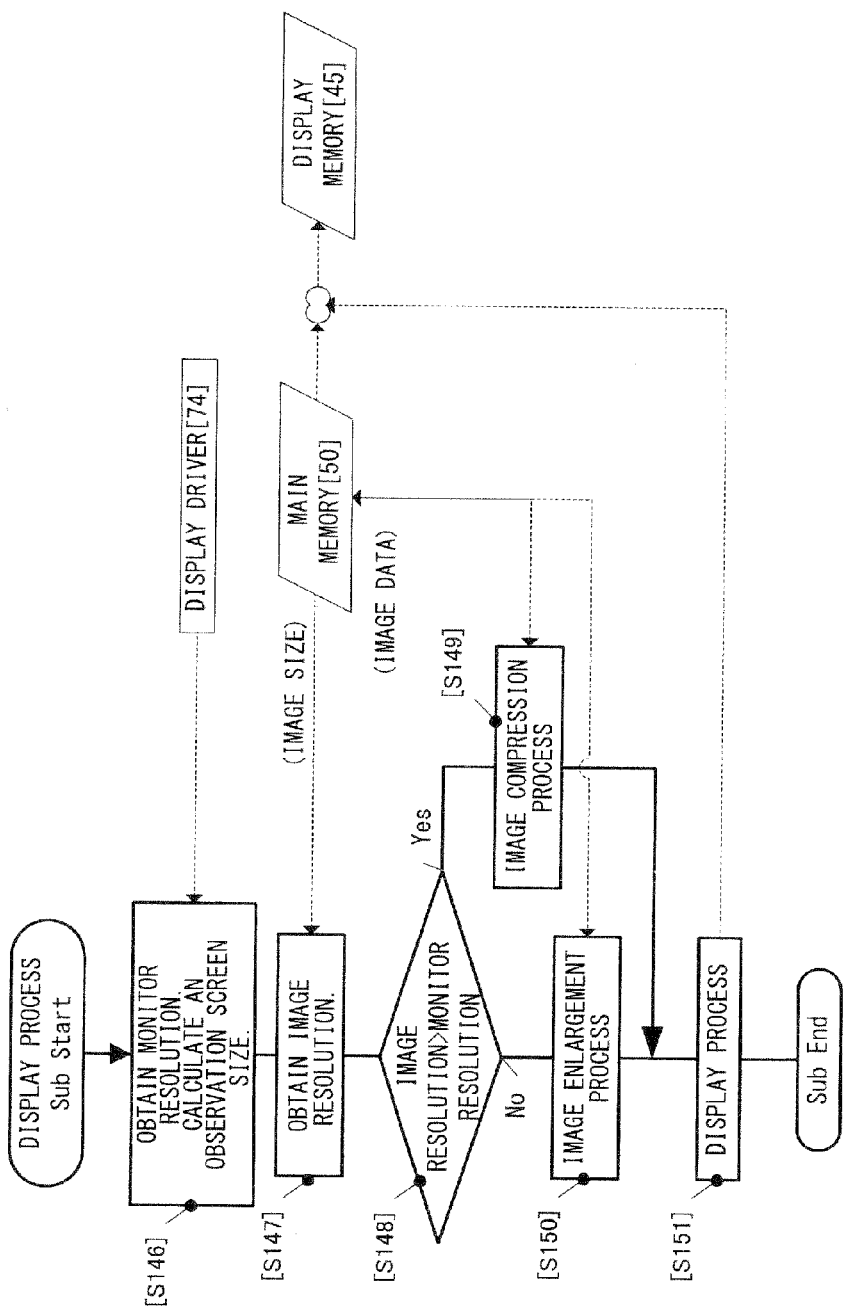
F I G. 54

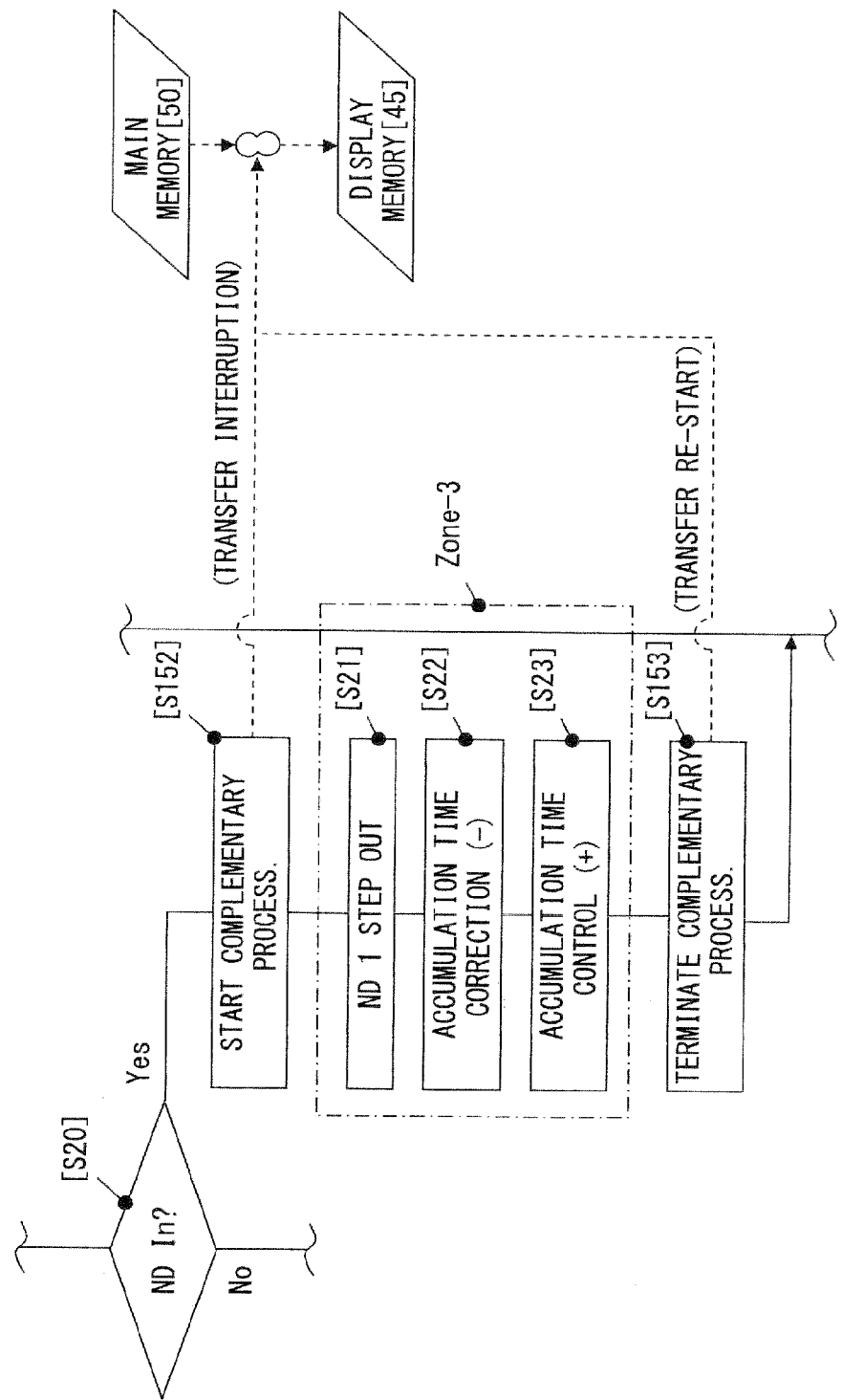
F I G. 56

MICROSCOPE OBSERVATION SYSTEM

CROSS-REFERENCE TO RELATED APPLICATIONS

This application is based on and claims the benefit of priority from the prior Japan Patent Application No. 2007-303890 filed in Japan on Nov. 26, 2007, the entire contents of which are incorporated by this reference.

BACKGROUND OF THE INVENTION

1. Field of the Invention

The present invention relates to the control of a microscope observation system.

2. Description of the Related Art

Currently, a microscope observation system is widely used in various fields beginning with the research of the biological field up to the inspection process of the industrial field and the like. In a microscope observation system used in such a field, an image obtained by magnifying and observing a fine specimen can be recorded on a personal computer (hereinafter called PC) as digital data, observed and analyzed. The change of a specimen can also be recorded as video images.

In the conventional microscope observation system, one configured by adding an imaging equipment for capturing images to a microscope as its component is common. In this case, when observing the enlarged image of a specimen, in the conventional microscope observation method, the morbid part of a body and the defective part of a specimen are discovered by peeping through an eyepiece lens. When desiring to record the portion, an imaging equipment is used at that moment.

For an image data recording device, an imaging equipment dedicated for image recording is used. Image data is recorded on non-volatile memory, is read into the PC via the non-volatile memory and is analyzed on a monitor connected to the PC. Alternatively, an image is obtained by an imaging equipment and is displayed on the video device directly connected to the PC. The object of the image data recording device is to record image data and the image data recording device is positioned similarly to the picture taking device in conventional microscope system.

However, recently, thanks to a plurality of ripple effects, such as the performance improvement of a PC, the digitization of an imaging equipment, the improvement of its resolution and the improvement of image quality level and the like, almost the same observation as eyepiece observation has become possible even on the monitor of a PC.

In such a technical background, the following various inventions for setting an imaging equipment in an optimum state by using the information of a microscope and improving its operability and performance are proposed.

According to the invention of Japan Patent Application Laid-open No. 2001-292369, a microscope observation system for automatically setting the display method of a monitor display unit on the basis of the operation condition of a microscope is proposed. In the invention of Japan Patent Application Laid-open No. 2001-292369, even when an observer is unfamiliar to the operation of an imaging equipment, the observation image of the microscope can be always picked up in its optimum state.

In Japan Patent Application Laid-open No. 2004-128582, a device whose operability of forming and framing (shooting composition) of a specimen is improved and by which high quality images can be obtained even when a specimen is dark is proposed.

Furthermore, in Japan Patent Application Laid-open No. 2004-177307, the reliability of the device is improved, for example, the amount of reflected light into a light receiving device can be suppressed by inserting an ND filter in an observation optical system as a measure for preventing an imaging equipment from breaking due to the mis-operation of an observer.

In Japan Patent Application Laid-open No. 2003-507766 (WO 01/013640), as a method for recording an observed image and the state change of a specimen at certain intervals, the setting of an imaging equipment is specified, detected and reflected in software for taking in images.

SUMMARY OF THE INVENTION

A microscope observation system according to the preferred embodiment of the present invention comprises a microscope having an optical system for enlarging/observing a specimen, an image capturing unit (refers to as an camera unit hereafter) for photo-electrically converting a specimen image obtained by the microscope to an image signal, a light amount adjustment unit for controlling an adjustment part group included in the microscope in order to suppress the amount of reflected light of the specimen image formed on the camera unit, an image capturing adjustment unit (refers to as a camera adjustment unit hereafter) for controlling the adjustment part group of the camera unit in order to adjust the image signal photo-electrically converted by the camera unit, a light measurement unit for measuring the brightness of the specimen image on the basis of the image signal, a display unit for displaying an image generated on the basis of the image signal, a control unit for controlling the continuous display speed for indicating a continuous display interval of images continuously displayed on the display unit by controlling the light amount adjustment unit and the camera adjustment unit and at least one of an observation position shifting unit for shifting the observation position or observation magnification of the specimen and an observation state detection unit for detecting the observation position or observation magnification.

The control unit controls the continuous display speed by controlling the light amount adjustment unit and the camera adjustment unit in such a way that the lower limit of the continuous display speed may become the minimum display speed capable of observing and operating the display unit.

The control unit controls the continuous display speed by controlling the light amount adjustment unit and the camera adjustment unit in such a way that the upper limit of the minimum interval of the continuous display speed may become the display interval by the maximum frame rate of the display unit.

The control unit controls the continuous display speed by controlling the light amount adjustment unit and the camera adjustment unit in such a way that the shortest time until the specimen image is photo-electrically converted by the camera unit and is converted to data displayable on the display unit may become the display interval of the maximum frame rate.

The control unit controls the continuous display speed by specifying the upper limit of the continuous display interval on the basis of a reading speed at which the image signal is read after the specimen image is photo-electrically converted by the camera unit and controlling the light amount adjustment unit and the camera adjustment unit.

The microscope observation system further comprises an external communication unit for transmitting the image signal to which a prescribed imaging process is applied after the specimen image is photo-electrically converted by the camera unit.

The control unit controls the continuous display speed by specifying the upper limit of the continuous display speed on the basis of the maximum data transmitting speed of the external communication unit and controlling the light amount adjustment unit and the camera adjustment unit.

The control unit controls the continuous display speed by specifying the minimum display speed at which an operator is capable of observing and operating the display unit as a low end and the maximum frame rate of the display unit as the upper limits of the continuous display speed and controlling the light amount adjustment unit and the camera adjustment unit in such a way that the continuous display speed may exist between the lower and upper limits.

The control unit controls the continuous display speed by specifying the minimum display speed at which an operator is capable of observing and operating the display unit as a low end and the maximum frame rate indicated as the upper limit of a speed until the specimen image is photo-electrically converted and is converted data displayable on the display unit as the upper limits of the continuous display speed and controlling the light amount adjustment unit and the camera adjustment unit in such a way that the continuous display speed may exist between the lower and upper limits.

When the observation position shifting unit is not operating or when the moving state of the observation state detection unit is not operating, the control unit identifies the movement change of the specimen itself. If it has identified that the specimen is moving, the control unit does not control the continuous display speed.

The microscope observation system also comprises at least two or more adjustment parts in total, one being controlled by the light amount adjustment unit and the other being controlled by the camera adjustment unit.

The control unit controls the continuous display speed by setting priority to the order of adjusting the adjustment parts and downing the control priority of either the adjustment part in which the resolution of a picked-up image is to be adjusted or the adjustment part affecting the noise level of a photo-electrically converted electric signal.

The microscope observation system also comprises two or more adjustment parts in total, one being controlled by the light amount adjustment unit and the other being controlled by the camera adjustment unit.

The control unit controls the continuous display speed by setting priority to the order of adjusting the adjustment parts and downing the control priority of the adjustment part in which the amount of light applied to the specimen tends to increase.

The microscope observation system also comprises at least two or more adjustment parts in total, one being controlled by the light amount adjustment unit and the other being controlled by the camera adjustment unit.

The control unit controls the continuous display speed by setting priority to the order of adjusting the adjustment parts and downing the control priority of the adjustment part caused by increasing the continuous display speed interval.

The microscope observation system further comprises an image recording unit for recording the continuously displayed images.

The control unit controls the continuous display speed by controlling the light amount adjustment unit and the camera adjustment unit in such a way that the lower limit of the continuous display speed may become a video rate recorded on the image recording unit.

The operator can observe using two or more methods capable of observing a specimen in the different states of an optical system in the microscope observation system.

The microscope observation system comprises two or more adjustment parts in total, one being controlled by the light amount adjustment unit and the other being controlled by the camera adjustment unit.

In the microscope observation system, the priority of adjusting the adjustment parts according to the observation method is set and further comprises an observation method switching unit.

The control unit controls the continuous display speed by the observation method switching unit.

The control unit also measures the signal noise level of the photo-electrically converted picked-up image signal, sets the reference value of a signal noise level endurable to observe an observation image which is deteriorated by the signal noise, determines whether the noise level measured by the measurement unit exceeds the reference value and controls the continuous display speed on the basis of the determination result.

If the type of the observation methods is bright field observation, the control unit does not control the continuous display speed.

If a transmitted illumination optical system is selected as an optical system in the microscope, the control unit does not control the continuous display speed.

If the type of the observation methods is fluorescence observation or dark field observation, the control unit controls the continuous display speed.

The microscope observation system further comprises an adjustment input unit capable of inputting information about the adjustment of the adjustment part controlled by the light amount adjustment unit or the camera adjustment unit.

The control unit controls the continuous display speed as to adjustment parts other than the adjustment part adjusted by the adjustment input unit.

If the minimum display interval time is not reached to the minimum display interval even when the continuous display speed is controlled by the light amount adjustment unit or the camera adjustment unit, the control unit accumulatively adds n pieces of frame image data which are displayed in n (n: arbitrary integer) frames before a predetermined image data to the predetermined image data continuously displayed on the display unit and displays the added image data as the current display image. Simultaneously, the control unit controls the continuous display speed.

If the observation position shifting unit is operating or if the observation state detection unit determines that the specimen is moving, the control unit temporarily modifies the priority of the order of adjusting the adjustment parts.

The control unit restricts the shifting speed of the observation position shifting unit when the actual minimum display interval time is not reached to the specified minimum display interval even when the continuous display speed is controlled by the light amount adjustment unit or the camera adjustment unit.

The control unit also maintains an image displayed on the display unit in a certain size even if the size of an image to be displayed on the display unit changes as a result of controlling by the camera adjustment unit.

If the applied adjustment is in such a way that the amount of light or an image discontinuously changes in the adjustment parts, the control unit also performs an adjustment complementary process of keeping an image immediately prior to the adjustment until the adjustment is completed.

The microscope observation system further comprises a storage unit for storing an image immediately prior to the adjustment.

The control unit stops continuous display on the display unit, controls the adjustment parts in which the amount of light discontinuously changes, displays image data stored in the storage unit on the display unit until the control of the adjustment parts in which the amount of light discontinuously changes is completed and re-starts the continuous display after the control of the adjustment parts in which the amount of light discontinuously changes is completed.

If the specimen is moved by the observation position movement unit, the control unit applies the adjustment complementary process.

Even when the specimen is moved by the observation position movement unit and the control of driving the adjustment parts in which the amount of light discontinuously changes becomes necessary, the control unit executes the adjustment complementary process of maintaining the brightness of a display image constant by temporarily applying correction in the adjustment parts in which the amount of light continuously changes. If the movement of the specimen stops, the control unit controls the continuous display speed.

BRIEF DESCRIPTION OF THE DRAWINGS

FIG. 11 shows one example of the display screen of the display unit [46] in the first preferred embodiment.

FIG. 19 is the exposure adjustment control program chart at the time of bright field observation in the first preferred embodiment.

FIG. 35 explains the display contents change of the observation screen [79] in the case where the stage [8] is moved in the fifth preferred embodiment (No. 2).

FIG. 36 explains the display contents change of the observation screen [79] in the case where the stage [8] is moved in the fifth preferred embodiment (No. 3).

FIG. 40 is the flowchart of the process in the seventh preferred embodiment (process at the time of fluorescence observation).

FIG. 41 is the flowchart of the process in the seventh preferred embodiment (exposure process during specimen movement).

FIG. 42 shows one example of the display screen of the display unit [46] in the eighth preferred embodiment.

FIG. 46 shows the concept of noise detection in the ninth preferred embodiment.

FIG. 50 is the flowchart of the process in the eleventh preferred embodiment (exposure control process at the time of fluorescence observation).

FIGS. 52A, 52B and 52C explain the display contents change due to the difference of image data sizes in the twelfth preferred embodiment.

FIG. 54 is the flowchart of the process in the twelfth preferred embodiment (image size changing process).

FIG. 56 is the flowchart of the process in the thirteenth preferred embodiment (complementary process control).

DESCRIPTION OF THE PREFERRED EMBODIMENTS

Figure 1:
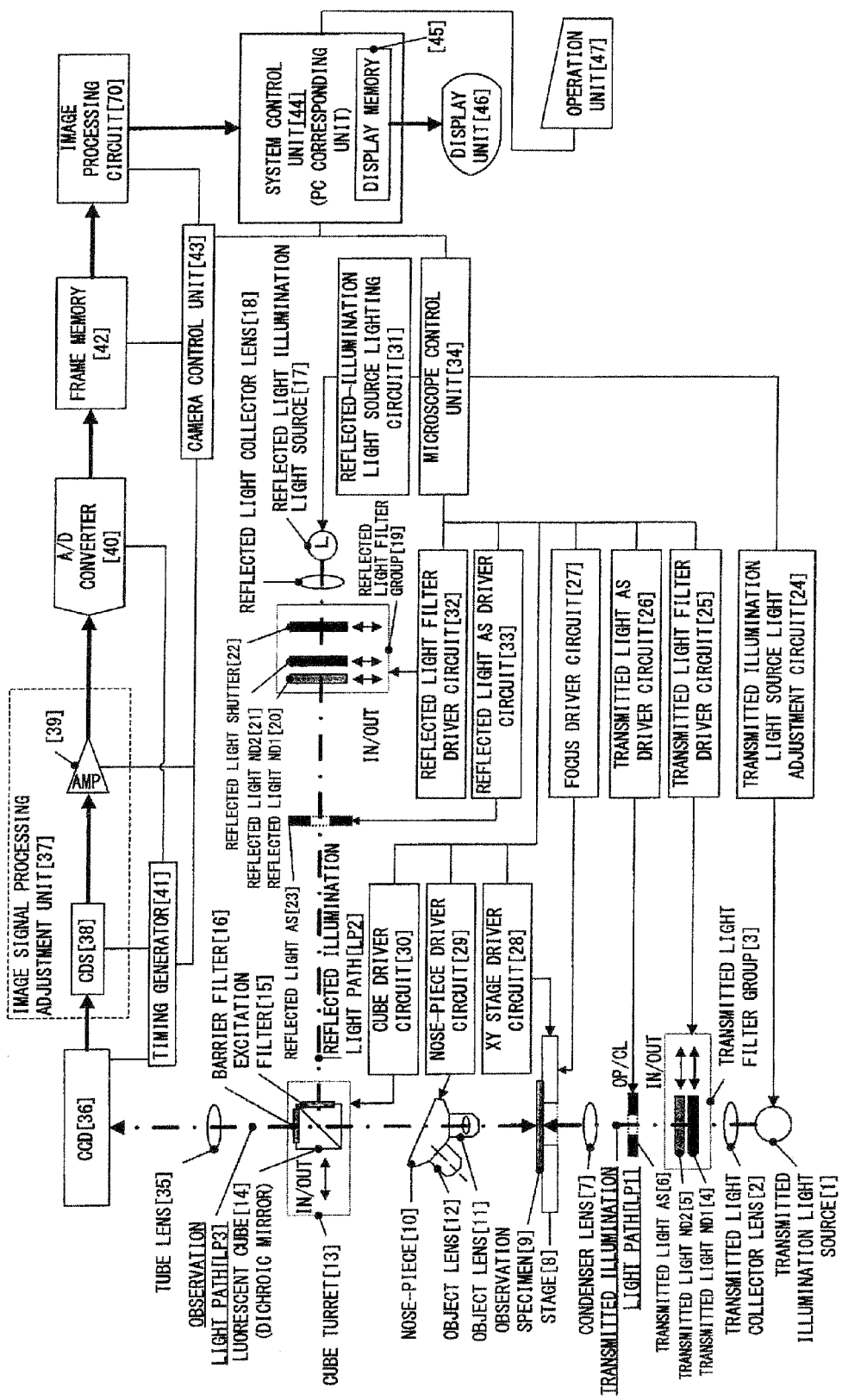
FIG. 1 shows the basic configuration of the present invention.

However, in the microscope observation system described in the prior art, a microscope and a camera unit are separately handled. In one example, the microscope observation system detects the state of a microscope and optimizes the state of an imaging equipment (Japan Patent Application Laid-open No. 2001-292369), and the converse example is that the microscope observation system suppresses the setting on the microscope side according to the operating state of an imaging (Japan Patent Application Laid-open No. 2004-177307) and the like. They are the inventions in which there is the master and slave relationship between a microscope and an imaging equipment, in a sense. These inventions are made from the viewpoint that a microscope independently exits only for observation and an imaging equipment exits only in order to capture and record images.

In Japan Patent Application Laid-open No. 2004-128582, the high-speed capturing of observation images (live images) in a microscope is realized and its operability and visibility at the time of observation on a monitor display are improved. The invention of this Patent Application Laid-open No. 2004-128582 is the invention of a camera itself and is not that of the post-processing of images inputted to the camera.

In Japan Patent Application laid-open No. 2004-177307, the optimization of taking image at the time of image recording including a microscope is realized. However, in Japan Patent Application Laid-open No. 2004-177307, captured images are taken in while avoiding the constraint of a microscope in software and the quality of record images finally stored is improved. Since the microscope and the camera are asynchronously controlled, the optimization of the entire system is not sufficient.

In the microscope observation system of the above-described inventions, only an observer familiar to either one or both of a microscope and/or an imaging equipment can sufficiently implement the invention contents and obtain its effect.

Therefore, the present invention provides a microscope observation system for giving priority to observation images inputted to an imaging equipment and optimally controlling the entire system (microscope+observation device).

A microscope observation system according to the present invention comprises a microscope, a camera unit, a light amount adjustment unit, an camera adjustment unit, light measurement unit, a display unit and a control unit and further comprises at least either one of the followings, that is an observation position shifting unit or an observation state detection unit.

The microscope photo-electrically converts a specimen image obtained by the microscope to image signal. The camera unit corresponds to, for example, the CCD [36] in this preferred embodiment.

Hereafter, something utilized in the transmitted light optical system in a microscope refers to as transmitted light something, and something utilized in the reflected light optical system in a microscope refers to as reflected light something.

The light amount adjustment unit controls adjustment part groups (transmitted light filter group [3], transmitted light AS [6], reflected light filter group [19], reflected light AS [23], etc.) included in the microscope in order to suppress the amount of reflected light of the specimen image formed on the camera unit. The light amount adjustment unit corresponds to, for example, the microscope control unit [34] for controlling the transmitted light filter driver circuit [25], the transmitted light AS driver circuit [26], the reflected light filter driver circuit [32], and the reflected light AS driver circuit [33], etc. in this preferred embodiment.

The camera adjustment unit controls adjustment part groups as to the camera unit (gain control, binning control, etc.) in order to adjust the image signal photo-electrically converted by the camera unit to a desired state. The camera adjustment unit corresponds to, for example, the camera control unit [43] in this preferred embodiment.

The light measurement unit measures the brightness of the specimen image on the basis of the image signal. The camera adjustment unit corresponds to, for example, the camera control unit [43] in this preferred embodiment.

The display unit displays a picked-up image generated on the basis of the image signal. The display unit corresponds to, for example, the display unit [46] in this preferred embodiment.

The control unit controls the light amount adjustment unit and the camera adjustment unit to control continuous display speed indicating the continuous display interval of images to be continuously displayed on the display unit. The control unit corresponds to, for example, the system control unit [44] in this preferred embodiment.

The observation position shifting unit shifts the observation position or observation magnification of the specimen. The observation position shifting unit corresponds to, for example, the stage [8], the XY stage driver circuit [28], the focus driver circuit [27] and the like in this preferred embodiment.

The observation state detection unit detects the observation position or the observation magnification. The observation state detection unit corresponds to, for example, the nosepiece position detection unit [66], the stage operation detection unit [67], the manual operation unit [68] in this preferred embodiment.

The microscope observation system can further comprise an external communication unit. The external communication unit transmits the image signal to which a predetermined imaging process has been performed after being photo-electrically converted by the camera unit to the control unit. The external communication unit corresponds to, for example, the general use I/F conversion unit [681] in this preferred embodiment. In this case, the control unit can control the continuous display speed by specifying the upper limit of the continuous display speed on the basis of the maximum data transmission speed of the external communication unit and controlling the light amount adjustment unit and the camera adjustment unit.

The microscope observation system can also further comprise an image recording unit for recording the images displayed continuously. The image recording unit corresponds to, for example, the HDD [49] in this preferred embodiment. In this case, the control unit controls the continuous display speed by controlling the light amount adjustment unit and the camera adjustment unit in such a way that the lower limit of the continuous display speed may become a video rate recorded on the image recording unit.

The microscope observation system can also further comprise an observation method switching unit in which the priority of adjusting the adjustment parts is set according to the observation method, for switching the observation method. The observation method switching unit corresponds to, for example, the BF button [81], the FL button [82], the Normal button [92], the High button [93], the record button [95] and the like in this preferred embodiment.

The microscope observation system can also further comprise an adjustment input unit capable of inputting information about the adjustment of the adjustment parts to be controlled by the light amount adjustment unit or the camera adjustment unit. The adjustment input unit corresponds to, for example, the control unit [47] in this preferred embodiment. In this case, the control unit controls the continuous display speed of adjustment parts other than the adjustment parts adjusted by the adjustment input unit.

The microscope observation system can also further comprise a storage unit for storing an image immediately prior to the adjustment. The storage unit corresponds to, for example, the display memory [45] in this preferred embodiment. In this case, the control unit stops the continuous display displayed on the display unit, controls the adjustment parts in which the amount of light discontinuously changes to display the image data stored in the storage unit until the control of the adjustment parts in which the amount of light discontinuously changes is completed and re-starts the continuous display after the control of the adjustment parts in which the amount of light discontinuously changes is completed.

The preferred embodiments of the present invention are described below with reference to the drawings.

The First Preferred Embodiment

In this preferred embodiment, in each of bright field observation and fluorescence observation, it is determined whether the brightness of an observation image is appropriate. If exposure is not sufficient, an ND filter and an aperture size (AS) on the microscope side and the charge accumulation time, gain and binning of a CCD on the camera unit side are controlled. Thus the optimum observation state can be obtained.

FIG. 1 shows the configuration of the entire microscope observation system according to the preferred embodiment of the present invention. The optical system in the microscope observation system of this preferred embodiment is structured in such a way that light from a transmitted illumination light source [1] consisting of, for example, a halogen lamp is collected by a transmitted light collector lens [2] and is inputted to a transmitted light filter group [3].

The transmitted light filter group [3] consists of a plurality of ND filters (transmitted light ND1 [4]/ND2 [5]), for adjusting its brightness without changing the color temperature of the transmitted illumination light source [1]. In the transmitted light filter group [3], an arbitrary filter can be selectively inserted in/removed from the light path of a transmitted illumination light path [LP1].

The transmitted illumination light path [LP1] is structured in such a way that the illumination light that has transmitted through the transmitted filter group [3] may illuminate an observation specimen [9] on a stage [8] from below the space of the stage [8] via a transmitted field iris, which is not shown in FIG. 1, a transmitted AS [6] being an aperture stop and a condenser lens [7].

The stage [8] can move the observation specimen [9] two-dimensionally on a plane orthogonal to the optical axis (scanning of the observation specimen). Furthermore, the stage [8] can be moved in the direction of the optical axis in order to focus the observation specimen [9].

A plurality of object lenses [11] and [12] is held by a nose-piece [10] above the stage [8]. An object lens to be inserted in the optical axis of an observation light path [LP3] can be exchanged by the rotation of the nose-piece [10]. The nose-piece [10] is fixed to, for example, the arm's top end of the microscope main body in such a way as to freely rotate. A cube turret [13] is installed above the nose-piece [10]

The cube turret [13] is provided with a fluorescence cube [14] that can be selectively inserted in/removed from according to various observation methods. The fluorescence cube [14] is provided together with an excitation filter [15] and an barrier filter [16].

On the other hand, a reflected illumination light path [LP2] inputs light from a reflected illumination light source [17] consisting of a mercury lamp or the like to the fluorescence cube [14] inserted in the light path of the cube turret [13] via a reflected light filter group [19], a reflected light AS [23] being an aperture stop and a reflected light field iris, which is not shown in FIG. 1. Then, the reflected light is reflected in the direction of the observation specimen [9]. Thus, the observation specimen [9] can be illuminated.

The reflected light filter group [19] comprises a plurality of ND filters (reflected light ND1 [20]/reflected light ND2 [21]) and a reflected light shutter [22]. The ND filters (reflected light ND1 [20]/reflected light ND2 [21]) adjusts the brightness of light without changing the color temperature of the reflected illumination light source [17]. The reflected light shutter [22] is inserted in the reflected illumination light path [LP2] and shields the reflected illumination light source [17].

So far the optical configuration of the illumination system of the microscope observation system of the present invention has been described. Next, the configuration of the camera system (observation system) is described below.

The observation specimen [9] is magnified by an object lens [11] or [12] fixed to the nose-piece [10] and inputted to a camera lens [35] via the cube turret [13]. The inputted magnified image is formed by the camera lens [35] in such a way as to focus on the CCD [36].

Then, the configuration of the electric control system of this microscope observation system is described. The electric control system comprises a transmitted illumination light source light adjustment circuit [24], a transmitted light filter driver circuit [25], a transmitted light AS driver circuit [26], a focus driver circuit [27], an XY stage driver circuit [28], a nose-piece driver circuit [29], a cube driver circuit [30], a reflected light illumination light source lighting circuit [31], a reflected light filter driver circuit [32], a reflected light AS driver circuit [33] and a microscope control unit [34].

The transmitted illumination light source light adjustment circuit [24] lights the transmitted illumination light source [1] and adjusts its illumination intensity. The transmitted light filter driver circuit [25] puts the transmitted light ND1 [4] and ND2 [5] in the transmitted light filter group [3] IN/OUT of the transmitted illumination light path [LP1] using a well-known insertion/removal mechanism.

The transmitted light AS driver circuit [26] controls the opening/closing of the iris of the transmitted AS [6]. The focus driver circuit [27] drives the stage [8] in the vertical direction of the observation light path [LP3] and brings the observation specimen [9] into focus. The XY stage driver circuit [28] drives the stage [8] to move the observation specimen [9] in the perpendicular direction of the transmitted illumination light path [LP1].

The nose-piece driver circuit [29] rotates the nose-piece [10] to insert the object lens [11] or [12] in the observation light path [LP3]. The cube driver circuit [30] inserts/removes the cube [14] in the cube turret [13] in/from the observation light path [LP3].

The reflected illumination light source lighting circuit [31] controls the lighting of the reflected illumination light source [17]. The reflected light filter driver circuit (32) puts the reflected light ND1 [20] and ND2 [21] in the reflected light filter group [19] and the reflected light shutter [22] IN/OUT of the reflected illumination light path [LP2]. The reflected light AS driver circuit [33] controls the opening/closing of the iris of the reflected light AS [23]).

The microscope control unit [34] gives necessary instructions to the transmitted illumination light source light adjustment circuit [24], the transmitted light filter driver circuit [25], the transmitted light AS driver circuit [26], the focus driver circuit [27], the XY stage driver circuit [28], the nose-piece driver circuit [29], the cube driver circuit [30], the reflected illumination light source lighting circuit [31], the reflected light filter driver circuit [32] and the reflected light AS driver circuit [33]. The microscope control unit [34] also sets and changes the optical state of the transmitted illumination light path [LP1], the reflected illumination light path [LP2] and the observation light path [LP3].

On the other hand, the observation image formed on the CCD [36] is photo-electrically converted by the CCD [36]. Then, the photo-electrically converted signal is inputted to an A/D converter [40] via an image signal processing adjustment unit [37] consisting of a CDS [38] and an AMP [39]. The CCD [36], the CDS [38] and the A/D converter [40] are driven by a timing generator [41] in a desired state.

The digital signal (image data) from the A/D converter [40] is inputted to an image processing circuit [70] via a frame memory [42]. After being adjusted in a desired adjustment state by the image processing circuit [70], the digital signal is transmitted to the system control unit [44].

The camera control unit [43] for conducting the control of the imaging system instructs a timing generator [41] to control timings, changes the amplification factor of the AMP [39] and controls the frame memory [42] and the image processing circuit [70].

The system control unit [44] is equivalent to, for example, a personal computer and controls the system in a desired state by giving instructions to the microscope control unit [34] and the camera control unit [43]. Then, the system control unit [44] enables the display unit [46] to display camera data from the image processing circuit [70] via display memory [45].

The system control unit [44] also gives necessary instructions to the microscope observation system according to instructions from an operation unit [47].

Figure 2:
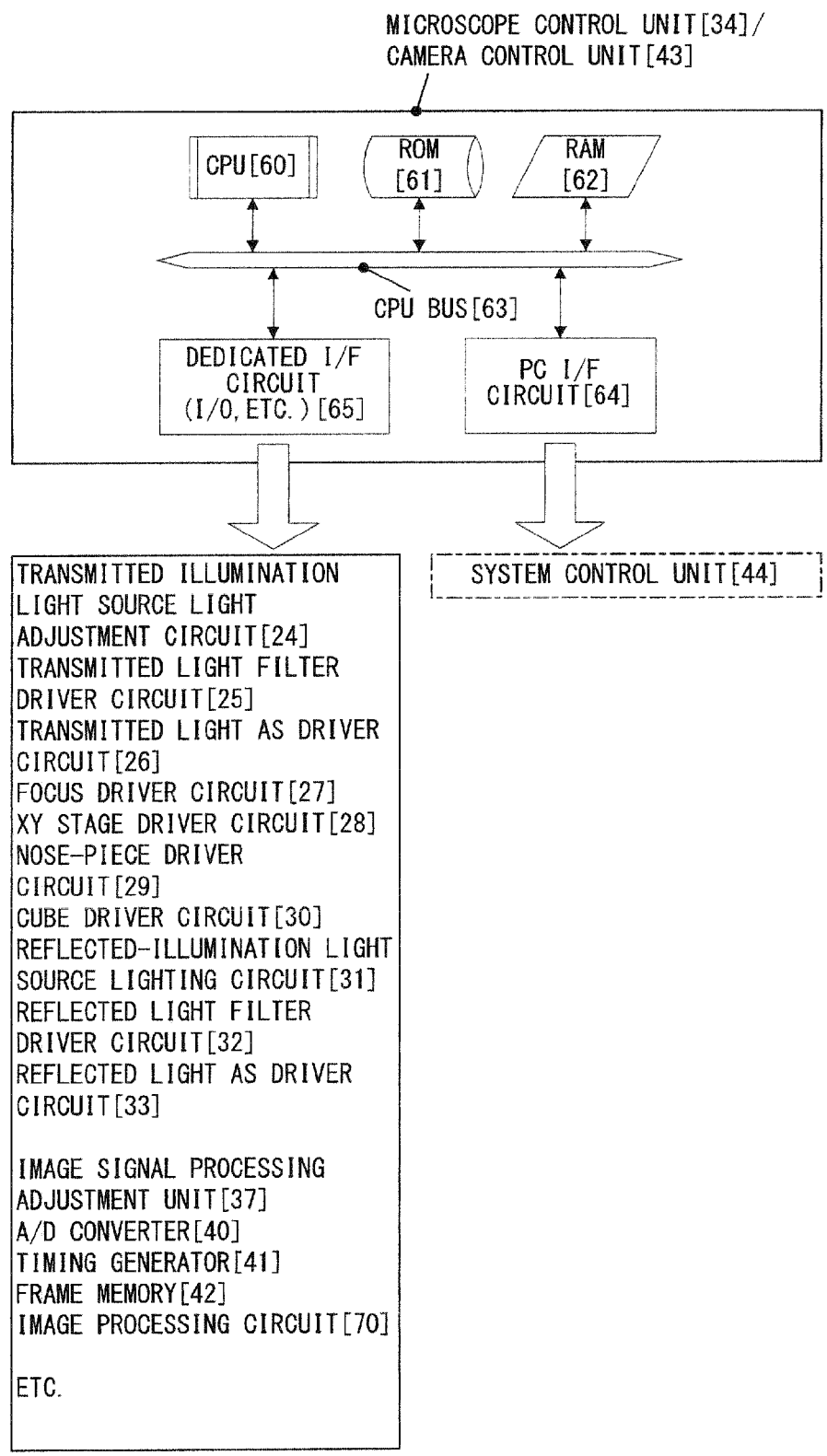
FIG. 2 shows the internal configuration of each of the microscope control unit [34] and the image capturing control unit (refers to as the camera control unit hereafter) [43].

Each of the microscope control unit [34] and the camera control unit [43] has the circuit configuration shown in FIG. 2.

FIG. 2 shows the internal configuration of each of the microscope control unit [34] and the camera control unit [43]. One example of the well-known CPU circuit configuration is shown as the basic configuration of both the microscope control unit [34] and the camera control unit [43] shown in FIG. 2. A CPU [60], ROM [61] and RAM [62] are connected to each other by a CPU bus [63]. The ROM [61] stores a program. The RAM [62] stores data used when the program are executed. By providing nonvolatile memory or the like, which are not shown in FIG. 2, the data can be stored even after the power supply is shut down.

A dedicated I/F circuit [65] is connected to the CPU bus [63]. The CPU bus [63] is connected to necessary driver circuits via this dedicated I/F circuit [65]. A PC I/F circuit [64] is also connected to the CPU bus [63] in order to connect it to the system control unit [44].

Figure 3:
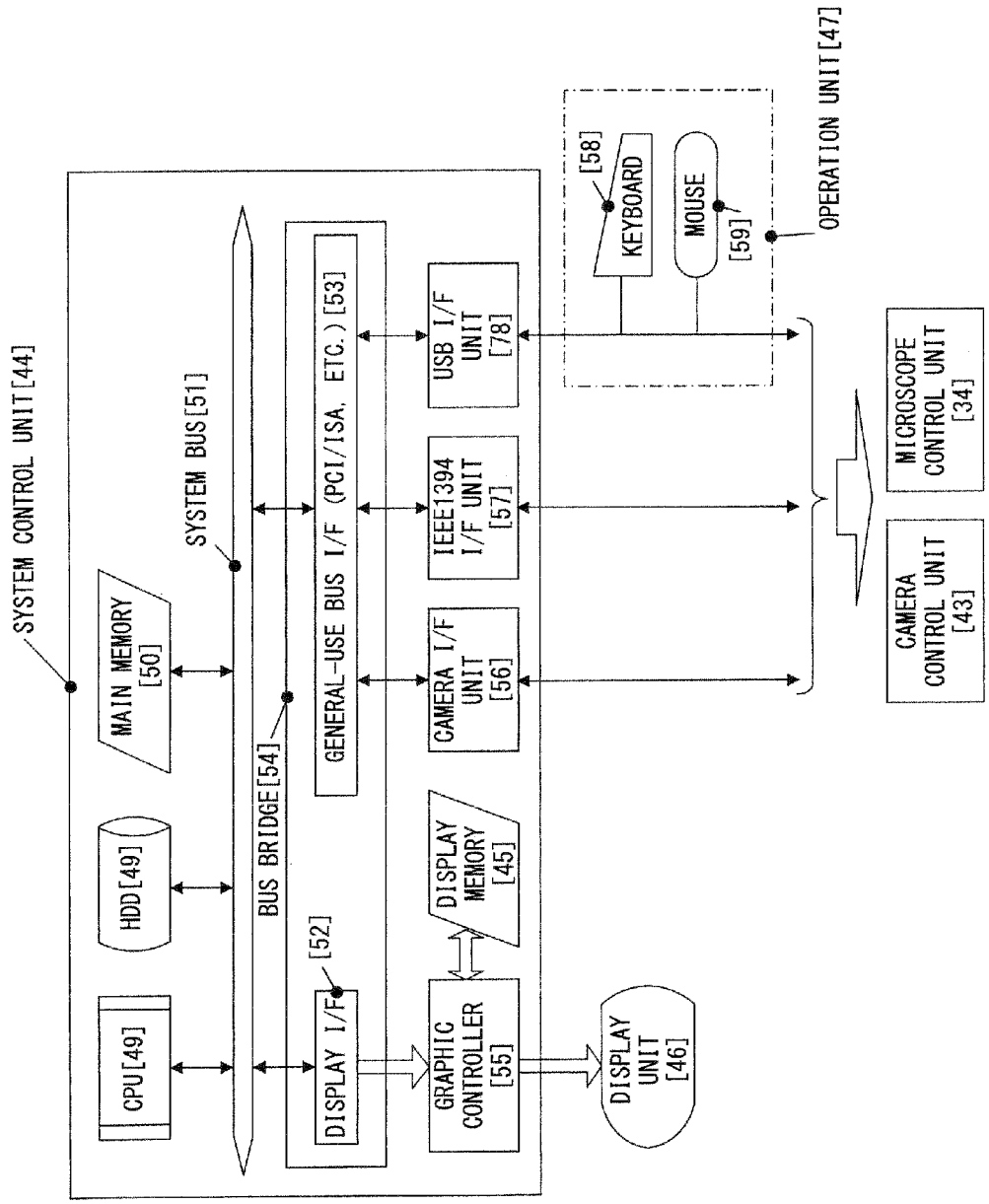
FIG. 3 shows the internal configuration of the system control unit [44].

The configuration of the system control unit [44] also is equivalent to the well-known internal configuration of a PC and FIG. 3 shows its one example.

FIG. 3 shows the internal configuration of the system control unit [44]. The system control unit [44] comprises a CPU [48] for executing a program, non-volatile memory, such as an HDD, for storing the program and main memory [50] for reading data needed to execute the program and the program itself and performing the process at high speed. These are connected each other by a system bus [51]. The CPU [48] executes the program. For the nonvolatile memory for storing the program, the HDD [49] is used. The main memory [50] reads data needed to execute the program and the program itself and performing the process at high speed. As to the HDD [49], there are various well-known connecting methods. However, in this specification, the description of bridges (connecting means) necessary for each connecting method is omitted.

Parts needed to control (the operation unit [47], the display unit [46], the microscope control unit [34], the camera control unit [43] and the like) are connected via each I/F unit.

For example, the operation unit [47] is connected via a well-known universal serial bus (USB) and obtains information from a USB I/F unit [78]. For the operation unit [47], a well-known keyboard [58] and a pointing device, such as a mouse [59] are used.

Each of the microscope control unit [34] and the camera control unit [43] is also connected via an I/F of IEEE1394 rating and connected via an IEEE1394 I/F unit [57]. It can also be connected via a camera I/F unit [56].

A graphic controller [55] is used to output image data in accordance with the input signal form of the display unit [46]. The graphic controller [55] outputs the display data of the display memory [45] as signals in accordance with the resolution and scan speed (display alteration speed) of the display unit [46]. For the display unit [46], a well-known LCD monitor or a CRT monitor is used.

Each of the graphic controller [55], the camera I/F unit [56], the IEEE1394 I/F unit [57], the USB I/F unit [78] comprises an I/F unit (the display I/F [52], a general bus I/F [53]) for being connected to the system bus [51]. Each part can be controlled by the CPU [48] using these I/F units. Such a configuration for connecting different types of buses is generally called a bus bridge [54].

Next, the operation of this preferred embodiment configured as described above is described. Firstly, one example of the internal configuration of the CCD [36] is shown in FIG. 4 and is briefly described.

Figure 4:
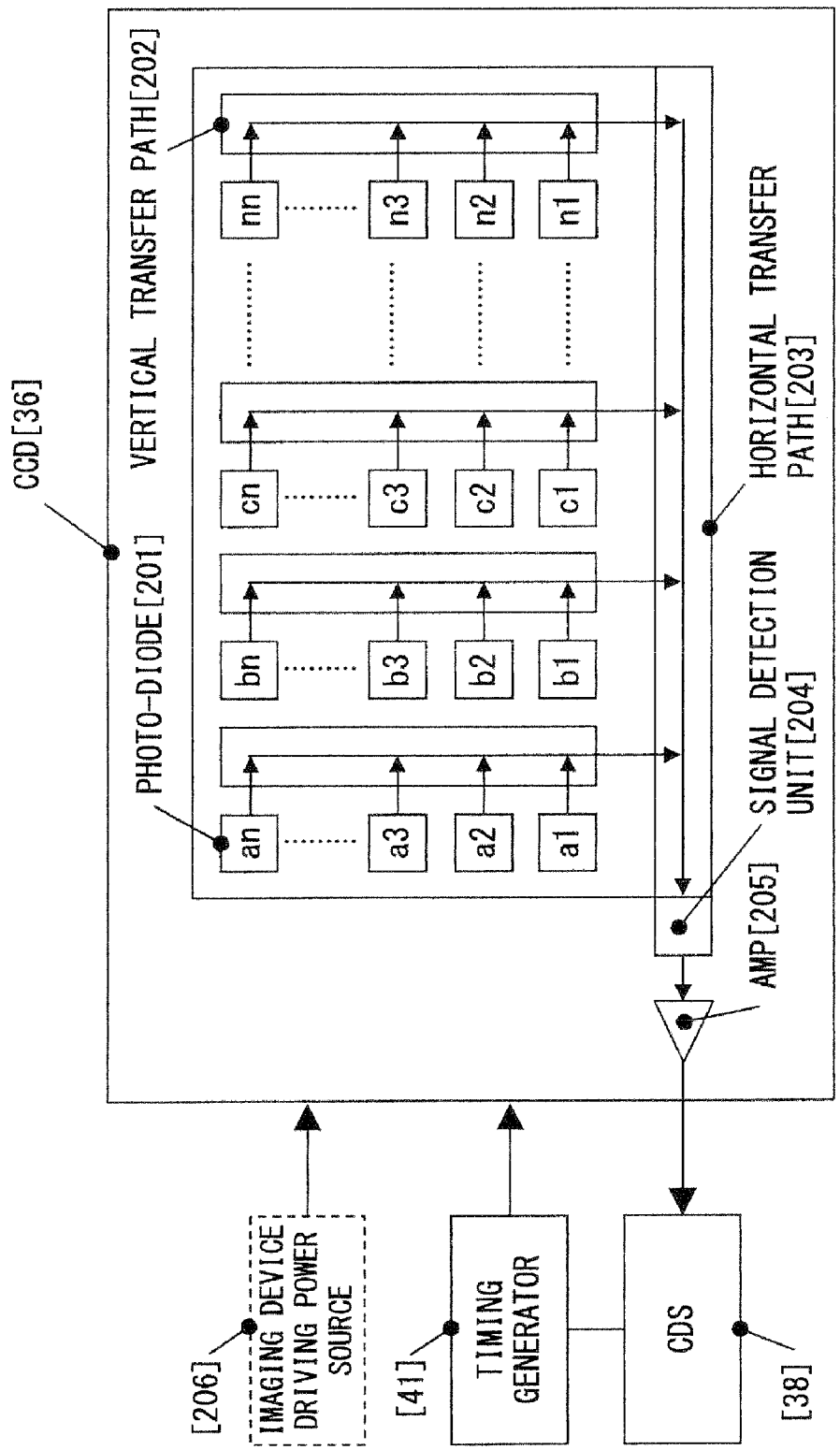
FIG. 4 is a top view showing the device structure of the CCD (36).

FIG. 4 is a top view showing the device structure of the CCD [36]. In this case, photo-diodes [201] are disposed in a matrix arrangement. A plurality of vertical transfer paths [202] is disposed between these photo-diodes in the column direction. One horizontal transfer path [203] is disposed at the bottom of this vertical transfer path [202]) in the longitudinal direction.

Signal charge accumulated in the photo-diode [201] is read out to the vertical transfer path [202] by a charge transport pulse [TG] and is transferred toward below the paper in the vertical transfer path [202].

The signal charge transferred to the vertical transfer path [202] is transported to the horizontal transfer path [203], is transferred toward the left direction of the paper in this horizontal transfer path [203] and is transferred to a signal detection unit [204]. The signal of the signal detection unit [204] is amplified up to a desired level and finally is outputted to the outside via an AMP (reading amplifier) [205].

A part for generating a signal for driving such a CDD [36] is the timing generator [41]. The timing generator [41] supplies various drive signals to the CDD [36]. One example of such a drive signal is shown in FIG. 5.

Figure 5:
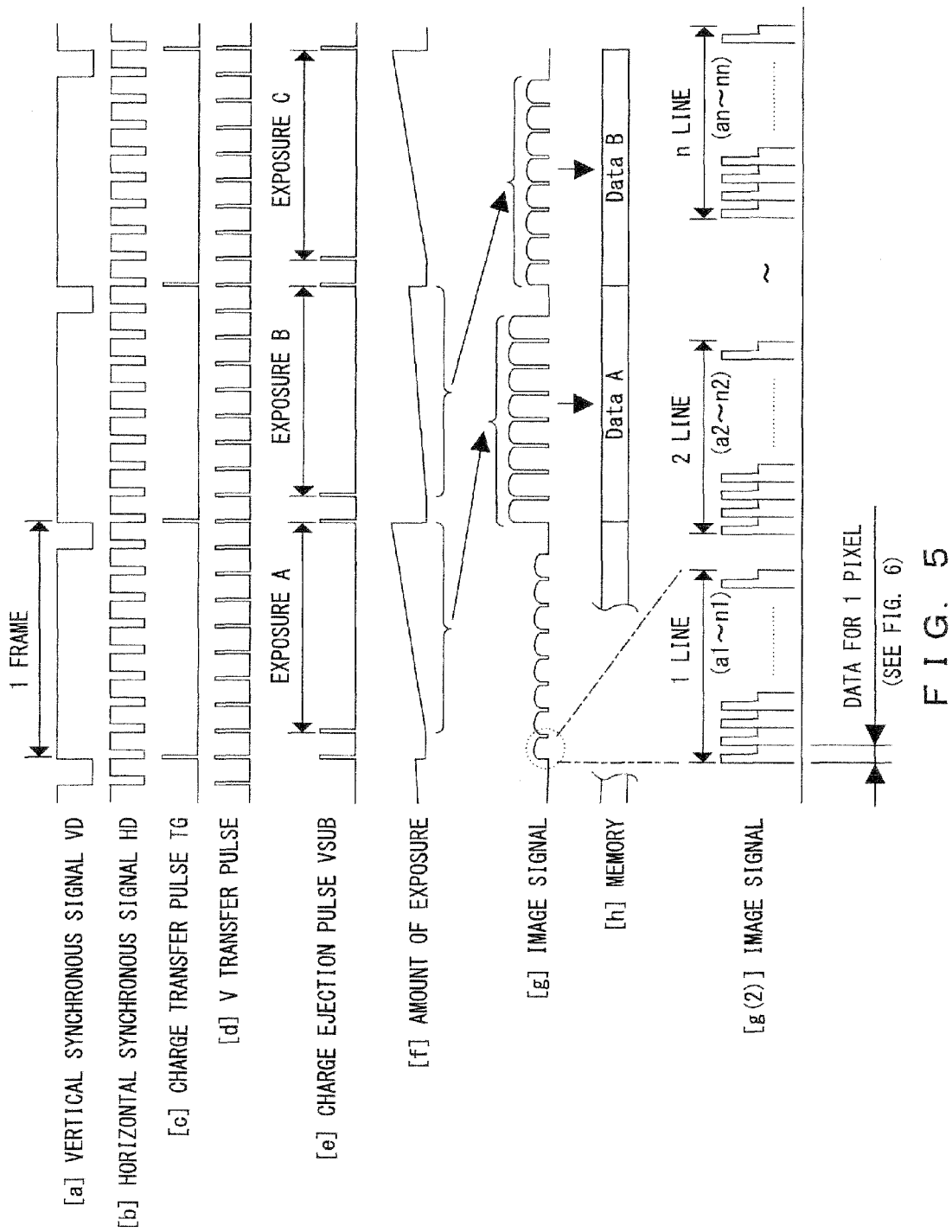
FIG. 5 is the timing chart of CCD drive (normal operation).

FIG. 5 is the timing chart of CCD drive (normal operation) In this case, the vertical synchronizing signal VD shown in FIG. 5[a] is outputted in one frame cycle. The horizontal synchronizing signal HD shown in FIG. 5[b] is outputted for each line.

The charge transport pulse TG shown in FIG. 5[c] is outputted for each frame. The signal charge is read out to the vertical transfer path [202] from the photo-diode [201] as shown in FIG. 4.

The V transfer pulse shown in FIG. 5[d] is outputted as a charge transfer pulse for transferring charge in the vertical transfer path [202] in synchronization with the horizontal synchronizing signal HD.

Furthermore, the charge discharge pulse VSUB shown in FIG. 5[e] is outputted by two pulses in synchronization with the charge transport pulse TG (in the cycle of V transfer pulse). This charge discharge pulse VSUB discharges the accumulated charge of the photo-diode [201] to the substrate side by the first pulse and exposure is started by the subsequent pulse.

Thus, the CCD [36] discharges the charge in the photo-diode [201] to the substrate side by the first pulse of the charge discharge pulse VSUB. Then, the CDD [36] specifies the time between the subsequent pulse and the charge transport pulse TG as exposure time. At this moment, the CCD [36] outputs an image signal (FIG. 5[g]) at the timing of this charge transport pulse TG.

For example, the accumulated amount of light in the case where a certain amount of light is inputted to the photo-diode [201] is the amount of exposure as shown in FIG. 5[f]. As shown in FIG. 5[g], an image signal is delayed by one frame and outputted. Specifically, data A is outputted during exposure B.

As to the CCD [36], CDD drive power, which is not shown in FIG. 1, is also supplied to a CCD drive power supply [206].

Thus, the signal outputted from the CCD [36] is inputted to the CDS [38]. The CDS [38] extracts only signal output which can be handled as image data in later circuits out of the signal from the CCD [36].

FIG. 5[g (2)] shows the magnified view of data for one line of FIG. 5[g]. The signal outputted from the CCD [36] is divided into data for one line as shown in FIG. 5[g (2)] and finally is handled as data of one pixel (one photo-diode [201]). One example of data signals for one pixel of the photo-diode [201] is shown in FIG. 6.

Figure 6:
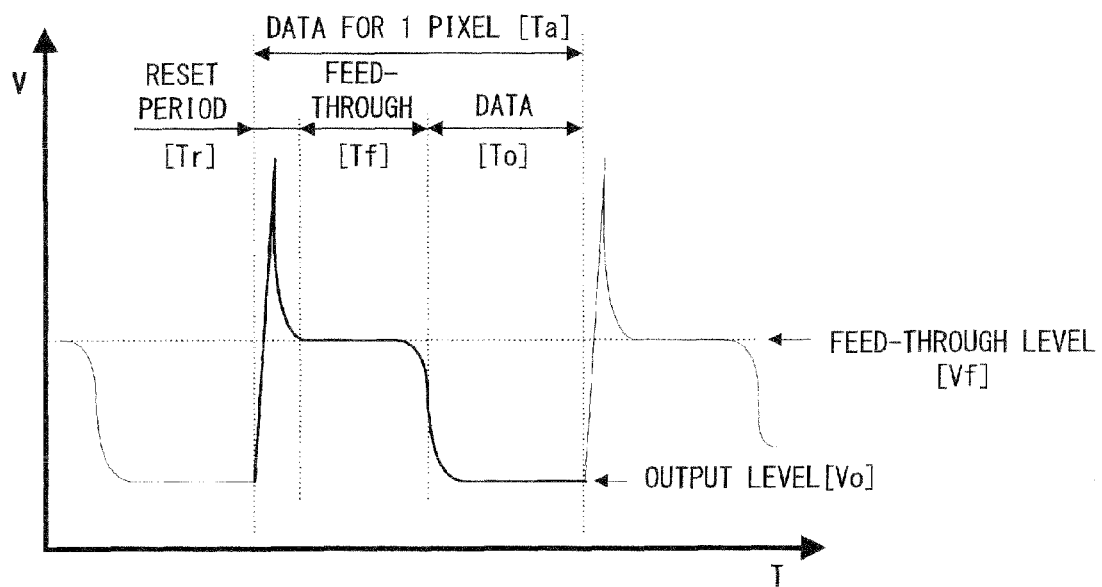
FIG. 6 shows a CCD data output waveform for one pixel.

FIG. 6 shows a CCD data output waveform for one pixel. The period FIG. 6[Ta] is the data output period for one pixel. This period is roughly divided into three output periods of a reset period FIG. 6[Tr] for resetting output charge, a field-through period FIG. 6[Tf] for outputting the output reference signal and a data period [To] for outputting data.

The CDS [38] samples each of the field-through level during the field-through period [Tr] (FIG. 6 [Vf]) and an output level (FIG. 6[Vo]). Then, the CDS [38] extracts the difference between the field-through level (FIG. 6[Vf]) and the output level (FIG. 6[Vo]), outputs it as image data and inputs it to the amplifier (AMP) [39].

After being adjusted to a predetermined gain value by the AMP [39], the signal at the output level is converted to a digital signal by the A/D converter [40]. If the output signal from the CDS [38] is low, its gain is increased and is amplified up to a desired level.

The image signal converted to a digital signal is temporarily stored in the frame memory [42]. Here, processes by methods other than the gain amplification in the case where the output signal from the CDS [38] is low are also described.

When the charge charged to the photo-diode [201] of the CCD [36] is very little, its noise part increases even if the gain of the AMP [39] is amplified in later step. Therefore, it becomes difficult to obtain correct image data.

In such a case, it becomes necessary to accumulate sufficient charge by extending the charging time (hereinafter refer to as accumulation time) to charge the photo-diode [201]. The timing chart in the case where the accumulation time is extended is shown in FIG. 7.

Figure 7:
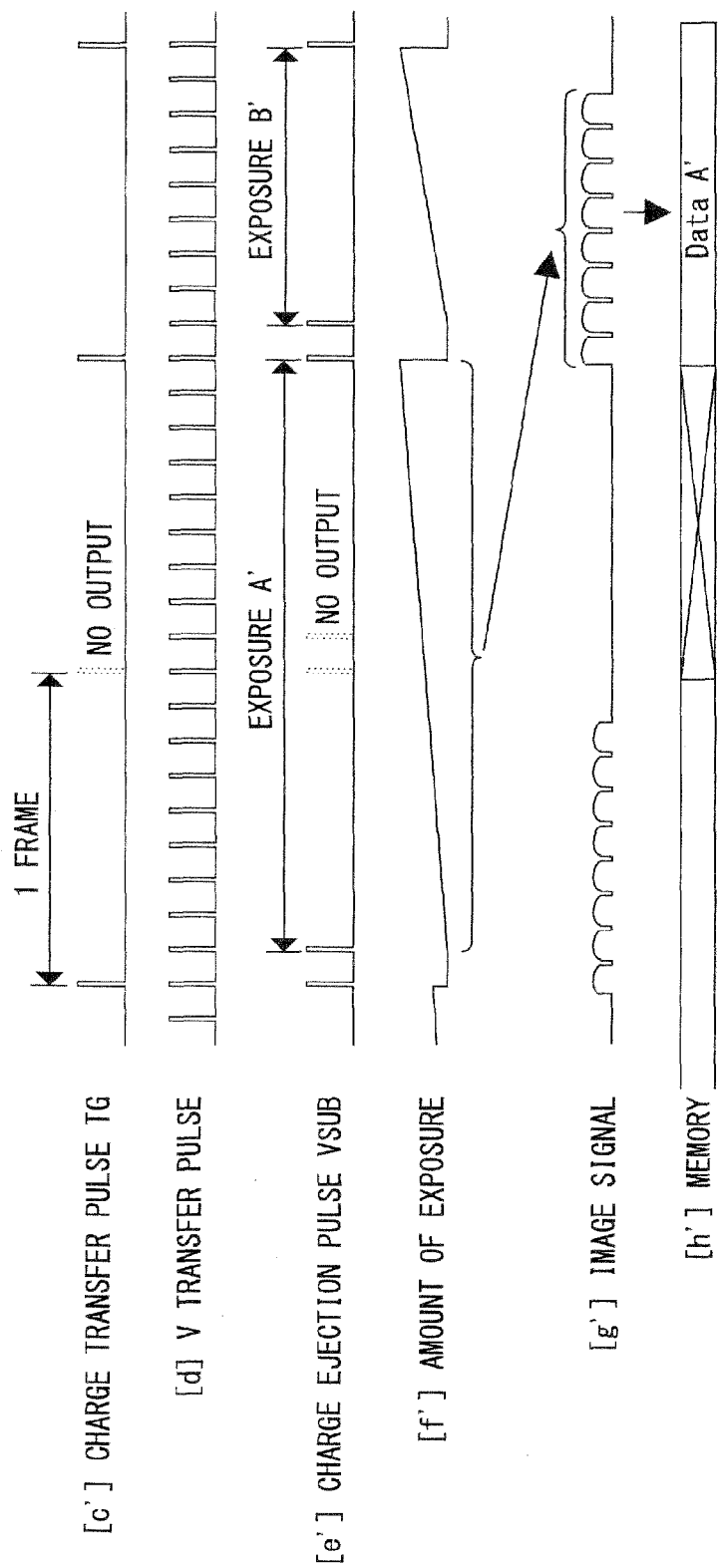
FIG. 7 is the timing chart of CCD drive (operation in the case where accumulation time is extended).

FIG. 7 shows the timing chart of the CCD driving (operation in case of extending the charging time). Vertical synchronizing signal VD, horizontal synchronizing signal HD and V transfer pulse are the same as in FIG. 5, thus the explanation is omitted.

FIG. 7 shows one example of the case where exposure (FIG. 7[f']) for two frames exposure time (exposure A') is made possible by thinning out the charge transport pulse TG shown in FIG. 7[c']. Since the discharge of charge must be suppressed during exposure, the charge transport pulse VSUB (FIG. 7[e']) is not outputted.

Similarly, the timing until the accumulated chare is written into the frame memory [42] after being transported is matched with the charge transport pulse TG (FIG. 7[c']). The subsequent timings are the same as shown in FIG. 5.

By extending the accumulation time as such, the exposure time is controlled. Thus, even when the amount of light inputted to the CCD [36] is very little, sufficient charge can be accumulated. As a result, image data little affected by noise can be obtained.

In FIG. 7, one example of accumulation for two frames is shown. However, the accumulation time is not limited to this and it can be controlled by "time for one frame*n" (n=integer other than 1 or more).

Conversely, if the amount of light to the CCD [36] is too much and the charge of the photo-diode [201] is saturated, the accumulation time must be shortened. However, if the amount of light is so much that it is saturated by exposure for one frame, the accumulation time cannot be shortened any more. In such a case, the amount of exposure is adjusted using the electronic shutter mode.

Figure 8:
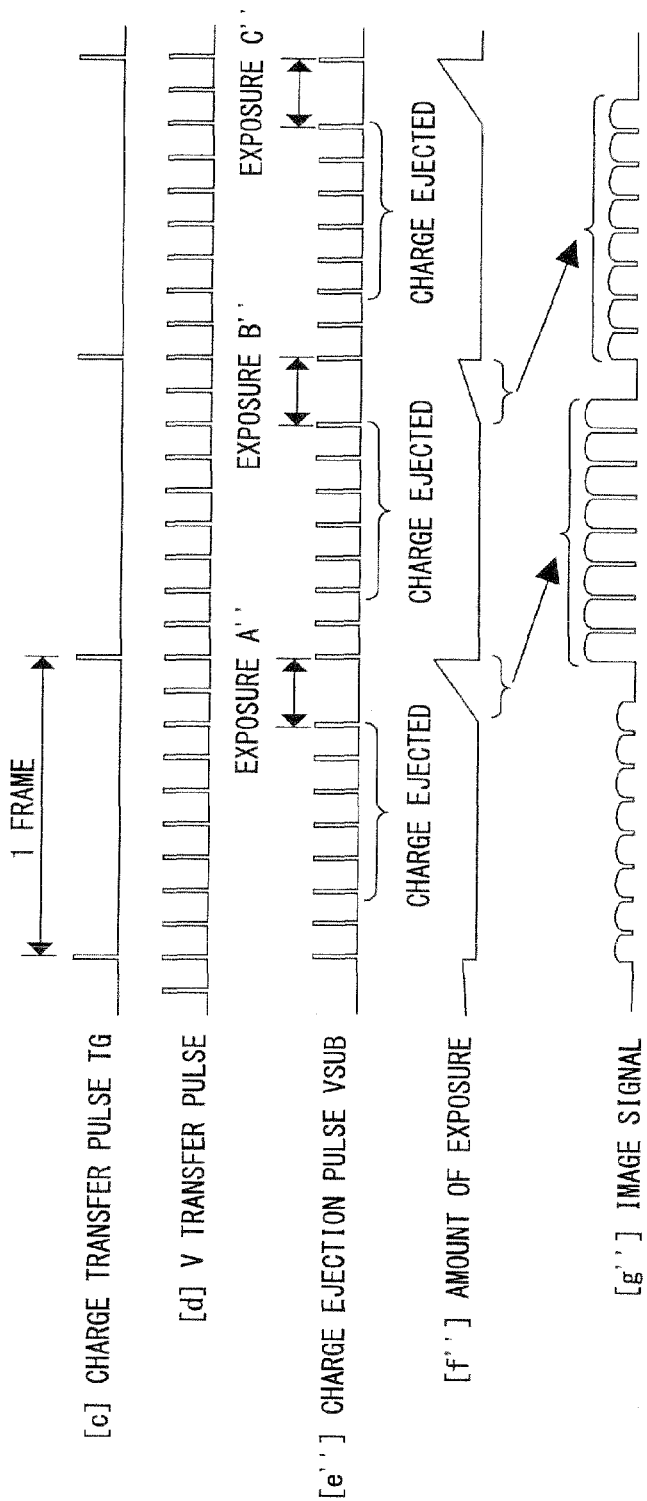
FIG. 8 is the timing chart of CCD drive (operation in the electronic shutter mode).

FIG. 8 is the timing chart of CCD drive (operation in the electronic shutter mode). The vertical synchronizing signal VD, the horizontal synchronizing signal HD, the charge transport pulse TG and the V transfer pulse are controlled in the same timing as shown in FIG. 5. When this timing is maintained, the exposure time becomes for one frame. Therefore, the accumulation time can be controlled only to the same level as shown in FIG. 5.

In the electronic shutter mode, the charge discharge pulse VSUB (FIG. 8[e"]) is used. Specifically, the charge discharge pulse VSUB (FIG. 8[e"]) continues to be outputted until the time exposure is desired to start within one frame and the charge of the photo-diode [201] is reset.

Thus, the actual exposure time becomes "time for one frame–VSUB output time" and exposures (exposure A"/exposure B"/exposure C") can be controlled in a shorter time than one frame.

The timing of writing the image signal (FIG. 8[g"]) into the frame memory [42] is the same as shown in FIG. 5.

Thus, even when the amount of reflected light changes, by controlling the accumulation time, an optimum image signal can be obtained.

However, when the accumulation time is extended and exceeds a certain time, the interval of data output from the CCD [36] increases. The writing interval into the frame memory also increases. As a result, the update interval of images displayed on the display unit [46] also increases. Therefore, if desiring to display an image whose data changes, the display speed cannot follow the data change. For example, even when the stage [8] is driven and the observation position is shifted, the display speed itself of the display unit [46] cannot often follow the stage moving speed.

In such a case, besides the gain amplification of the amplifier [39] and the accumulation time control of the CCD [36], the sensitivity can be increased using a method called binning.

The CCD [36] usually handles one pixel of the photo-diode [201] shown in FIG. 4 as one piece of data. However, in the binning method the CCD [36] collects and outputs a plurality of pieces of the data of one pixel. Thus, the sensitivity can be increased without changing the accumulation time.

Figure 9:
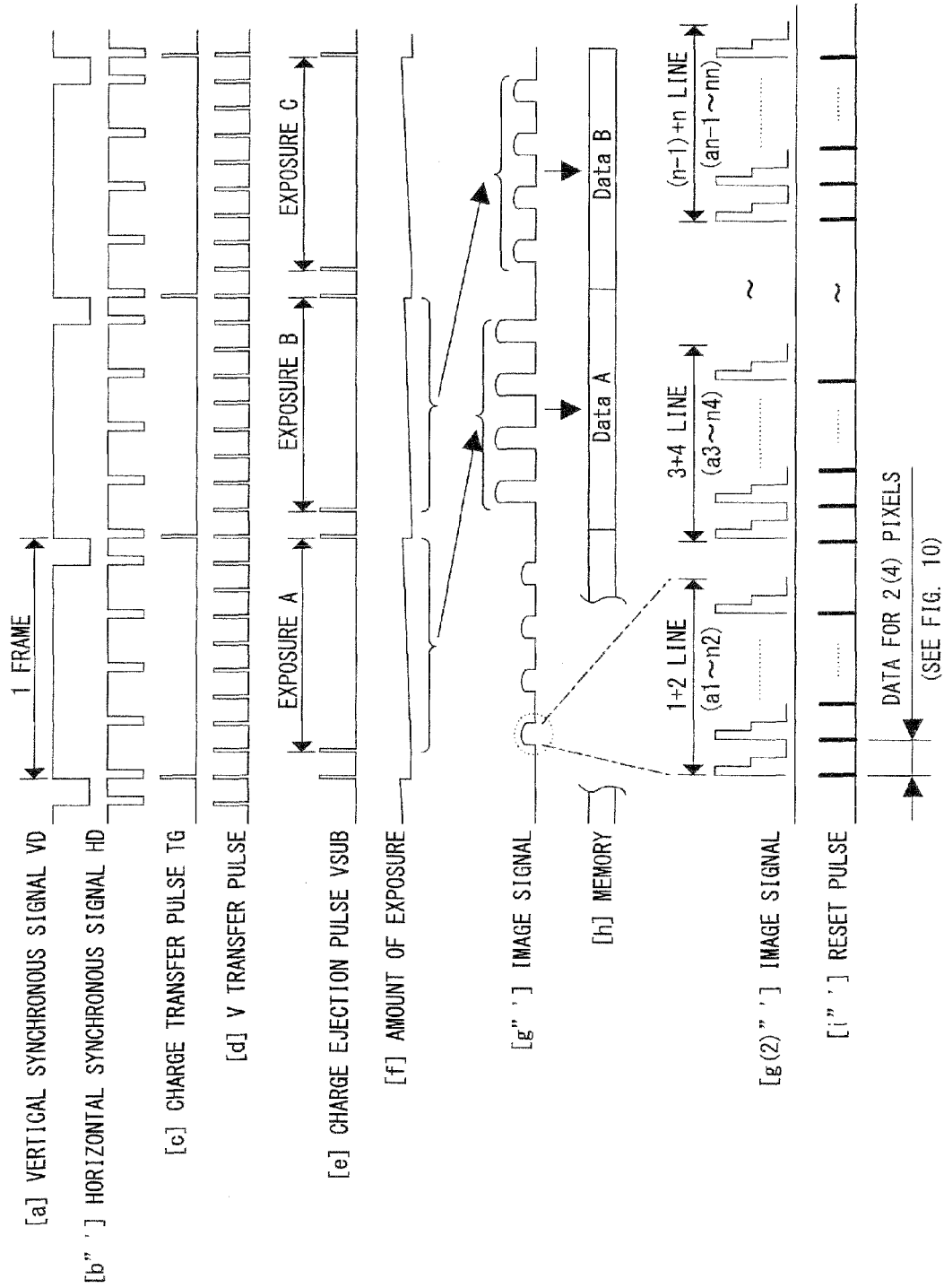
FIG. 9 is the timing chart of CCD drive (operation in the binning mode).

For example, in the mode of "2*2 binning", four pixels data of FIG. 4 [a1], [a2], [b1] and [b2] of the photo-diode [201] are added together inside the CCD [36] as one piece of data and outputted. Thus, the amount of signals can be increased without changing the accumulation time. Furthermore, the sensitivity can be increased without increasing the reading noise. However, since a plurality of pixels data are added, the amount of data outputted from the CCD [36] decreases according to the addition number. Thus, since the number of pixels for an image decreases, the resolution deteriorates, which must be noted. The timing chart in the "2*2 binning" mode is shown in FIG. 9.

The signal charge accumulated in the photo-diode [201] shown in FIG. 4 is read out to the vertical transfer path [202] by the charge transport pulse [TG] (FIG. 5[c]) and is transferred toward below the paper in the vertical transfer path [202].

At this stage, data in FIG. 4[a1-n1] is accumulated in the horizontal transfer path [203]. Usually, the charge transported to the horizontal transfer path [203] is transferred to the left direction of the paper in this horizontal transfer path [203] and transferred to the signal detection unit [204]. However, in the binning mode, in this step, the horizontal transfer is not performed and the data remains waiting without any process being applied.

While the charge previously transferred vertically is accumulated in the horizontal transfer path [203], a subsequent vertical transfer is further performed. At this moment, the charge previously transferred vertically in FIG. 4 [a1-n1] and the charge in FIG. 4[a2-n2] are added together. In the "2*2 binning" mode, horizontal transfer is performed in this step.

If the number of binning is far more, vertical transfer is repeated and charge is accumulated in the horizontal transfer path [203]. This operation is controlled by thinning out the horizontal synchronizing signal HD in FIG. 9[b‴].

After the specified number of vertical transfer is completed, the charge is transported to the left direction of the paper in the horizontal transfer path [203] and is transferred to the signal detection unit [204].

At this moment, also in the step of reading the charge transferred to the signal detection unit [204], charge is further added. Since charge is reset for each pixel usually, a reset pulse is inserted. By thinning out the occurrence interval of this reset pulses, adjacent charges accumulated in the horizontal transfer path [203] can be added (FIG. 9[I‴] together. The actual waveform at the time of reading is shown in FIGS. 10A and 10B.

Figure 10A:
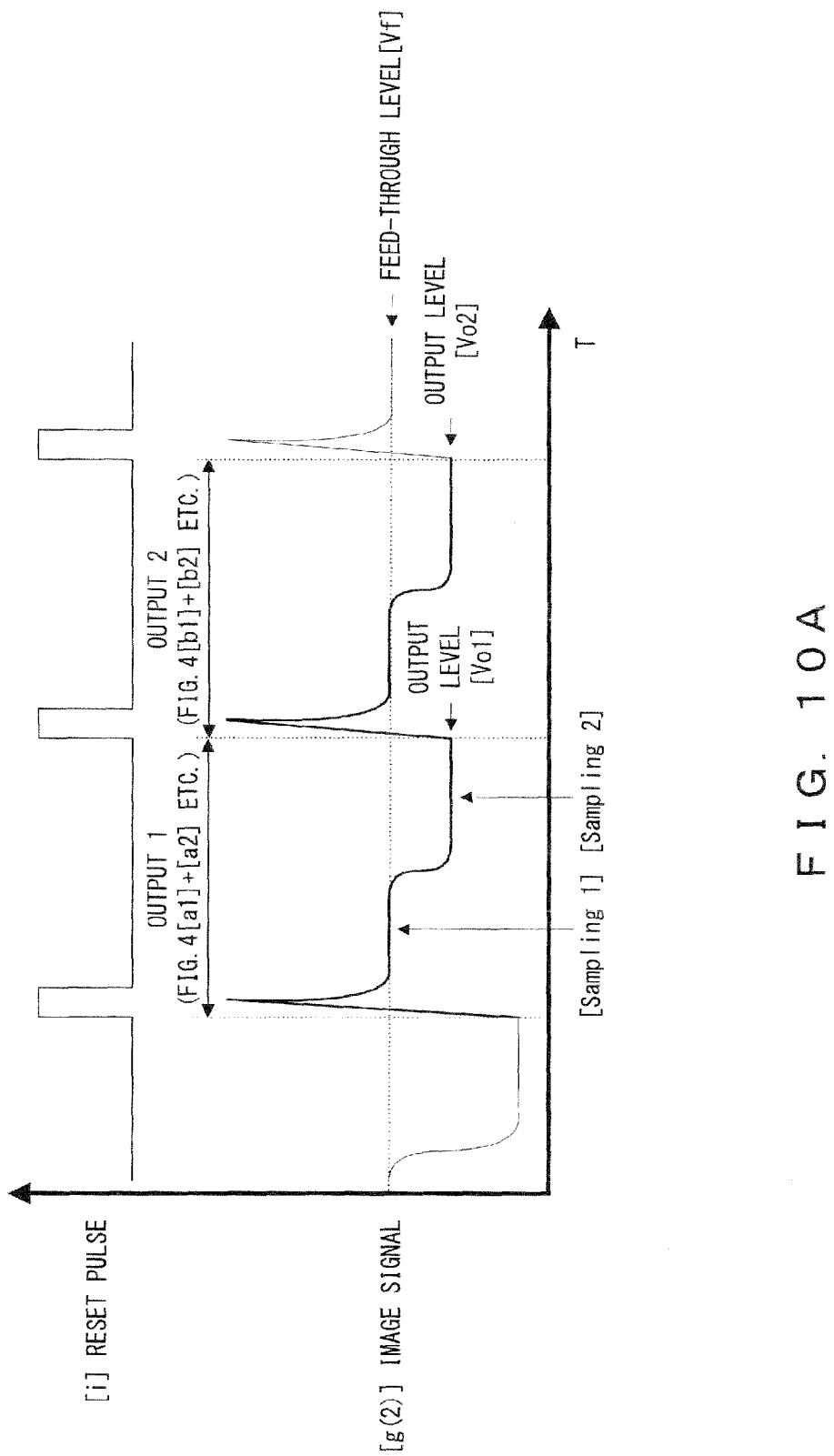
FIGS. 10A and 10B show CCD data output waveforms at the time of binning application.
Figure 10B:
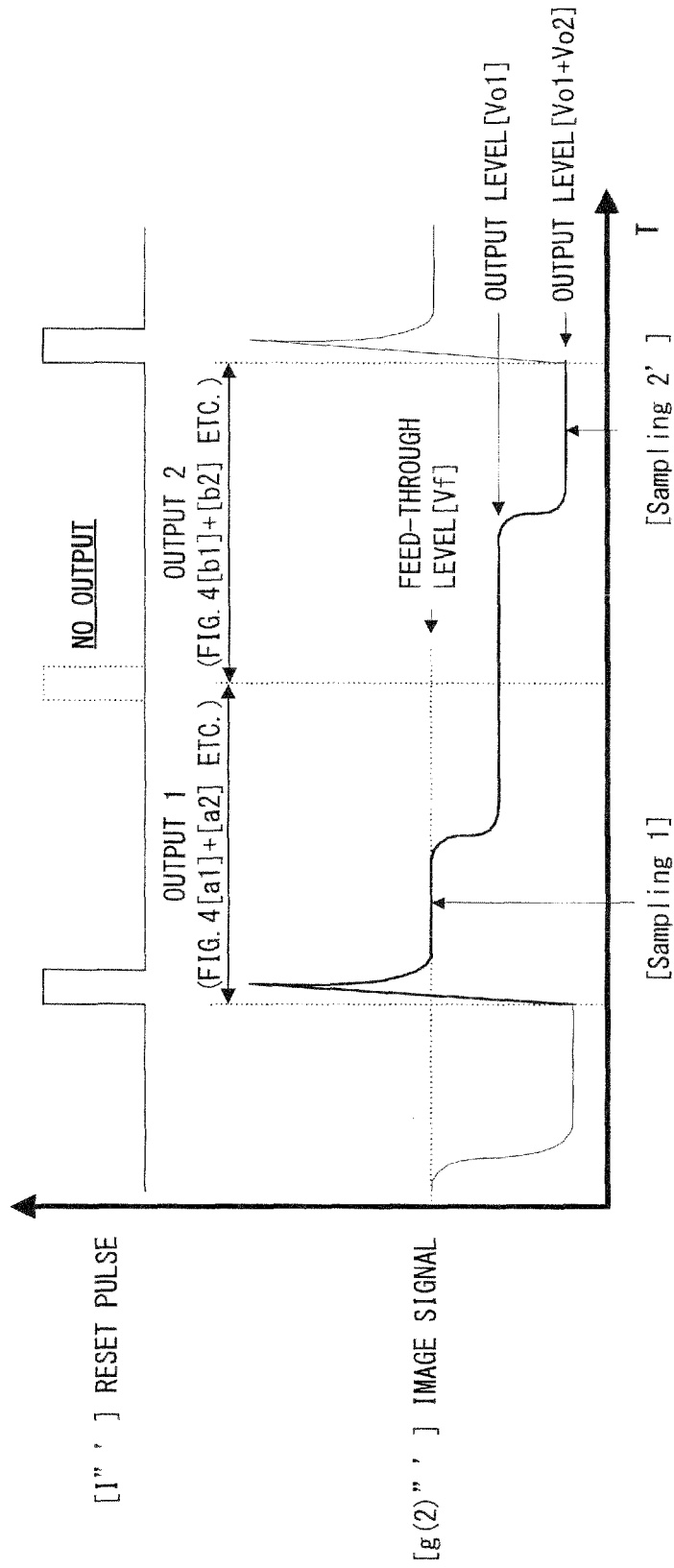

FIGS. 10A and 10B show CCD data output waveforms at the time of binning application. FIG. 10A shows an image signal [g(2)] in the case of usual reading and one reset pulse [i] is inserted for each pixel. However, in FIG. 10B, operation is performed while the occurrence interval of a reset pulse is thinned out like the reset pulse [i‴] and the charge of output 2 is added while the charge of output 1 remains in the signal detection unit [204]. Thus, charge for two pixels (actually four pixels since charge for two pixels are added together in the step of vertical transfer (FIG. 10[Vo1+Vo2])) or for the specified number of pixels can be collectively read out. Therefore, the sensitivity can be increased without increasing noise.

Actually, if the addition process is performed in the later step after each pixel data is read at a time, the accumulated signal can be obtained as an output signal. However, since noise at the time of reading increases according to the number of reading, its influence is great when handling very weak charge. When the amount of reflected light is little, the binning process is very effective.

In this case, the output timing of data becomes different by thinning out the occurrence of the reset pulse [I‴]. The timing of the field-through level [Vf] is the same as that (FIG. 10[sampling 1]) in the normal operation. However, the timing of output data shifts from FIG. 10A [sampling2] to FIG. 10B[sampling 2']. It is necessary not to read the data of the first pixel (FIG. 10 [output 1]) and to sample in the data output timing of the second pixel (FIG. 10 [output 2]). Therefore, in the binning mode, the sampling timing of the CDS [38] is changed.

As described above, various methods for switching sensitivity according to the amount of light inputted to the CCD [36] can be selected and each method has an advantage and a disadvantage, which are briefly shown collectively in Table 1.

TABLE 1

| Control part | Advantages | Disadvantages |
| --- | --- | --- |
| Gain control (AMP [39]) | Can easily control without changing the data out timing. | When an input signal is small, noise is also amplified. |
| Accumulation time control (CCD [36]) | Can cover a certain range from the excessive amount of light to weak light. | When it is longer than a certain time, the interval between image data increases. |
| Binning control (CCD [36]) | Sensitivity can be increased without increasing noise. | Resolution deteriorates. |

In the timing charts (FIGS. 5, 7, 8 and 9), only the timing of the valid pixel of the CCD [36] is shown. However, as actual data, optical black, a dummy bit or the like are added before/after output data. However, since it is not directly related to the subject matter of the present invention, its drawing and description is omitted.

On the other hand, the adjustment of the amount of light inputted to the CCD [36], that is, the amount of light of the observation image of the specimen [9] is described below.

The light ON/OFF and adjustment of amount of light of the transmitted illumination light source [1] can be performed by the transmitted illumination light adjustment circuit [24]. In the case of the light source of the conventional microscope, particularly in the case of bright field observation using a dyed specimen or the like, generally color temperature is maintained constant in order to observe using an eyepiece lens and, for example, in a case of halogen lamp, approximately 9 [V] is used. However, in the present invention, a part to observe is the LCD monitor and the like indicated as the display unit [46]. Therefore, color is finally corrected by white balance adjustment and the like and can also be linearly controlled between OFF and the maximum brightness.

The correction of image data, such as white balance adjustment after it is picked up by the CCD [36] is performed by the image processing circuit [70]. Besides white balance adjustment, γ correction, various filtering process and the like are also performed by this image processing circuit [70].

Then, the illumination light of the transmitted illumination light source [1] is reduced by the transmitted light ND1 [4] and ND2 [5] in the transmitted light filter group [3]. The transmitted light ND1 [4] and ND2 [5] are filters capable of reducing light without changing the wavelength characteristic of the transmitted illumination light source [1]. For example, ND filters having the transmittance shown in Table 2 are used. This preferred embodiment is described according to the values shown in Table 2.

TABLE 2

| ND description | Transmittance |
|---|---|
| Transmitted light ND1 [4] | 50% |
| Transmitted light ND2 [5] | 25% |

(1) When neither the transmitted light ND1 [4] nor the transmitted light ND2 [5] is inserted in the transmitted illumination light path [LP1], light passes through the transmitted filter group [3] without the amount of light being reduced.
(2) When either the transmitted light ND1 [4] or the transmitted light ND2 [5] is inserted in the transmitted illumination light path [LP1], the amount of light id reduced according to the transmittance shown in Table 2.
(3) When both the transmitted ND1 [4] and the transmitted ND2 [5] are inserted in the transmitted illumination light path [LP1], the transmittance becomes "50%*25%".

The light reduction ratios of the above combination are shown in Table 3.

TABLE 3

| Combination | Light reduction ratio |
|---|---|
| #0 | 0% |
| #1 | 50% |
| #2 | 25% |
| #3 | 12.5% |

In this preferred embodiment, the amount of light applied to the observation specimen [9] can be adjusted according to the combinations #0-#3 shown in Table 3 although it is conducted discontinuously.

Furthermore, the transmitted light AS [6] can also be defined as one of the parameters of light amount change.

The essential role of the transmitted light AS [6] is to adjust the numerical aperture of the transmitted illumination light path [LP1] in accordance with the numerical aperture of a used object lens ([11] or [12]). In a general object lens, approximately 70-80% of its pupil diameter is suitable for balanced observation image.

As to the function, when the aperture of the transmitted light AS [6] is narrowed, its resolution and brightness deteriorate while its contrast and focal depth increase. Conversely, the aperture is opened, the contrast and the like deteriorate while the resolution is improved and an image becomes light. As a general configuration, the transmitted light AS [6] is often included in the condenser lens [7].

This transmitted light AS [6] can be one of the adjustment parameters of the amount of light inputted to the CCD [36] depending on its adjustment state.

When control is exercised by absolute illumination, the combination of the object lenses [11] and [12] must be considered essentially. In this preferred embodiment, since it is controlled by relative comparison (described later), only the ratio of brightness is considered.

If the brightness is, for example, 80% when compared, assuming that 100% open is 1, it can be defined to be 0.64 (=0.8*0.8). However, when actually controlling, the physical system of AS must be calculated, which is described later.

Furthermore, the amount of light also changes depending on the type of the object lenses [11] and [12] in the observation light path [LP2]. However, since the converting operation itself of an object lens is not used as the active parameter of the light amount adjustment, the following description is made assuming that the object lenses provide only fixed values.

The fluorescence cube [14] can also give a fixed value like the object lenses. If the transmitted illumination light path [LP1] is used, the fluorescence cube [14] is removed from the observation light path [LP3].

Similarly, the parts related to light amount adjustment in the reflected illumination light path [LP2] are as follows. The reflected illumination light source [17] is a mercury lamp, a Xe lamp or the like, which is lit by discharge. Therefore, only either lighting or extinction can be selected for the light amount adjustment. However, it is difficult to rapidly control. For example, since it can be re-lit only after waiting a time (several minutes) until arc discharge is stabilized after a discharge tube is lit or re-lit itself cannot be allowed for a certain time (10-15 minutes) after it is extinguished.

Therefore, actually, ON/OFF control is not exercised and in this preferred embodiment (also generally applicable), a reflected light shutter [22] is provided for the reflected light filter group [19] By inserting the reflected light shutter [22] in the reflected illumination light path [LP2], the light of the reflected illumination light source [17] is shielded to make a state equivalent to an extinguished state.

A reflected light ND1 [20] and ND2 [21] are provided for the reflected light filter group [19].

Since these operations are the same as those of the transmitted light ND1 [4] and ND2 [5], their descriptions are omitted.

Furthermore, since a reflected light AS [23] functions in the same way as the transmitted light As [6], the operation of the reflected light AS [23] can be one of the adjustment parameters of the amount of light inputted to the CCD [36].

As described above, the above-described parts can be listed up as the adjustment parts which cause the amount of light inputted to the CCD [36] to change. These also have advantages and disadvantages as in the sensitivity switch and accumulation time control of the CCD [36], which are collectively shown in

TABLE 4

| Control parts | Advantages | Disadvantages |
|---|---|---|
| Light source control (transmitted illumination light source [1]/reflected illumination light source [17]) | Continuous control is possible (transmitted). | The reflected illumination light source cannot be controlled. The wavelength characteristic of the light source changes. |
| ND filter control (transmitted light ND1 [4]/ND2 [5]/reflected light ND1 [20]/ND2 [21]) | Light can be reduced without changing the wavelength of the light source. | In this preferred embodiment, only discontinuous (gradual) adjustment is possible. |
| Aperture control (transmitted light AS [6]/reflected light AS [23]) | Continuous brightness adjustment is possible. | The control range is narrow. The image quality changes. |

Then, the observation method of a microscope is also briefly described. There are various observation methods in a microscope according to its observation objective and usage. For example, there is a bright field observation method in which the specific part of the observation specimen [9] is dyed in color and an image that has transmitted through the observation specimen [9] is observed. There is also a phase difference observation method for expressing the phase deviation of a fine tissue as a gradation difference using a non-dyed observation specimen [9]. There is also a differential interference observation method for three-dimensionally expressing an observation image. There is also a dark field observation method for illuminating the observation specimen [9] from the outer-circumference (outside the luminous flux of the object lenses [11] and [12]) of the illumination light path [LP1/LP2] and observing the diffused reflection of the observation specimen [9]. There is also a polarized light observation method for observing fibrous cells, amyloids and the like which have polarizing characteristic. There is also a fluorescence light observation method for applying a specific strong wavelength light to the observation specimen [9] dyed by a fluorescence reagent and catching the reaction of its dyed part (specific part). In this way, an observation method can be selected according to the usage and the observation specimen [9] can be observed.

When observing by the above-described observation method, an observation light path (transmitted illumination light path [LP1]/reflected illumination light path [LP2], etc.), an object lens ([11]/[12], etc.), the condenser lens [7], the fluorescence cube [13], various filters ([4], [5]/[20], [21], etc.), a light source ([1]/[17], etc.), the state of an aperture ([6]/[23], etc.) and the like must be optimally set.

In this preferred embodiment, the description is made using a typical bright field observation and a fluorescence light observation.

The specified condition of each part corresponding to each observation method is shown in Table 5.

TABLE 5

| | Bright field | Fluorescence light |
|---|---|---|
| Part of microscope | observation (BF) | observation (FL) |
| Light source to be used | Transmitted illumination light source [1] | Reflected illumination light source [17] |

TABLE 5-continued

| | Bright field | Fluorescence light |
|---|---|---|
| Filter state (transmitted light ND1 [4]) | IN | — |
| Filter state (transmitted light ND2 [5]) | OUT | — |
| Filter state (reflected light ND1 [20]) | — | IN |
| Filter state (reflected light ND2 [21]) | — | IN |
| Reflected light shutter | IN | OUT |
| State of aperture | Transmitted light AS [6]→80% | Reflected light AS [23]→100% |
| Fluorescence cube [13] | OUT | IN |
| Light measuring method | BF mode | FL mode |

In the above table, [IN] indicates the state where a target part is inserted in the transmitted illumination light path [LP1] or the reflected illumination light path [LP2] and [OUT] indicates a state out of the light path. The brightness distribution of obtained image data differs according to an observation method. Therefore, a light measuring method must be switched for each observation method in such a way as to display an image in the optimum state.

[BP mode] is a calculation mode suitable for a state where the entire image field is uniformly illuminated while the back field (portion other than a specimen) is bright so that brightness difference with the observation part is small. In this mode, the entire image or its part is extracted, its average value is used as a light measurement target and the brightness of the image is adjusted. This mode is mainly suitable for the bright field, differential interference and phase difference observation.

[FL mode] is a light measuring method suitable for the case where the background is very dark against an observation part and the brightness difference between the observation part and the background is large. This mode is most suitable for the fluorescence observation and an operation is performed by determining the distribution and intensity of fluorescence color development in this mode.

These states (contents of Table 5) are stored in non-volatile memory (HDD [49], etc.) in the system control unit [44].

Next, the operation of switching between these observation methods is described. Switching between these observation methods is made by the operation of the display unit [46] and the operation unit [47].

FIG. 11 shows one example of the display screen of the display unit [46] in the first preferred embodiment. In FIG. 11, an observation screen [79] and an operation MENU [80] are shown on the display unit [46]. On the observation screen [79], an image inputted to the CCD [36] is displayed after the above-described imaging process. On the other hand, on the operation MENU [80], specification buttons corresponding to the above-described observation methods (BF button [81] and FL button [82]) are displayed.

An observer operates a pointer [89], for example, like a pointer track [90] by operating the mouse [59] of the operation unit [47] in the well-known mouse operation way and moves the pointer [89] to the BF button [81]. Then, by pushing down the button, which is not shown in FIG. 11, of the mouse [59], the observer instructs the microscope to switch to the bright field observation method.

The system control unit [44] recognizes from the display coordinates of the BF button [81] and the current display coordinates of the mouse [89] that the BE button [81] is specified and starts its control. By moving the pointer [89] on the FL button [82] by the similar operation, the system control unit [44] can also instruct the microscope to switch to the fluorescence observation.

On the operation MENU [80], buttons (X+ button [83]/X– button [84]/Y+ button [85]/Y– button [86]) for moving the stage [8] in the XY direction (perpendicular to the observation light path [LP3]) are also provided. On the operation MENU [80], buttons (UP button [87]/DOWN button [88]) for vertically moving the stage [8] in order to focus on the observation specimen [9] are also provided together (see the later descriptions for each operation of them).

(Main Description of Operation)

Then, the basic operation in the case where the switch of an observation method (BF button [81]/FL button [82]) is specified is described with reference to the flowchart shown in FIG. 12.

Figure 12:
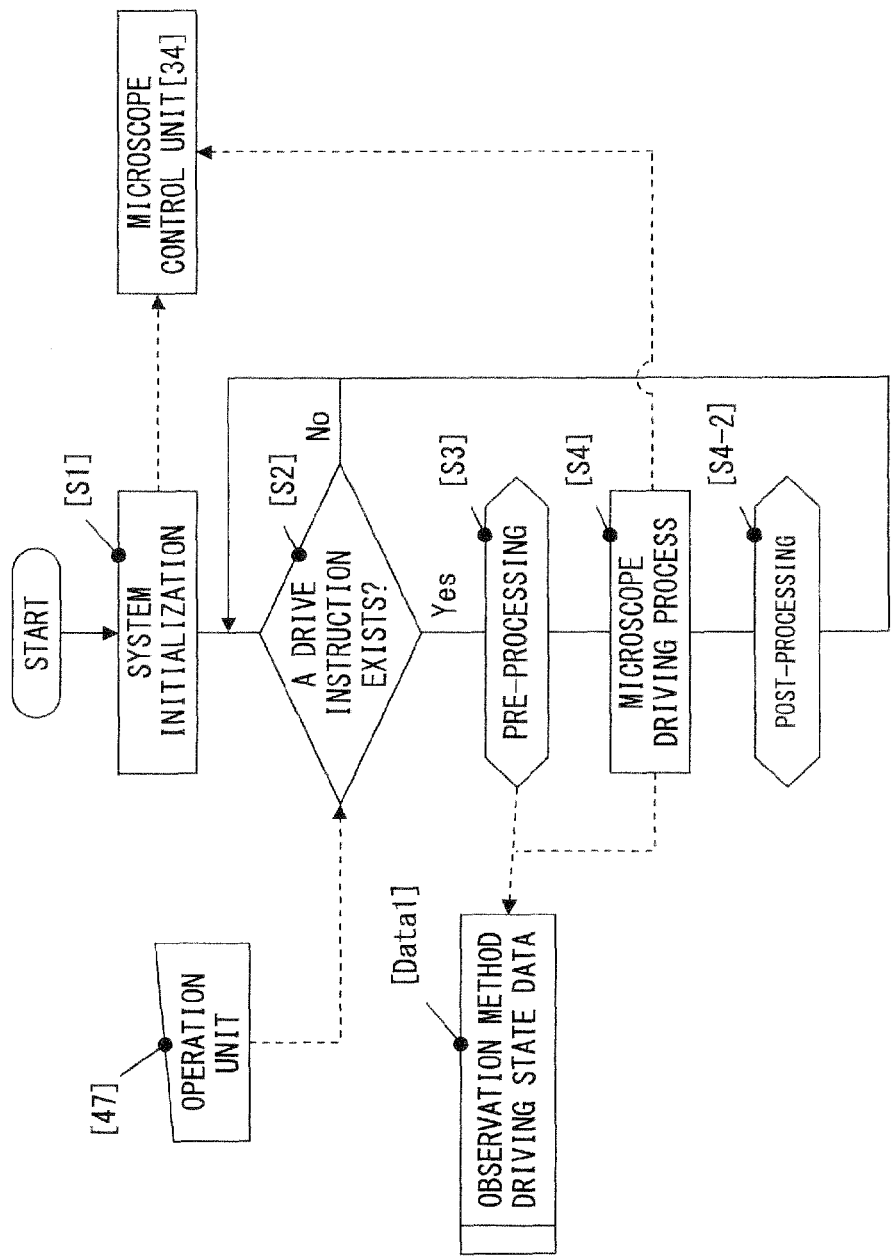
FIG. 12 is the flowchart of the process in the first preferred embodiment (microscope control).

FIG. 12 is the flowchart of the process in the first preferred embodiment (microscope control). A program for executing the process described in FIG. 12 is stored in the HDD [49]. The program is read from the HDD [49] by the CPU [48] and executed.

When the power supply of the system, which is not shown in FIG. 12, is switched on, the system control unit [44] initializes the system [S1]. In the system initialization, generally the system returns to the state where it has previously been shut down. After the system initialization [S1] is completed, the system enters the waiting state. Then, the system control unit [44] starts receiving drive instructions from the operation unit [47].

When the instruction for switching of an observation method is requested by the operation of the mouse [59], the driving process of the microscope is started [S2].

Firstly, as a pre-processing, a flag for let other programs (tasks) know that it is in the microscope driving state is set [S3]. In this preferred embodiment, a well-known multi-task process is performed and in parallel with it another process (imaging process sequence described later) is performed.

The current state must be reported to other tasks.

The current observation method and data capable of determining whether the microscope is being driven are stored in the observation method driving state data [Data 1].

After the preprocessing [S3] is completed, an actual microscope driving process is performed [S4].

The system control unit [44] checks a setting state corresponding to the specified observation method by the HDD [49] (data (Table 5) stored in FIG. 3) and gives a drive instruction to the microscope control unit [34]. The microscope control unit [34] sets each part to an optimum state according to the drive instruction.

(Detail of Switching to Bright Field Observation)

When control is exercised according to Table 5, the control sequence becomes as follows.

(1) Extinction of Reflected Illumination (Light Shielding)

Firstly, illumination light itself is controlled in order to prevent the unnecessary light input during driving. As described earlier, it is difficult to frequently extinguish/light the reflected illumination light source [17]. Therefore, in order to insert the reflected light shutter [22] in the reflected light illumination light path [LP2] to shield illumination light, the reflected light filter driver circuit [32] is driven to control the reflected light shutter [22]

(2) Insertion Control of Filter

The inserting/removing operation of filters is performed while giving priority to such control as to make the observation light path [LP3] dark. Firstly, such sequence as to insert all the filters are to be inserted in the light path beforehand is performed. If the transmitted light ND1 [5] is not inserted in the transmitted illumination light path [LP1], such an instruction is given to the transmitted light filter driver circuit [25] to insert the transmitted light ND1 [5] in the transmitted illumination light path [LP1].

(3) Setting of Aperture

An instruction is given to the transmitted light AS driver circuit [26] to set aperture to 80%. 80% indicates its ratio to the pupil diameter. However, the actual instruction given to the transmitted light AS driver circuit [26] must be a mechanical aperture diameter. Therefore, the microscope control unit [34] converts the instruction to an absolute aperture diameter.

For data needed to calculate an aperture diameter, the numerical aperture, focal length (in the case of transmitted light AS of the object lens and AS projection magnification (in the case of reflected light AS) and the focal length (in the case of transmitted AS) of the condenser lens [7] are used.

Different conversion equations are used between the cases of the transmitted light AS [6] and the reflected light AS [23], which are shown below.

$$\text{Transmitted light aperture} = 2*OBna*CDf*Kas \quad (1)$$

$$\text{Reflected light aperture} = 2*OBna*OBfb*ASmag*Kas \quad (2)$$

[OBna] is the numerical aperture of an object lens and is a fixed value for each object lens.

[CDf] is the focal length of a condenser lens to be used and also each lens has a fixed value.

In this preferred embodiment, it is assumed that the object lenses [11] and [12] having the fixed values shown in Table 6 are used. In this preferred embodiment, [CDf] is handled as a fixed value of 11 [mm]. When there is a plurality of the condenser lenses [7], each of them must have s fixed value.

TABLE 6

| Object lens | Object lens magnification | Numerical aperture [OBna] |
|---|---|---|
| Object lens [11] | 10 | 0.4 |
| Object lens [12] | 40 | 0.85 |

The data shown in Table 6 and the focal length [CDf] of a condenser lens are stored in the non-volatile memory, which is shown in FIG. 1, or the ROM [61] together with a program.

[OBfb] is the back focal length of an object lens and in this preferred embodiment it is operated as a fixed value of 8.00 [mm]. [ASmag] is an AS projection magnification and is stored in the ROM [61] of the microscope control unit [34] together with [OBfb].

The numerical aperture [OBna] of a currently-selected object lens and the focal length [CDf] of the condenser lens [7] are read from Table 6.

[Kas] indicates an actual aperture ratio and is a correction coefficient indicated by a brightness ratio assuming that 100% is 1. A dedicated aperture value can be set for each observation method by making this value variable and recording them.

Here, this is described using the case where the object lens [11] is used in transmitted light bright field observation as an example. The microscope control unit [34] refers to the stored data shown in Table 6 and the like to obtain a condenser top lens focal length [CDf], the numerical aperture of an object lens [OBna] and an AS correction coefficient [Kas]. An aperture diameter can be calculated using these referenced values according Equation (1).

$$\text{Transmitted aperture} = 2*OBna*CDf*Kas = 2*0.4*11*0.64 = 5.63 \text{ [mm]} \quad (3)$$

An actual AS diameter can be calculated according to Equation (3). The microscope control unit [34] sets the aperture diameter by driving the transmitted light AS driver circuit [26] in order to control the transmitted light AS [6] to set the aperture diameter to the AS diameter calculated above. The reflected light AS [23] can also be controlled by using Equation (2) and the reflected light AS driver circuit [33].

(4) Change of Cube Turret

Then, if the fluorescence cube [14] or another cube, which is not shown in FIG. 1, is inserted in the observation light path [LP3], the fluorescence cube [14] and the like is removed from the light path by driving the cube driver circuit [30].

(5) Removal of Filter

Conversely with the above (2), an unnecessary filter is removed from the transmitted observation light path [LP1]. If the transmitted light ND2 [5] is inserted in the transmitted illumination light path [LP1], it is removed from the transmitted illumination light path [LP1] by driving the transmitted light filter driver circuit [25].

(6) Lighting of Illumination Light

Lastly, the transmitted illumination light source [1] is lit in a specified state by controlling the transmitted illumination light source light adjustment circuit [24]. The system control unit [44] notifies the camera control unit [43] of switching of the light measuring method.

By following the above-described procedure, switching of the observation method (to bright field observation) is controlled.

After the microscope driving process [S4] is completed, as the last post-processing, the flag set in step [S3] is reset [S4-2].

The above-described control sequence (control order) is very effective when using a photo-multiplier tube for detecting weak light, a special highly-sensitive CCD and the like as an imaging device to prevent the damage and deterioration of the device.

(Detail of Switching to Fluorescence Observation)

Similarly, when the FL button [82] is selected on the operation MENU [80] of the display unit [46], the observation method can be also switched to fluorescence observation by controlling in reference to the data shown in Table 5.

(Imaging Process Sequence)

According to the observation method set above, an enlarged specimen image is observed by the display unit [46]. The image of the observation specimen [9], projected by the specified observation method is formed on the CCD [36] via the tube lens [35].

The camera control unit [43] obtains the gain of the AMP [39] specified by the system control unit [44], the accumulation time of the CCD [36] and the observation image inputted in the binning setting through the above-described camera sequence (photo-electric conversion, amplification process, etc.). Then, the image data of the obtained observation image is stored in the frame memory [42] as camera data.

The image data stored in the frame memory [42] is transferred to the system control unit [44] after a prescribed adjustment (well-known white balance adjustment, various filtering process, etc.) is applied.

If the CCD [36] is color device, color complementation, such as R/G/B, Y/Cb/Cr or the like, is applied to its image data by the image processing circuit [70] and is transferred to the system control unit [44].

The image data transmitted from the image processing circuit [70] is sequentially transferred to the observation screen display area of the display memory [45] by the CPU [48] via the display I/F [52]. On the display memory [45], as shown in FIG. 11, the operation MENU [80] and the like are also displayed besides the image data. Then, the camera data is transferred to a memory address corresponding to the display position of the observation screen [79] shown in FIG. 11.

The transferred data is repeatedly displayed by the graphic controller [55] at a predetermined frequency within the specified range of the display unit [46].

Then, it is determined whether the brightness of the observation image currently displayed on this display unit [46] is appropriate exposure. If it is not appropriate exposure, exposure must be adjusted. The exposure adjustment is described below in reference to the flowchart shown in FIG. 13.

Figure 13:
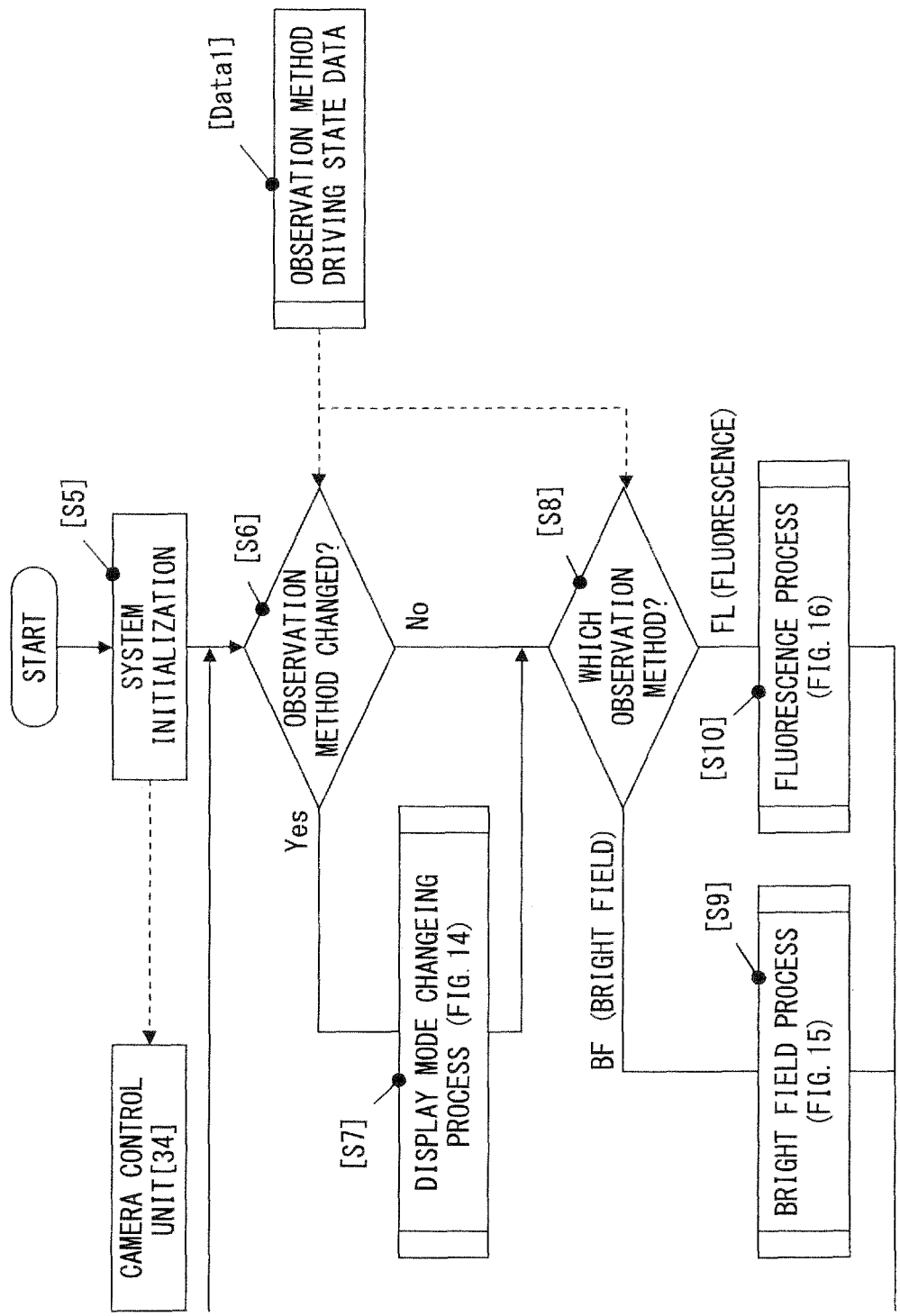
FIG. 13 is the flowchart of the process in the first preferred embodiment (light measurement, display mode control).

FIG. 13 is the flowchart of the process in the first preferred embodiment (light measurement, display mode control). The program of the process contents shown in FIG. 13 is also stored in the HDD [49] as in FIG. 12. As in FIG. 12, when the power of the system, which is not shown in FIG. 1 is switched on, the system is initialized [S5].

A prescribed setting (return to the state at the time the power is previously shut down, etc.) is reported to the camera control unit [43]. Then, the camera control unit [43] is initialized to enter a state where the CCD [36] can capture images. As described a little earlier, this process (FIG. 13) and the microscope driving process (FIG. 12) are simultaneously performed in parallel by the CPU [48]. In order to check each other's state, common data (HDD [49] and main memory [50]) is provided. Each other's state is checked by setting, for example, [Data 1] as the common data.

Then, it is checked whether the observation method is changed [S6]. Observation method driving state data [Data1] is checked. If the observation method is changed, a display-mode changing process ([S7] (FIG. 14)) is performed. This display-mode changing process [S7] is described later. Here, it is assumed that bright field (BF) observation is currently set and is not changed.

Then, the currently set observation method is checked [S8], and a process corresponding each observation method is performed. In this preferred embodiment, two types of process observation methods of bright field observation (BF) and fluorescence observation (FL) are described.

In the case of bright observation, a bright field process ([S9]=(FIG. 15)) is performed. In the case of fluorescence observation, a fluorescence process ([S10]=(FIG. 16)) is performed.

(Setting of Bright Field Process)

Since currently bright field (BF) observation is set, firstly the bright field (BE) observation (FIG. 15) is described.

Figure 15:
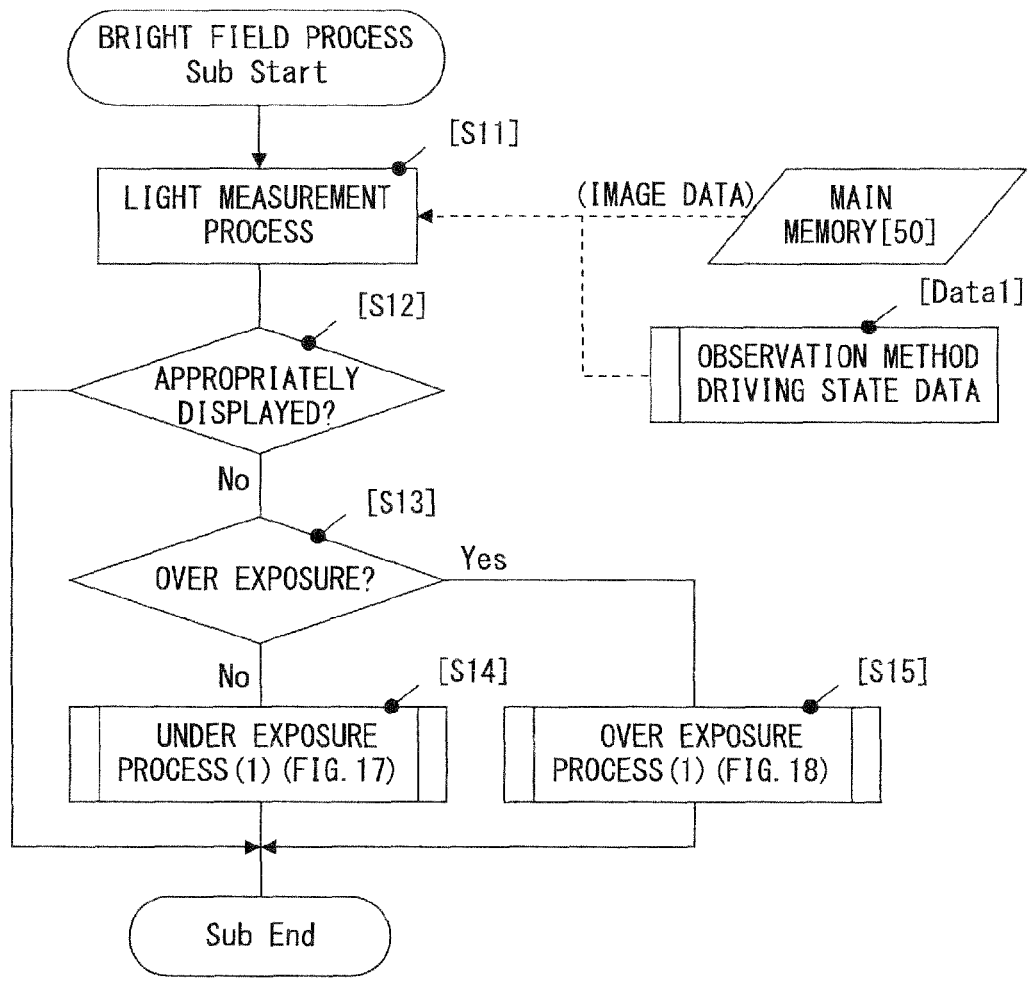
FIG. 15 is the flowchart of the process in the first preferred embodiment (process at the time of bright field observation).

FIG. 15 is the flowchart of the process in the first preferred embodiment (process at the time of bright field observation). Firstly, a light measuring process [S11] is applied to the latest image data. Data equivalent to a currently displayed image is stored in the main memory [50] by the process of the CPU [48]. Its exposure adjustment state is checked by applying a light measuring operation to the data.

Since it is already confirmed by the observation method driving state data [Data1] that bright field is currently set, a light measuring operation is performed in a BF mode. In the BF mode, the operation is performed using well-known average light measurement. The average light measurement calculates the entire image or the average value of all images in a specified area, not shown. Over/Under exposure is determined by whether the operation result is larger/smaller than the light measurement reference value.

The light measuring operation result and the light measurement reference value are compared. If "light measuring operation result=light measurement reference value", the current exposure control is optimum. Therefore, the bright field process (FIG. 15) is terminated without performing any process and the flow returns to a higher-order function (program that has called this (FIG. 15) process).

If some range is set for the light measurement reference value, the above equation is assumed to hold true as a process of determining whether the light measuring operation result is within the range.

If "light measuring operation result≠light measurement reference value", it is determined whether the light measuring operation result is the state of Over/Under exposure [S13]. (In the Case of Bright Field and Under Exposure)

If the light measuring operation result is smaller than the light measurement reference value, exposure is not sufficient. Therefore, an Under exposure process (1) [S14] (FIG. 17) is performed. Descriptions are made below with reference to FIG. 17.

Figure 17:
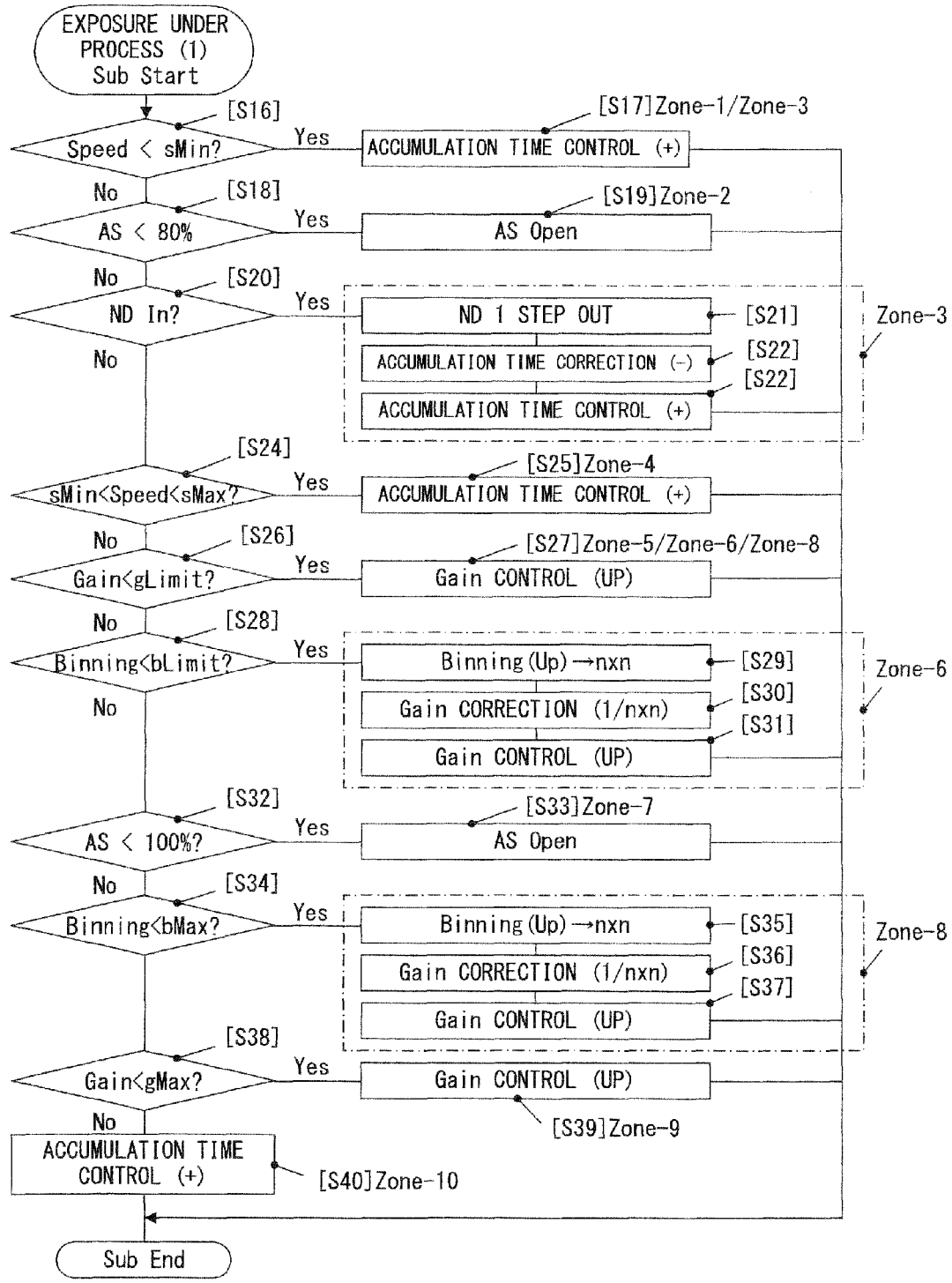
FIG. 17 is the flowchart of the process in the first preferred embodiment (process in the case of Under exposure at the time of bright field observation).

FIG. 17 is the flowchart of the process in the first preferred embodiment (process in the case of Under exposure at the time of bright field observation). The definitions of the terms used in FIG. 17 are shown below.

sMin: Monitor display limit
sMax: Comfortable operation limit 5-10 [fps]
sMax2: Operation limit 2-4 [fps]
(+): Extend accumulation time.
(−): Reduce accumulation time.
ND In: ND filter is inserted in the light path.
ND Max: All ND filters are inserted in the light path.
Speed: Live display speed
Gain: AMP amplification factor
gLimit: Tolerable S/N level
gMax: Maximum gain
bLimit: Tolerable resolution deterioration level
bMax: Maximum binning (1) Accumulation Time Control [Zone-1]

It is determined whether the current interval of taking in image data to be displayed on the display unit [46] (hereinafter called [speed]) is shorter than a display limit up to which display can be updated by the display unit [46] (hereinafter called [sMin])[S16].

Figure 23:
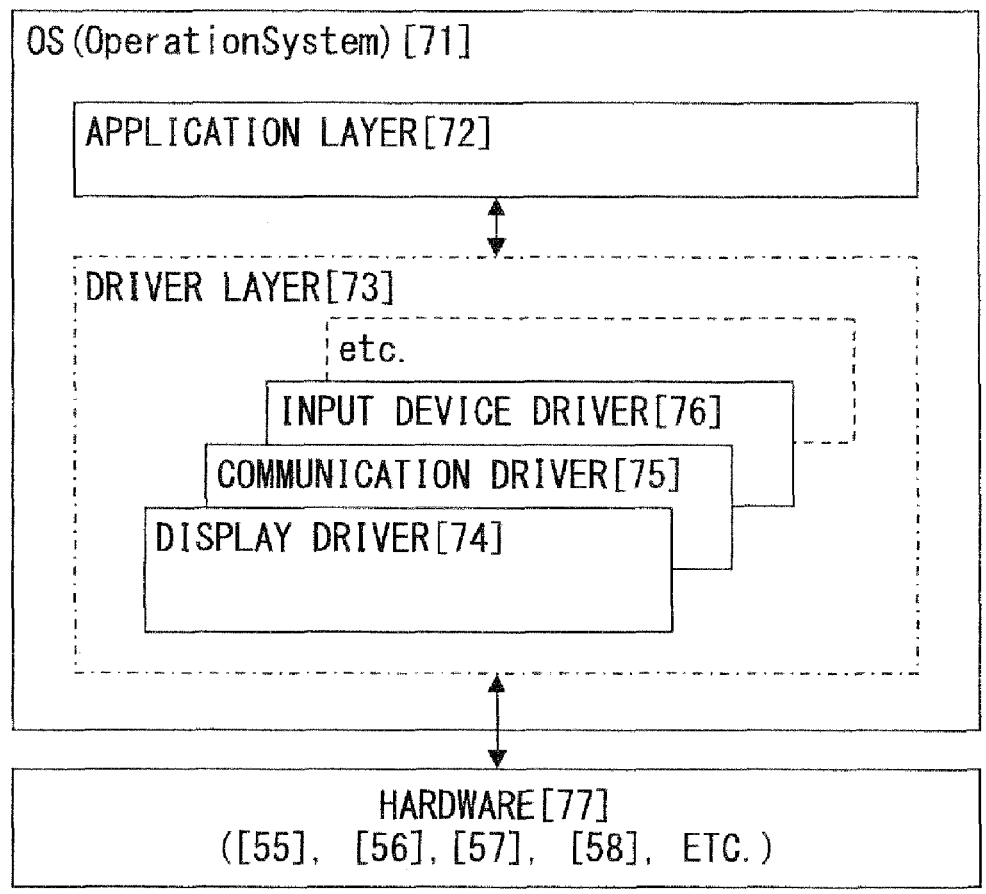
FIG. 23 explains the program hierarchy of the system control unit [44].

[Speed] is equivalent to the data input interval of the frame memory [42], that is, the data output interval of the CCD [36]. [sMin] can be checked by the information of a display driver [74] (see FIG. 23) that controls the graphic controller [55] that outputs data to the currently set display unit [46]. AS described earlier, the system control unit [44] in this preferred embodiment corresponds to a publicly known PC. FIG. 23 shows the structure of a program executed by the system control unit [44].

A publicly known operation system (OS) [71] that controls the entire device is positioned at the top. Under it there is an application layer [72]. Under it there is a driver layer [73]. This driver layer [73] is an I/F part that enables hardware [77] to be controlled by the application layer [72].

The hardware [77] corresponds to, for example, the graphic controller [55], camera I/F unit [56], IEEE input 1394 I/F unit [57], keyboard [58] and the like in this preferred embodiment. The display driver [74], a communication driver [75], an input device driver [76] and the like are provided for each of these I/F units, keyboard and the like. For example, information shown in Table 7 can be obtained from the display driver [74], and the determination in [S16] is made on the basis of this information. According to Table 7, [sMin] in this preferred embodiment becomes 60[Hz].

TABLE 7

| Monitor model | ABCD-DEFG |
| Monitor resolution | 1280 × 768 |
| Refresh rate | 60 Hz |
| Monitor gradation | 32 bit |

If [Speed] is shorter than [sMin], the accumulation time is extended by the specified value of the CCD [36] and exposure is adjusted [S17] (→termination of the process in FIG. 17).

[Accumulation time (+)] in FIG. 17 means to extend accumulation time (same in the consequent flowchart). Conversely, [Accumulation time (−)] means to shorten accumulation time. If [Speed] exceeds (is longer than) [sMin], the following step [S18] is performed.

(2) Aperture Control [Zone-2]

The current state of the transmitted light AS [6] controlled by the microscope control unit [34] is checked [S18].

If aperture is less the 80[%], an instruction to expand an aperture diameter by a specified number is given to the microscope control unit [34] (step goes to termination of the process in FIG. 17). This is performed in order to adjust exposure and also to restore the amount of light to an optimum state, since if aperture is unnecessarily small the resolution of the observation image inputted to the CCD [36] deteriorates and also the amount of light is wasted.

If aperture is already optimum (80%), the following step [S20] is performed. According to Table 5, the flow shifts to a step [20].

(3) ND Filter Control [Zone-3]

It is checked whether a transmitted light filter ND in the transmitted filter group [3] is inserted in the transmitted illumination light path [LP1]. [ND In] in FIG. 17 indicates a state where even one ND filter is inserted in a light path. If either/both of the transmitted ND1 [4] or/and ND2 is inserted in the transmitted illumination light path [LP1], the ND filter is removed.

According to the combination shown in Table 5, currently it is in the state of [#1] in FIG. 3 (transmitted light filter ND1 [4]=IN/transmitted light filter ND2=OUT). The process is continued in that assumption.

The system control unit [22] gives an instruction to the microscope control unit [34] to make the ND filter brighter by one step ([#1]→[#0] in Table 3). Specifically, the transmitted filter driver circuit [25] is driven to spin the transmitted ND1 [4] out of the transmitted illumination light path [LP1] [S21].

Since the amount of light discontinuously changes and brightness rapidly changes if it is left as it is in the brightness adjustment by a ND filter. Thus, there is a possibility that charge inputted to the CCD [36] may be saturated. Therefore, a correction process [S22] is performed.

The system control unit [44] checks how much illumination light is changed by the removal of the ND filter. Since according to Table 3, it is changed from [#1] to [#0], the light reduction ratio of the transmitted illumination light path [LP1] becomes from 50% to 0%. Therefore, it can be recognized that its amount of light is doubled. Thus, the amount of light inputted to the CCD [36] is also doubled.

In order to make this state equivalent to the original (pre-control) state, the process to correct by shortening an accumulation time [S22] is performed this time. In the above example, it is OK if the accumulation time is reduced to the half of the current value.

At the moment accumulation time correction (−) is completed, image data obtained from the CCD [36] remains in a state equivalent to one before processing and exposure remains Under. Therefore, consecutively accumulation time control (+) [S23] being a process equivalent to [S17] is conducted (→termination of the process in FIG. 17).

At the moment the process of this step [Zone-3] is terminated, the accumulation time is fairly shortened. For a while after that the steps [S16] and [S17] are repeated.

If in step [S20] all NDs are OUT of the transmitted illumination light path [LP1], the flow shifts to a step [S24].

If a plurality of ND filters is simultaneously driven when performing the above-described process, as described earlier in the observation method, firstly a filter to be inserted is inserted in the light path and then a filter to be removed is removed from the light path. Thus, the careless input of the excessive amount of light can be prevented.

(4) Accumulation Time Control 2 [Zone-4]

The system control unit [44] checks whether [Speed] is equal to or faster than [sMin] and also is in the range of display speed [sMax] sufficiently fast to make a comfortable specimen observation.

[sMax] is briefly described below. The longer a display update interval is, at which interval images are displayed on the display unit [46] when operating the stage [8] (XYZ operation)(image-taking interval of the CCD [36]), the more conspicuous the delay of image display on the display unit [46] becomes against actual shift distance and speed of the stage [8]. In the field of the present invention, the limit of display speed which can be controlled without stress is technically specified to be approximately 5 to 10[fps] for a second.

In this preferred embodiment, the description is continued assuming that [sMax]=10[fps] As long as [sMin]<[Speed]<[sMax] holds true, accumulation time control (+) [S25] is performed so that the accumulation time is extended and exposure is adjusted [S25] (→termination of the process in FIG. 17).

At the moment [sMin]<[Speed]<[sMax] stops holding true, the flow shifts to the following step [S26].

(5) Gain Control [Zone-5]

Up to the above-described control, parameter adjustment which deteriorates image quality is avoided as much as possible and parameters giving priority to the quality of observation images has been controlled. If exposure is Under in this step too, the following process is continued.

By extending accumulation time, images having good S/N can be obtained. However, in that case, image display response remarkably deteriorates and a comfortable operation becomes difficult. Therefore, hereafter, comfortably operable image display speed [sMax] is set as a reference and exposure is adjusted in such a way that the speed may not exceed the reference.

Specifically, firstly, the gain of the AMP [39] is amplified and exposure is adjusted. It is determined whether magnification [Gain] is larger than [gLimit] [S26]. [Gain] is the signal amplification factor of the AMP [39]. [gLimit] is a limit of amplification factor up to which the influence of signal noise against image data (S/N) can be tolerated. In the field of the present invention, [gLimit] is technically specified to be an observable amplification factor up to which it is sufficiently bright to identify images in the state where it is amplified approximately 8 to 16 times.

In this preferred embodiment, the description is continued assuming that [gLimit]=8[X]. If [Gain] is smaller than [gLimit], the gain of the AMP [39] is amplified by a specified value [S27] (→termination of the process in FIG. 17). If [Gain] is equal to or larger than [gLimit], the following step [S28] is performed.

(6) Binning Control 1 [Zone-6]

The currently set number of binning is checked and it is checked whether the number of binning is smaller than [bLimit]. If the number of binning is increased, sensitivity is improved. However, the resolution of images deteriorates by so much. The limit number of binning up which resolution deterioration can be tolerated is specified as [bLimit].

[bLimit] can be calculated on the basis of, for example, an optical system to be used and the pixel pitch of the photo-diode [201] of the CCD [36].

Firstly, an object lens currently inserted in the observation light path [LP3] is checked. If the lens currently inserted is the object lens [11], the NA (OBna) of the object lens can be recognized from Table 6 stored in the non-volatile memory of the microscope control unit [34]. By using this NA (OBna), the NA of beams inputted to the CCD [36] (output NA of the tube lens [35]) can be calculated.

$$\text{Output } NA = OBna/\text{image forming magnification} \quad (4)$$

Furthermore, the resolution R of the CCD [36] is calculated on the basis of the above NA.

$$\text{Resolution } R = 0.5\lambda/\text{output } NA, \text{ or } 0.61\lambda/\text{output } NA \quad (5)$$

In the equation, $\lambda$ is one of wavelengths constituting light beam, for example, 550 [nm].

Then, the maximum number of binning in which the sampling pitch of capturing image by binning becomes equal to or less than ½ of the resolution R is calculated.

The maximum integer B of 1 or more satisfying Expression (6) is calculated, assuming that B, R and p are the numbers of binning, the above calculated resolution and the pixel pitch of the photo-diode [201], respectively.

$$B < R/2p \quad (6)$$

For example, if the pixel pitch of the photo-diode [201] of the CCD [36] and the projection magnification of the tube lens [35] are 3.4[µm] and 2[X], respectively, the number of binning B can be obtained as follows.

Firstly, the output NA can be obtained according to Equation (4).

$$\text{Output } NA = OBna/\text{image forming magnification} = 0.4/10*2 = 0.02 \quad (7)$$

Then, the resolution R can be obtained according to Equation (5).

$$R = 0.5\lambda/\text{output } NA = 0.5*550[nm]/0.02 = 13.8 \ [\mu m] \quad (8)$$

Finally, the number of binning B can be obtained according to Expression (6).

$$B = R/2p = 13.8 \ [\mu m]/2*3.4[\mu m] = 2.01 \quad (9)$$

Therefore,

[bLimit]=2

Similarly, the [bLimit] of the object lens [12] becomes as follow.

[bLimit]=3

As described above, [bLimit] changes depending on the object lens to be used ([11]/[12]), the characteristic of the CCD [36] and the intermediate magnification factor. The control is performed on the basis of this [bLimit].

Alternatively, the binning limit value [bLimit] can be determined based on the resolution of a display area of the observation screen [79] of the display unit [46].

For example, even if data is obtained with higher resolution when the area resolution of the observation screen [79] is 600*800 [Dot], sometimes the data cannot be effectively used due to a display resolution limit. When outputting the data on the monitor (writing data in the display memory [45]) in order to display with the resolution of 600*800[Dot], the data is compressed. In such a case, if the data is obtained by a binning process from the beginning, sensitivity can be improved and also there becomes no need to compress at the time of monitor output, thereby leading to the reduction of the processing time.

It is assumed that display area resolution is 800*600[Dot] and the number of pixels of the CCD [36] is 5 millions (2,560*1,920). In this case, even if the data is processed with binning 3(3*3), it can be taken with 853*640 and can be displayed without loss of information when displaying it on the observation screen [79]. However, if it is set to binning 4(4*4), the resolution of the taken images becomes 640*480 and falls below the display area resolution. Therefore, [bLimit] can be specified 3 ([bLimit]=3).

In this case, the resolution of a monitor can be obtained by the display driver [74](FIG. 23) as in Table 7, like the earlier-described refresh rate. The resolution of a monitor can be calculated on the basis of this resolution and an actually displayed screen structure (layout, coordinate data and the like of the observation screen [79] and the operation MENU [80]).

[bLimit] specified above and the currently set number of binning are compared [S28]. If the current number of binning is smaller than [bLimit], binning is controlled [S29]

When binning is controlled, sensitivity is improved and brightness increases. Since, in this case too, brightness discontinuously changes as in ND control [S21], it must be corrected.

As to the correction of the increased brightness, the increased brightness is corrected by reducing gain [30]. For example, binning is set to 2(2*2) from zero, sensitivity increases four times. Therefore, gain is reduced to ¼ of its current value.

Then, as in [S27], consecutively, the gain of the AMP [39] is amplified by a specified value and exposure is adjusted [S31] (→termination of the process in FIG. 17).

At the moment the process of this step [Zone-6] is terminated, the gain of the AMP [39] becomes equal to or less than [GLimit]. For a while after that, the processes in steps [S26] and [S27] are repeated.

If [Binning] is equal or larger than [gLimit], the following step [S32] is performed.

(7) Aperture Control 2 [Zone-7]

If the number of binning exceeds [bLimit], aperture is controlled again. In the above-described process [Zone-2], aperture is controlled in such a way as to become optimum. However, in this process, an aperture diameter is extended up to 100% where the maximum brightness can be secure.

If aperture is less than 100%, an instruction to extend an aperture diameter by a specified number is given to the microscope control unit [34] [S33] (→termination of the process in FIG. 17). If aperture exceeds 100%, the following step [S34] is performed.

(8) Binning Control 2 [Zone-8]

In the above-described process [Zone-6], binning is controlled on the basis of [bLimit] taking into consideration the performance of the optical or display system. However, in this process, only sensitivity is focused and the process of increasing binning up to the upper limit number of binning [bMax] up to which the number of binning can be controlled by the camera control unit [43] is performed.

If the current number of binning is equal to or less than [bMax], a binning process is performed [S35]. Processes [S36] and [S37] are consecutively performed, these are equivalent to the processes [S30] and [S31], respectively (→termination of the process in FIG. 17).

If the current number of binning is already [bMax], the following step [S38] is performed.

(9) Gain Control 2 [Zone-9]

In the above-described processes [S26] and [S27], gain is controlled within a certain specified range. However, this time, gain is controlled up to the maximum gain [gMax] that can be controlled by the camera control unit [43] without considering noise. If the current gain is smaller than [bMax], gain is increased [S39] (→termination of the process in FIG. 17). If the current gain is already [gMax], the following step [S40] is performed.

(10) Accumulation Time Control 3 [Zone-10]

If exposure cannot be completely adjusted by the adjustment of all the adjustment parts after controlling the above-described parameters, accumulation time is adjusted again in order to provide an observable condition although losing operability. Although the limit of a comfortable operation [sMax] is exceeded, accumulation process is continued up to the necessary accumulation time [S40] (→termination of the process in FIG. 17).

If the light measuring operation result is smaller than the light measurement reference value in FIG. 17, that is, exposure is insufficient, the process at the time of Under exposure is performed.

(In the Case of Bright Field and Over Exposure)

Back to FIG. 15, on the other hand, if the light measuring operation result is larger than the light measurement reference value, it is over exposure. In that case, the Over exposure process (1) [S15=FIG. 18] is performed.

Figure 18:
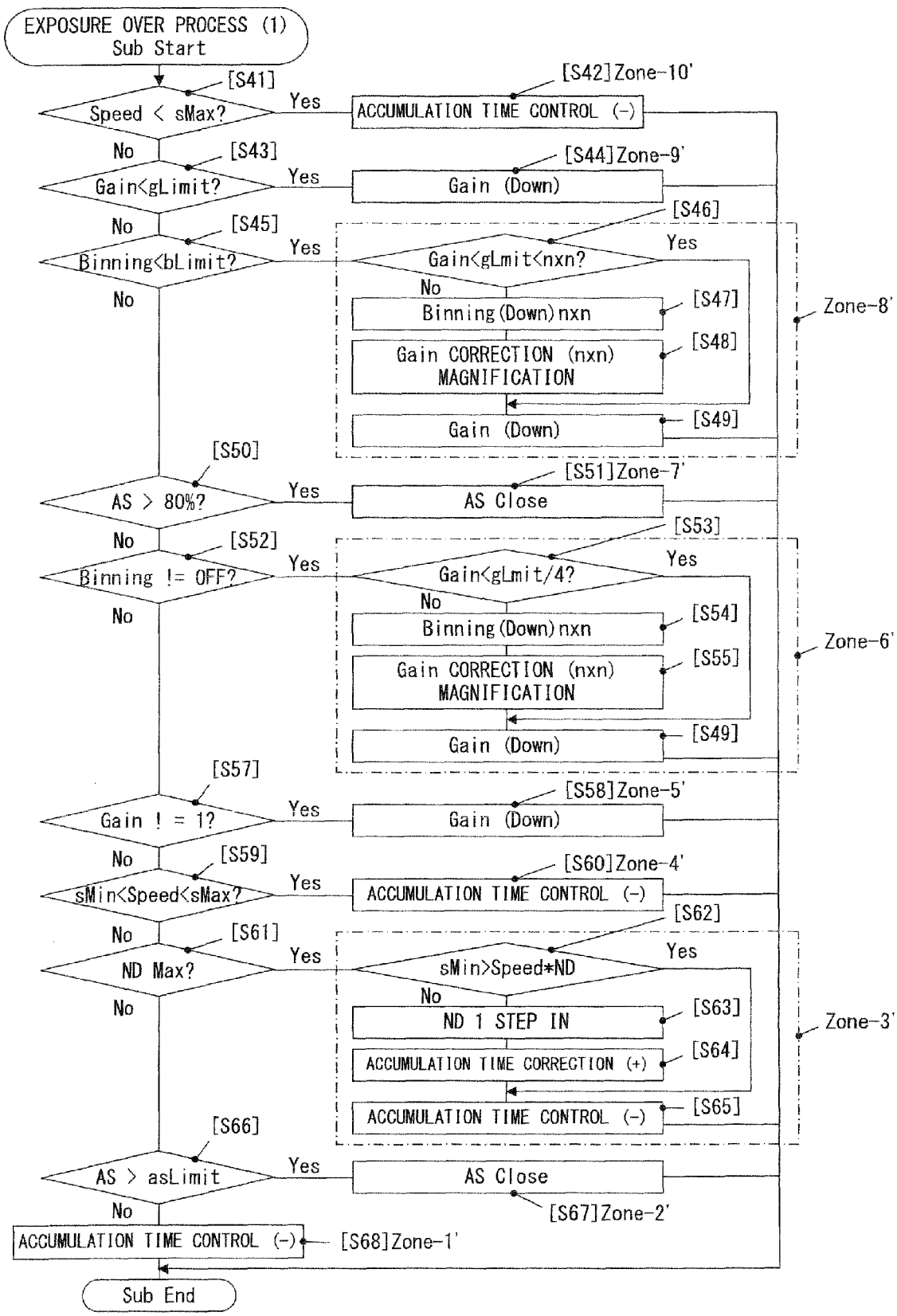
FIG. 18 is the flowchart of the process in the first preferred embodiment (process in the case of Over exposure at the time of bright field observation).

FIG. 18 is the flowchart of the process in the first preferred embodiment (process in the case of Over exposure at the time of bright field observation). In the case of Over exposure process (1), adjustment parts are controlled in the reverse order of the process priority in the Under exposure process (1) (FIG. 17). Since its basic operation is the same as the Under exposure process (1), only their differences are described.

(1) Accumulation Time Control [Zone-10']

Processes [S41] and [S42] are the reverse processes of [Zone-10] shown in FIG. 17. If the speed is equal to or less than [sMax], accumulation time control (−) is performed.

(2) Gain Control [Zone-9']

Processes [S43] and [S44] are the reverse processes of [Zone-9] shown in FIG. 17. If a gain equal to or more than [gLimit] is applied, the gain is reduced down to [gLimit].

(3) Binning Control [Zone-8']

Processes [S45] through [S49] are the reverse processes of [Zone-8] shown in FIG. 17. If binning control more than necessary is applied, the process of reducing the number of binning down to [bLimit] is performed. However, in this case, a determination value being a control reference differs from that shown in FIG. 17. In the case of reducing binning, if exposure is attempted to be linearly adjusted after reducing binning, a correction work [S47] by another adjustment unit is needed. Therefore, the determination must be made with taking an operation after correction into consideration.

In the case of reducing binning, if it exceeds [gLimit] even when Gain correction [S47] to be adjusted later has been made, binning is left as it is and exposure is adjusted by Gain adjustment. Only when it does not exceed [gLimit] even if the Gain correction [S47] is performed, a binning-down process [S47/S48] is performed.

(4) Aperture Control [Zone-7']

Processes [S50] and [S51] are the reverse processes of [Zone-9] shown in FIG. 17. If aperture is opened more than an optimum value (80%), it must be narrowed down to 80%.

(5) Binning Control 2 [Zone-6']

Processes [S52] through [S56] are the reverse processes of [Zone-6] shown in FIG. 17. If binning is applied, the binning is reduced down to no binning. The determination process in this case is performed by taking a state after gain correction [S53] into consideration as in [Zone-8'].

(6) Gain Control 2 [Zone-5']

Processes [S57] and [S58] are the reverse processes of [Zone-5] shown in FIG. 17. If a gain is applied, the gain is reduced down to no gain.

(7) Accumulation Time Control 2 [Zone-4']

Processes [S59] and [S60] are the reverse processes of [Zone-4] shown in FIG. 17. If [Speed] is between [sMin] and [sMax], exposure is adjusted by an accumulation time control (−) process.

(8) ND Filter Control [Zone-3']

Processes [S61] through [S65] are the reverse processes of [Zone-3] shown in FIG. 17. In this case too, it is determined whether ND filter should be controlled on the basis of whether the accumulation time in the case where accumulation time is corrected after an ND filter is inserted exceeds [sMin] [S62].

(9) Aperture Control [Zone-2']

Processes [S66] and [S67] are the reverse processes of [Zone-2] shown in FIG. 17. In this case, [asLimit] is set to the Min value of the physical diameter of the transmitted light AS [6] or an arbitrary value in the range where resolution deterioration due to aperture closing can be tolerated (for example, 50%) and control is performed using the above numeric value [asLimit] as its target.

(10) Accumulation Time Control [Zone-1']

If Over exposure still continues even after the above-described adjustment are conducted, an accumulation time control (−) process [S68] is performed and exposure is adjusted.

By repeating the above-described processes shown in FIGS. 17 and 18, exposure can be converged to an appropriate range.

If the control details of [Zone-1(1')] through [Zone-10 (10')] are expressed in a program chart, it becomes, for example, the graph shown in FIG. 19.

FIG. 19 is the exposure adjustment control program chart at the time of bright field observation in the first preferred embodiment. The horizontal axis is the exposure time in the case of no control.

Speed [L1] is a line indicating the displacement of the accumulation time of the CCD [36] and its vertical axis is [J1].

Gain [L2] is a line indicating the displacement of the amplification factor (gain) of the AMP [39] and its vertical axis is [J2].

Binning [L3] is a line indicating the displacement of the state of the CCD [36] under binning control and its vertical axis is [J3].

ND [L4] is a line indicating the ND insertion state of the transmitted light ND filter group [3] and its vertical axis is [J4].

[L5] is a line indicating the aperture state displacement of the transmitted light AS[6] and its vertical axis is [J5].

The processes of the above-described processes shown in FIGS. 17 and 18 are performed in relation to each of [Zone-1 (1')] through [Zone-10(10')] and exposure is adjusted.

(In the Case of Fluorescence Observation)

Next, the process in the case where the current observation method of a microscope is fluorescence observation is described. Back to step [S8] shown in FIG. 13, when the observation method is an FL mode, a fluorescence process [S10] (FIG. 16) is performed.

Figure 16:
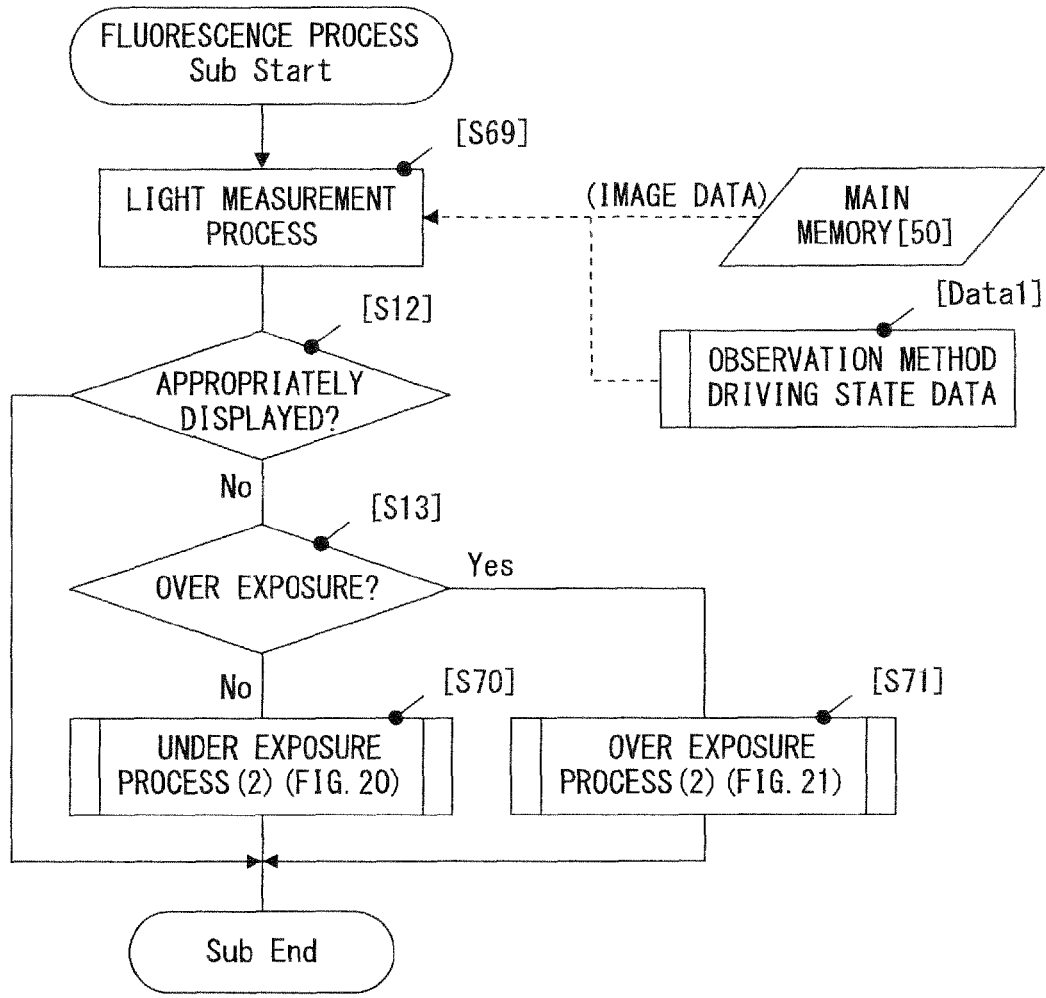
FIG. 16 is the flowchart of the process in the first preferred embodiment (process at the time of fluorescence observation).

FIG. 16 is the flowchart of the process in the first preferred embodiment (process at the time of fluorescence observation). The same step reference numerals are attached to the same processes as in FIG. 15 and their descriptions are omitted.

Firstly, as in FIG. 15, a light measuring process [69] is applied to the latest image data. As to the light measuring operation, this time, it is performed in an FL mode.

[FL mode] is a light observation method suitable for the case where a background is very dark against an observation part and the brightness difference between the observation part and the background is large. [FL mode] is the most suitable measuring method for fluorescence observation, in which an operation is performed taking into consideration the distribution and intensity of fluorescence color development.

The light measuring operation result and the light measurement reference value are compared. In the case of "light measuring operation result=the light measurement reference value", since the current exposure control is optimum, the fluorescence process (FIG. 16) is terminated without performing any process and the flow returns to the higher-order function (program that has called up this process (FIG. 16)).

As in FIG. 15, when a certain range is set to the light measurement reference value too, the above-described equations hold true for a process of determining whether the light measurement reference value is within the range.

In the case of "light measuring operation result≠the light measurement reference value", it is determined whether the light measuring operation result is Over/Under exposure [S13].

(In the Case of Fluorescence Observation and Under Exposure)

If the light measuring operation result is smaller than the light measurement reference value, an Under exposure process (2) [S70] (FIG. 20) is performed since exposure is insufficient.

Figure 20:
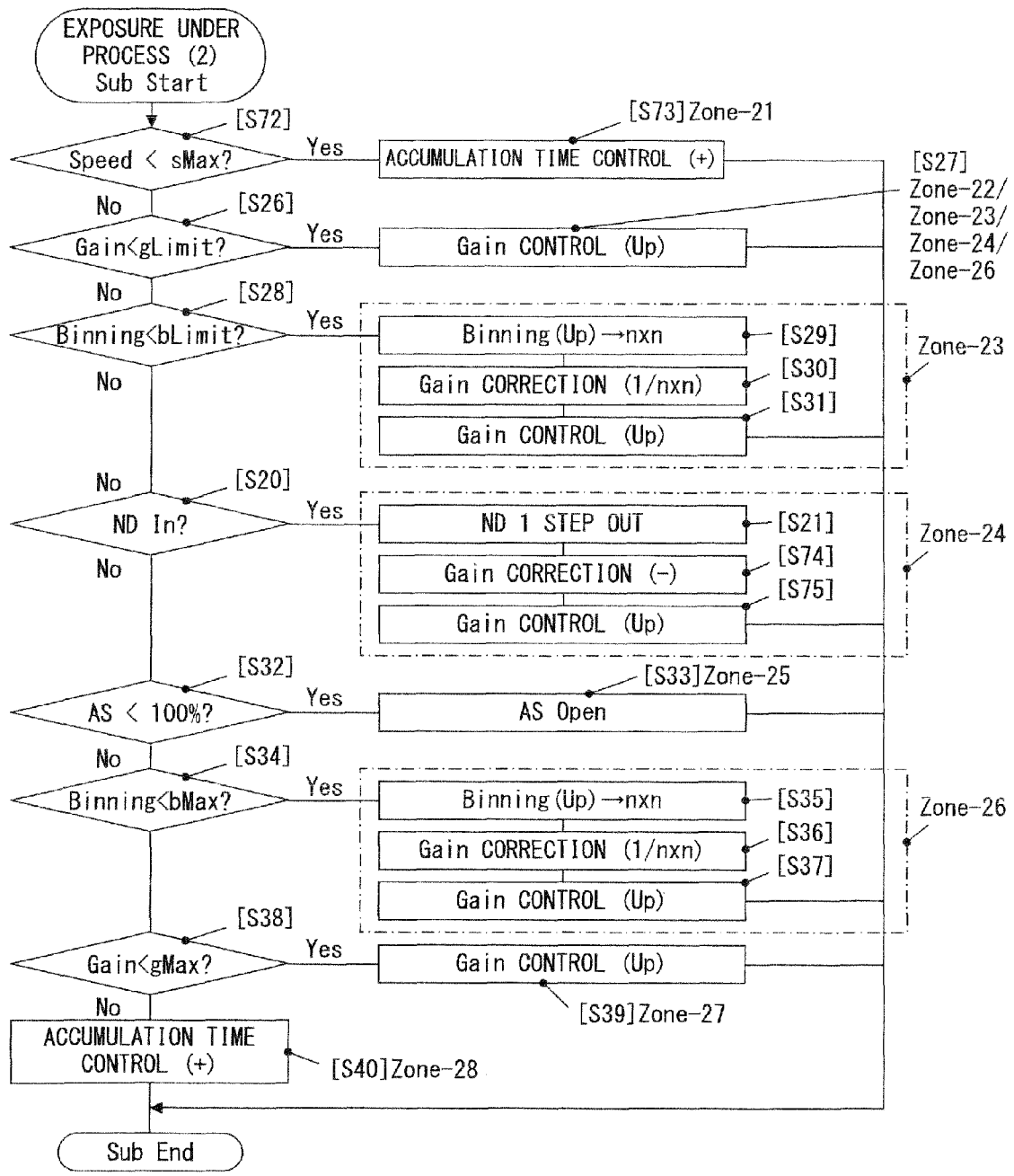
FIG. 20 is the flowchart of the process in the first preferred embodiment (process in the case of Under exposure at the time of fluorescence observation).

FIG. 20 is the flowchart of the process in the first preferred embodiment (process in the case of Under exposure at the time of fluorescence observation). Its description is made below with reference to FIG. 20.

Figure 22:
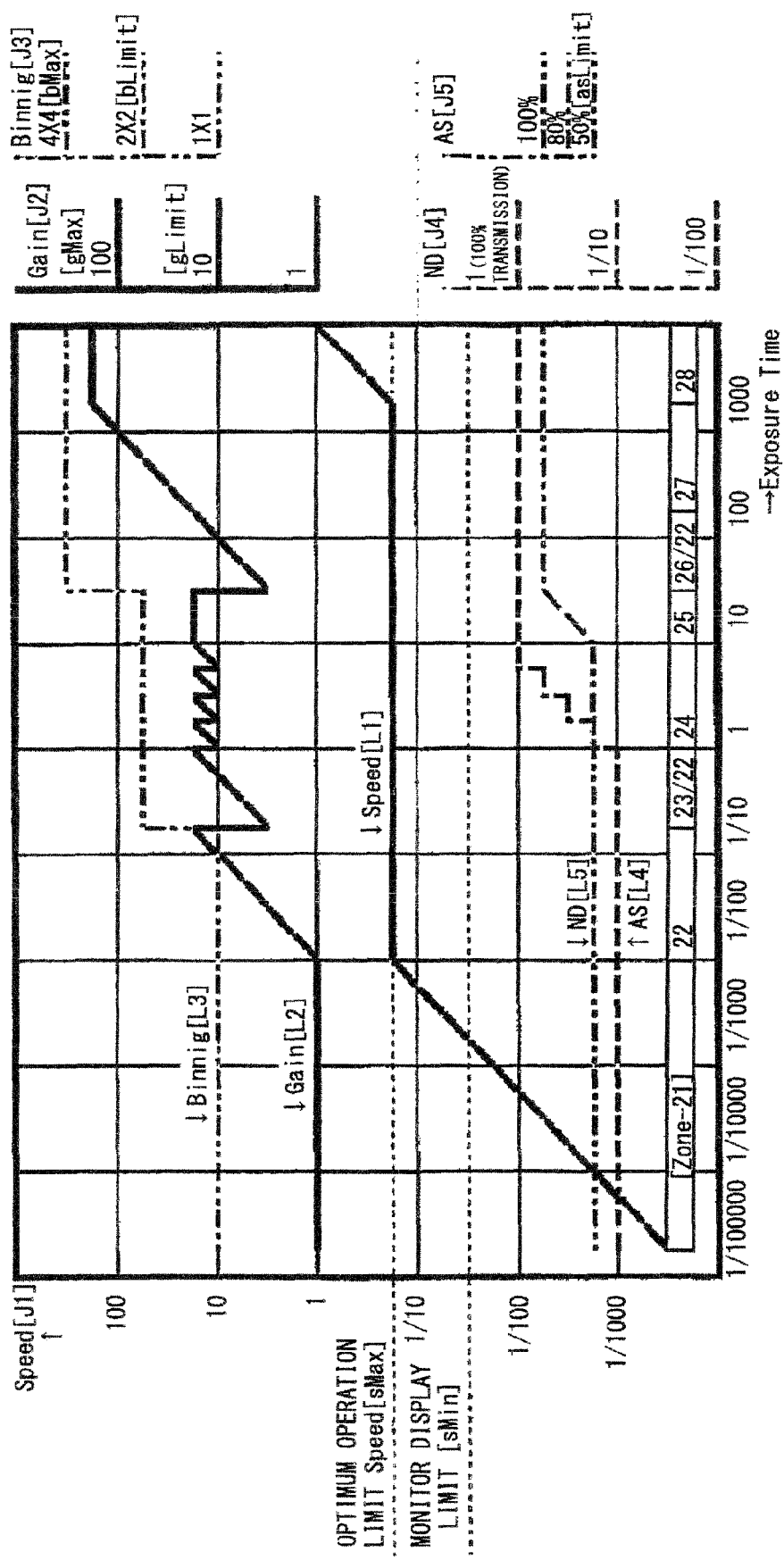
FIG. 22 is the exposure adjustment control program chart at the time of fluorescence observation in the first preferred embodiment.

In the case of fluorescence observation, it is important to control in such a way as not to apply excitation light (reflected illumination light source [17]) to the observation specimen [9] as much as possible. In fluorescence light, the radiation of fluorescence light by excitation light may change due to the radiation time (intensity) of illumination light and the amount of radiation decreases (hereinafter called fading). Therefore, observing while suppressing excitation light as much as possible is the key to the prevention of fading. Therefore, the priority order of controlling the exposure adjustment parts differs from that in bright field observation. Specifically, the priority of the ND control and aperture control of illumination light is lowered and the control is performed according to a program chart as shown in FIG. 22. The same reference numerals are attached to the same processes as in FIG. 17 and their descriptions are omitted.

(1) Accumulation Time Control [Zone-21]

Exposure is adjusted by only accumulation time control until accumulation time reaches [sMax]([S72] and [S73]).

(2) Gain Control [Zone-22]

Exposure is adjusted by gain amplification until gain reaches [gLimit]([S26] and [S27]).

(3) Binning Control [Zone-23]

Exposure is adjusted by binning control until binning reaches [bLimit]([S28] through [S31]).

(4) ND Control [Zone-24]

In FIG. 17, when performing ND control, its correction is made by accumulation time control. However, in this process, the correction processes [S74] and [S75] are performed by gain control. In the case of a fluorescence mode, when this process is performed, gain has already reached [gLimit] and noise can be reduced in synchronization with the correction. Therefore, priority is given to this correction by gain control.

In this case, the process contents are the same as [S20] and [S21]. However, the control target part of the microscope control unit [34] is changed to the reflected light filter group [19].

(5) Aperture Control [Zone-25]

If aperture is narrowed, the aperture is opened up to 100% ([S32] and [S33]). As in ND control, the process contents are the same as those of [S32] and [S33] shown in FIG. 17. However, the control target part of the microscope control unit [34] is changed to the reflected light AS [23].

(6) Binning Control 2 [Zone-26]

Binning control is performed until binning reaches [bMax] ([S34] through [S37]).

(7) Gain Control 2 [Zone-27]

Gain is increased until gain reaches [bMax].

(8) Accumulation Time Control [Zone-28]

If exposure cannot be completely adjusted even when the above-described parameters are controlled and all adjustment parts are adjusted, accumulation time is adjusted again in order to provide an observable condition although operability is damaged.

(In the Case of Fluorescence Observation and Over Exposure)

Similarly, if the current light measuring operation result is larger than the light measurement reference value, an Over exposure process (2) [S71] (FIG. 21) is performed since exposure is excessive.

Figure 21:
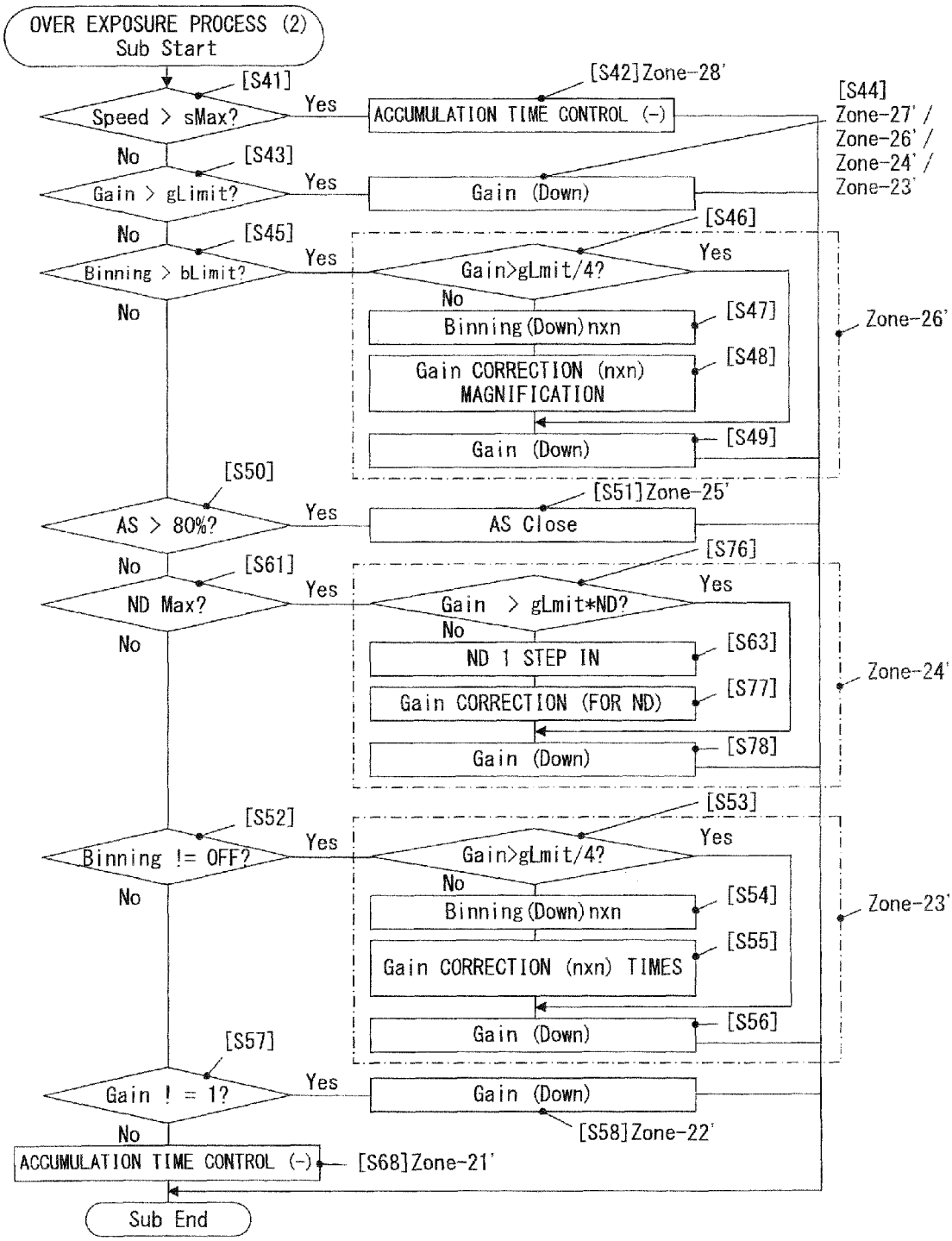
FIG. 21 is the flowchart of the process in the first preferred embodiment (process in the case of Over exposure at the time of fluorescence observation).

Along each zone number described on the upper horizontal axis of the program chart shown in FIG. 22 (in the reverse priority of that shown in FIG. 20), the process shown in FIG. 21 is performed and exposure is adjusted. In FIG. 21, it is checked whether gain exceeds [gLimit] when ND filter for one step is inserted.

Next, back to FIG. 13, the display-mode switching process in the case where the observation method is changed is described.

It is currently assumed that the BF button [81] or FL button [82], shown in FIG. 11 is selected and the observation method is switched by the process shown in FIG. 12. Then, the fact that the observation method is switched is recognized by the state of observation method driving state data [Data 1].

When the observation method is switched, the display mode of a currently displayed observation image must also be switched. Therefore, a display mode changing process [S7] (FIG. 14) is performed. The process is described below with reference to FIG. 14.

Figure 14:
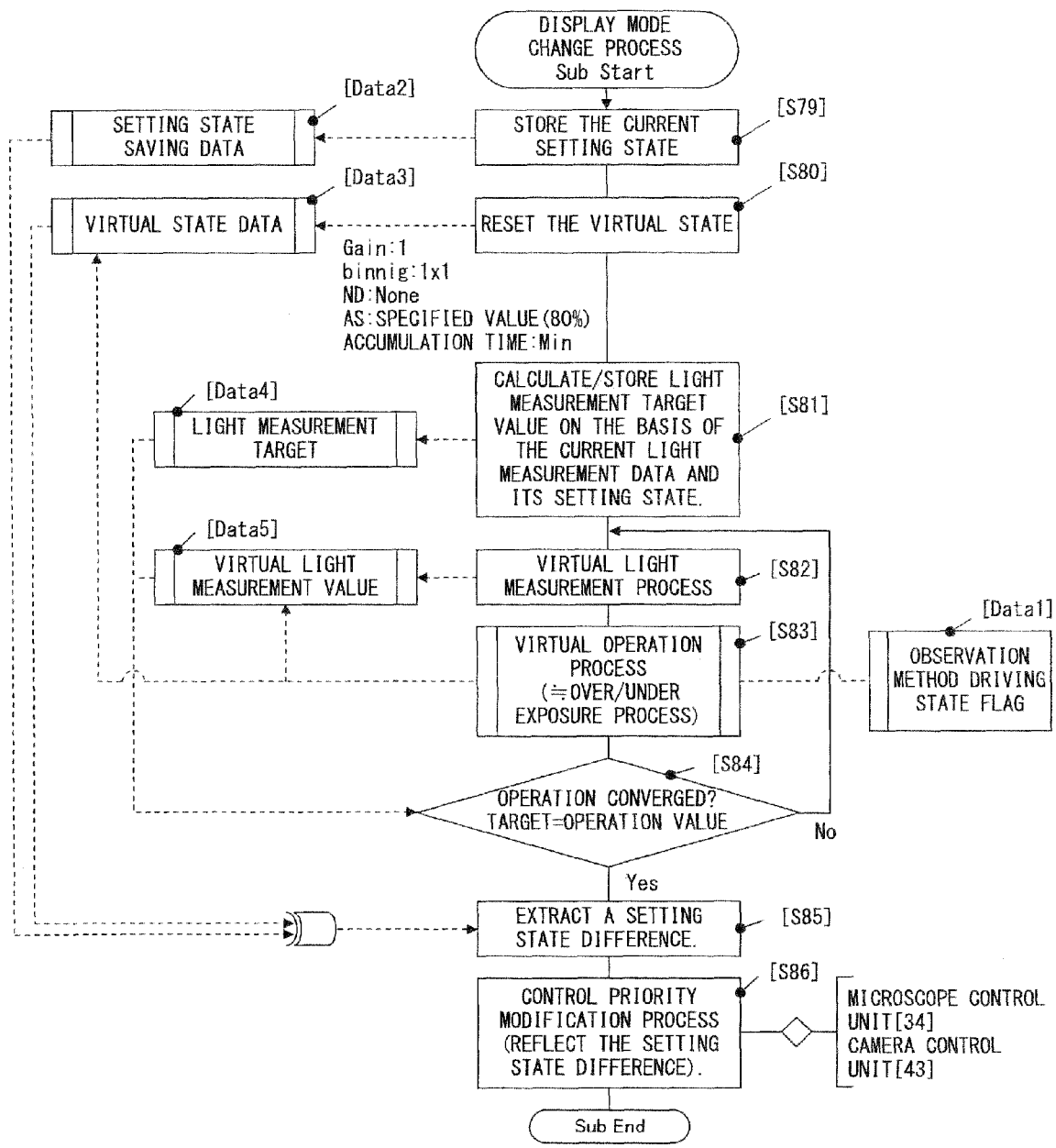
FIG. 14 is the flowchart of the process in the first preferred embodiment (display mode changing process).

FIG. 14 is the flowchart of the process in the first preferred embodiment (process in the case of Under exposure in fluorescence observation). The system control unit [44] temporarily stores the states of the currently set exposure adjustment parts (Table 8) in the main memory [50] or the HDD [49] (setting state saving data [Data2]).

TABLE 8

| Adjustment item | Setting value |
| --- | --- |
| Gain | 2× |
| Binning | 2 × 2 |
| ND | 50% |
| AS | Optimum value (100%) |
| Accumulation time | sMax |

Then, virtual state data [Data3] is reset. For example, as shown in Table 9, the virtual state data [Data 3] has the same items as the saving data [Data2] (Table 8).

TABLE 9

| Adjustment item | Setting value |
| --- | --- |
| Gain | 1× |
| Binning | 1 × 1 |
| ND | None |
| AS | Optimum value (80%) |
| Accumulation time T | Target value |

This virtual state data [Data3] is used when performing a virtual operation process [S83], which is described later.

Then, the current light measurement data is obtained from the setting state (setting state saving data [Data2]). A light measurement target value used for the light measuring operation is calculated on the basis of the setting state saving data ([Data2][S81]) and is stored [Data4].

For example, an accumulation time which is calculated when setting the current setting (Table 8) to the parameter setting shown in Table 9 is acquired. When changing gain from 2× to 1×, double accumulation time becomes necessary. Therefore, accumulation time T becomes 2*[sMax] Similarly, accumulation time becomes four times in the binning process and double when an N) is removed. As a result, the light measurement target value becomes 16*[sMax].

A virtual operation process is performed in order to make this light measurement target value optimum according to the priority of adjustment parameters in the altered observation method [S82] through [S84].

The virtual operation process [S83] is the same as those in FIGS. 17 and 18 or FIGS. 20 and 21 to compute the exposure adjustment in the changed observation method. This is performed assuming that the virtual state data [Data3] is a device, without controlling actual devices. A virtual operation is performed while updating the data of the virtual state data [Data3].

After the result of the virtual operation process [S83] is converged and the state of a device to be set is determined, the difference between the stored setting state saving data [Data2] and the virtual state data [Data3] is extracted [S84]. Then, adjustment parts whose setting values need to be changed are extracted [S85].

Lastly, the modification of the adjustment parts list that are extracted in [S85] are reflected by controlling the microscope control unit [34] and the camera control unit [43].

Thus, the modification process [S86] of the priority of the control parts when the observation method is switched is completed.

By controlling attaching different priority to the control order of exposure adjustment parts according to an observation method as above, an optimum observation image can be displayed according to an observation purpose. Therefore, a microscope observation system which is superior in operability and visibility can be provided.

According to this preferred embodiment, it is determined whether the brightness of an observation image is due to appropriate exposure in each of a bright field observation method and a fluorescence observation method. If exposure is not appropriate, as to the microscope side an ND filter and aperture size (AS) are controlled, and as to the camera side the charge accumulation time of the CCD and binning are controlled. Thus, an optimum observation state can be obtained.

The Second Preferred Embodiment

Next, the second preferred embodiment of the present invention is described. In this preferred embodiment, the optimization of a microscope and a camera when displaying observation images in a high quality mode is described. Namely, in this preferred embodiment, exposure adjustment parts that cause image quality deterioration are excluded from its control targets. Furthermore, in this preferred embodiment, priority is given to observation with high image quality even if operability is somewhat sacrificed. Therefore, a limit [sMax2] which is slower by one step than a comfortable operation limit [sMax] is provided and control is performed.

The basic configuration of this preferred embodiment is the same as the first preferred embodiment shown in FIGS. 1 through 3. However, the process contents of the system control unit differ from those of the first preferred embodiment.

Figure 24:
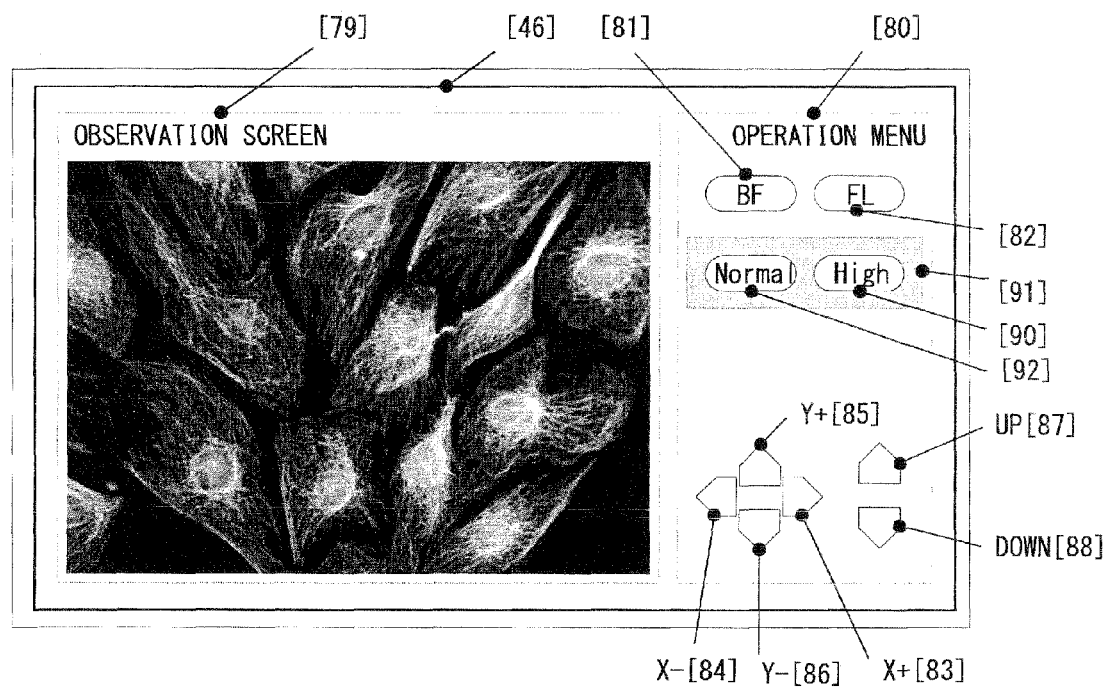
FIG. 24 shows one example of the screen structure of the display unit [46] in the second preferred embodiment.

FIG. 24 shows one example of the screen structure of the display unit [46] in the second preferred embodiment. In addition to the configuration shown in FIG. 11, the image quality selection menu [91] for images displayed on the observation screen [79] is provided.

The image quality selection menu [91] is provided with a Normal button [92] for displaying images by the method described in the first preferred embodiment and a High button [93] for displaying images with high image quality. Since the other components are the same as those shown in FIG. 11, the same reference numerals as in FIG. 11 are attached to them and their descriptions are omitted.

Next, its operation is described. If the Normal button [92] is selected, an image display process is applied to the observation screen by the method described in the first preferred embodiment. Now, the operation in the case where the High button [93] is selected and the mode is switched to a high image quality display mode is described below.

As to the switching procedures to a high image quality display mode, the mode can be switched by switching the control priority of exposure adjustment by the same method as that at the time of observation method switching. Processes applied then are performed according to the flowcharts shown in FIGS. 25 and 26.

Figure 25:
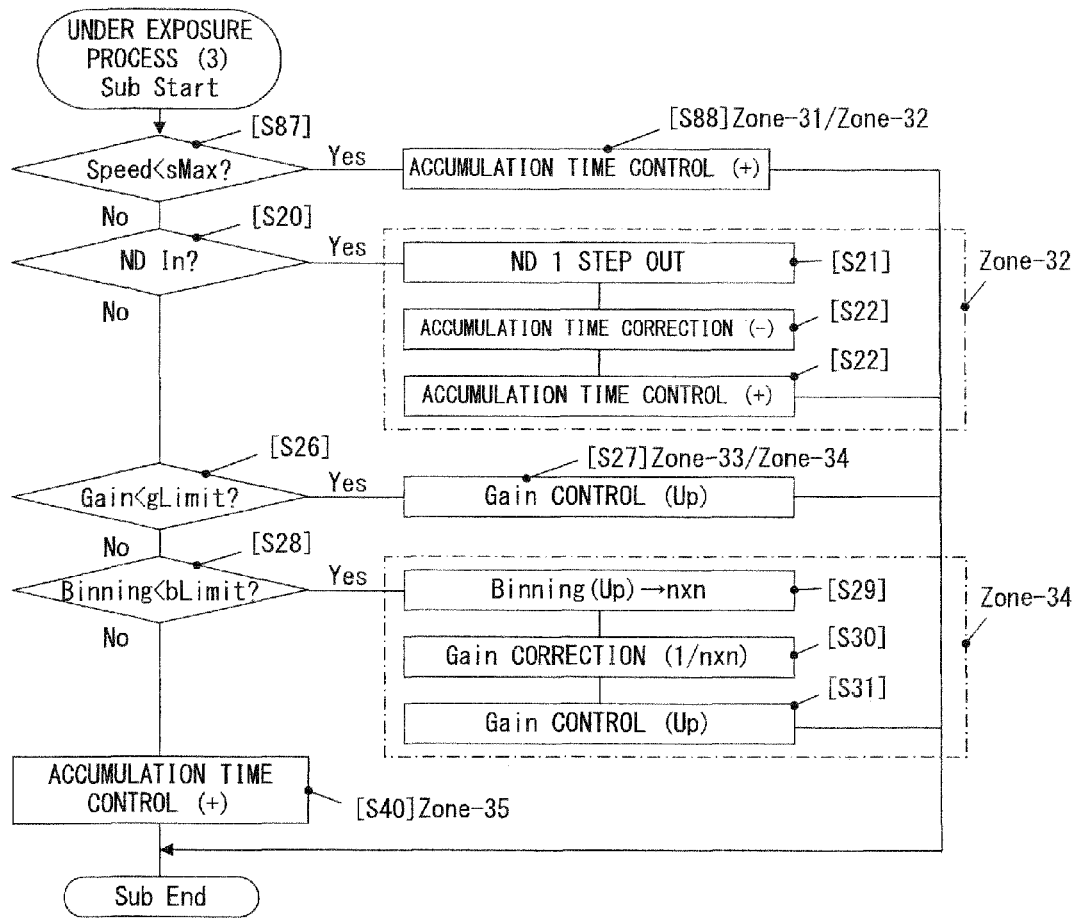
FIG. 25 is the flowchart of the process in the second preferred embodiment (process in the case of Under exposure in a High image quality mode).
Figure 26:
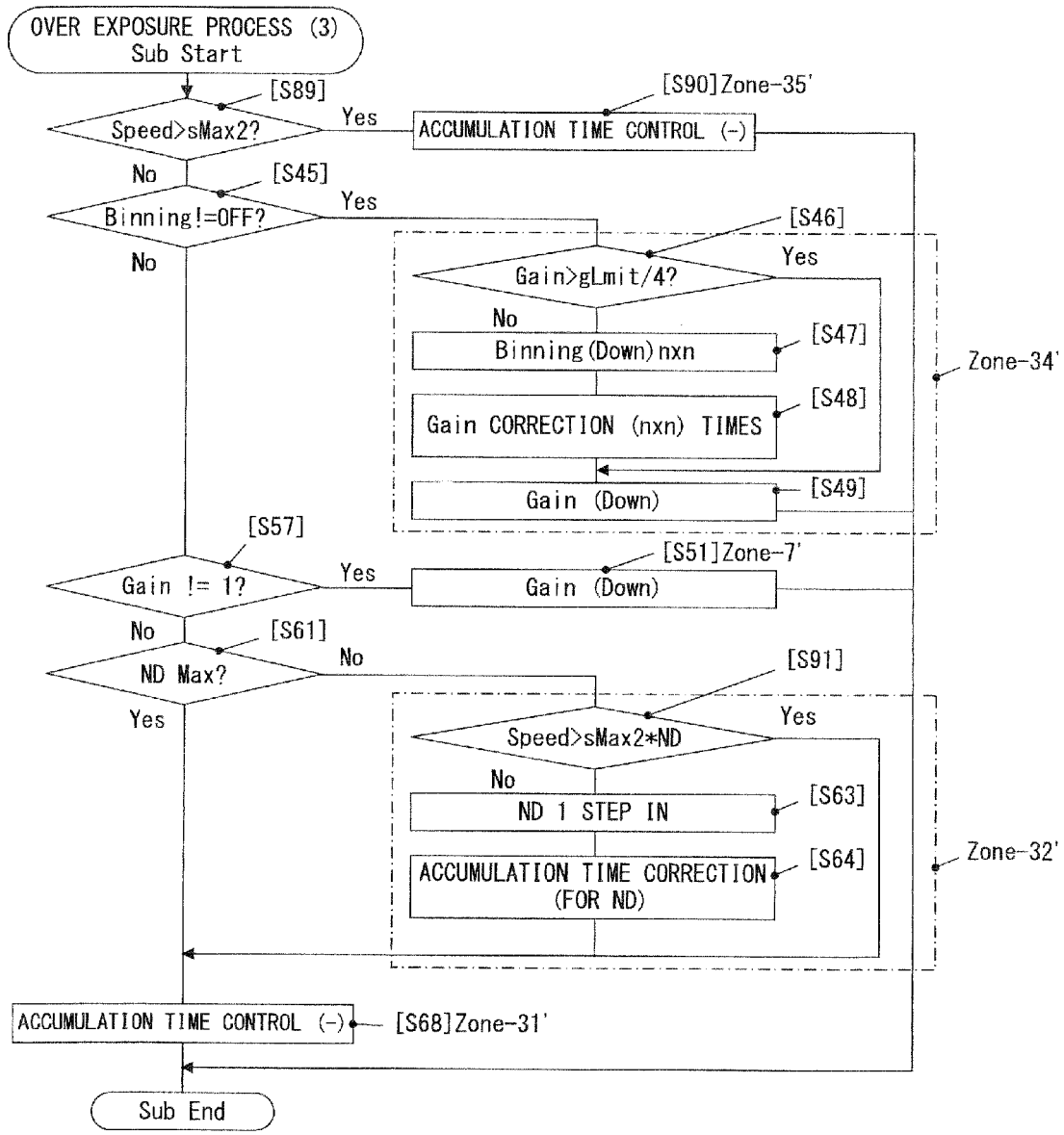
FIG. 26 is the flowchart of the process in the second preferred embodiment (process in the case of Over exposure in a High image quality mode).

In this embodiment the processes shown in FIGS. 17 and 18 or FIGS. 20 and 21 are replaced with those shown in FIGS. 25 and 26, respectively.

In the first preferred embodiment, those shown in FIGS. 17 and 18 were replaced with those shown in FIGS. 20 and 21, respectively. In this preferred embodiment, the process contents are modified as a system, as shown in Table 10.

TABLE 10

|  | BF mode |  | FL mode |
| --- | --- | --- | --- |
| Normal | FIGS. 17/18 | ⇔ | FIGS. 20/21 |
| High |  | FIGS. 25/26 |  |

The process of a High mode (FIGS. 25 and 26) is described below.

FIG. 25 is the flowchart of the process in the second preferred embodiment (process in the case of Under exposure in a High mode).

In the High mode, the priority of exposure adjustment parts that causes the deterioration of image quality is lowered or a Limit is provided for its control range, and the process is performed. In particular, in many cases, aperture (transmitted light AS [6] and reflected light AS [23]) is adjusted according to the taste of an observer and has much effect on the change of image quality. Therefore, aperture is excluded from its control targets and no control is performed.

Since it is aimed to be able to observe images with high image quality even if operability is somewhat deteriorated, a limit [sMax2] which is slower by one step than a comfortable operation limit [sMax] is provided and control is performed. [sMax2] is technically specified as the speed at which the operability becomes almost lost if it is set to approximately 4 [fps]. Therefore, in this preferred embodiment, [sMax2] is set as 4[fps] ([sMax2]=4[fps]).

The control priority is described below. Since the operation of each part is the same as that shown in FIG. 17, the same reference numerals are attached to the same parts and their descriptions are omitted.

(In the Case of High Mode and Under Exposure)
(1) Accumulation Time Control [Zone-31]

Before accumulation time reaches [sMax2], adjustment parts that deteriorate image quality are not controlled and exposure is adjusted only by accumulation time control ([S87] and [S88]).

(2) ND Control [Zone-32]

If an ND is inserted, it is removed from the transmitted illumination light path [LP1] or the reflected illumination light path [Lp2] and exposure is adjusted ([S20] through [S32]).

(3) Gain Control [Zone-33]

Until gain reaches [gLimit], exposure is adjusted by gain amplification ([S26] and [S27]).

(4) Binning Control [Zone-34]

Until binning reaches [bLimit], exposure is adjusted by binning control ([S28] to [S31]).

(5) Accumulation Time Control [Zone-35]

Items that can be essentially adjusted any time (control of [bLimit] through [bMax]/[gLimit] through [gMax]/aperture, etc.) are left unadjusted. Aperture is a control target. However, since the other items greatly deteriorate image quality, they are not controlled. Thus, since then, control is performed by adjusting accumulation time [S40].

(In the Case of High Mode and Over Exposure)

As to an Over exposure process, as in the first preferred embodiment, exposure is adjusted in the reverse control order of that of Under exposure.

Figure 27:
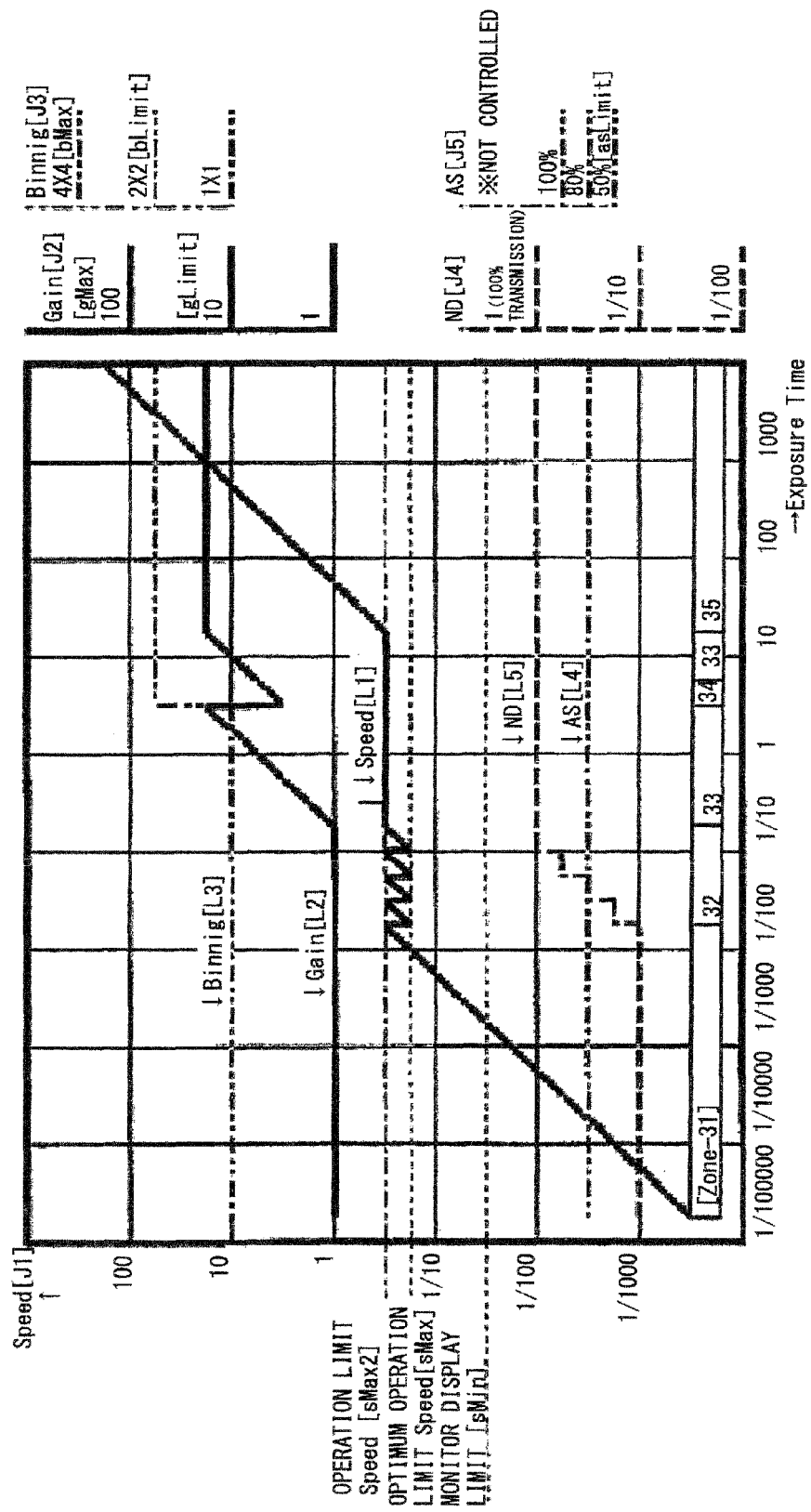
FIG. 27 is the exposure adjustment control program chart in a High image quality mode of the second preferred embodiment.

FIG. 26 is the flowchart of the process in the second preferred embodiment (process in the case of Over exposure in a High mode). Processes ([Zone-35'] through [Zone-31'] are performed according to the flowchart shown in FIG. 26. Control is applied to each zone according to the program chart shown in FIG. 27.

By the above-described operation, besides the display mode set by the observation method in the first preferred embodiment, means by which the observer can select a display mode in person depending on the operation purpose of the observer and the type of the observation specimen [9] are provided. Thus, a microscope observation system whose operability is higher can be provided and can handle many types of observation specimens [9], thereby leading to the throughput improvement to the research result of the observer.

The Third Preferred Embodiment

In this preferred embodiment, control by lowering the priority of operating a mechanism in which brightness changes discontinuously such as ND filters and the like and a mechanical driver unit that takes time in its switching/modifying operations in the light-amount adjustment of an observation image in the case where a stage operation is manually made is described.

Figure 28:
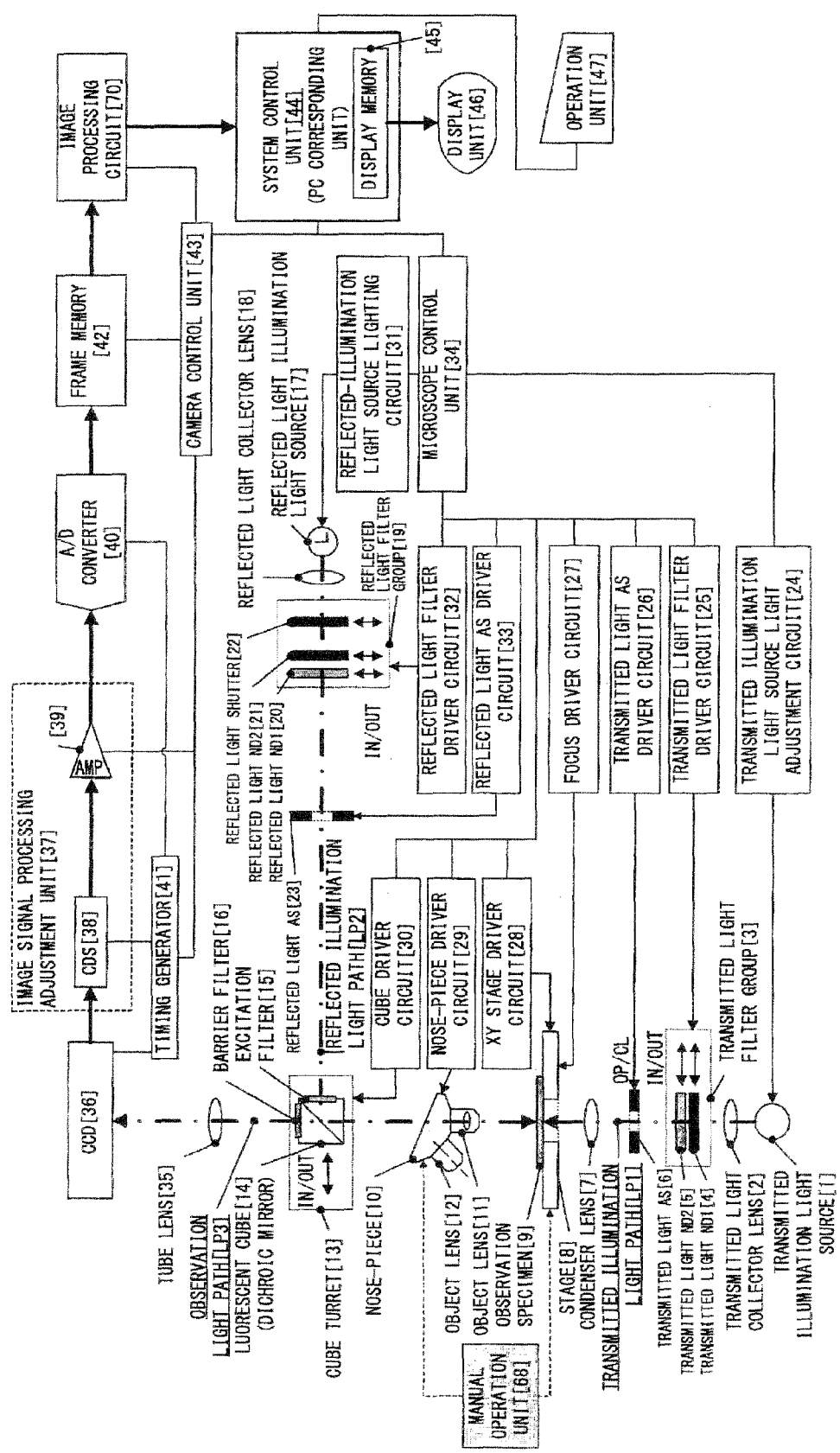
FIG. 28 shows the basic configuration of the third preferred embodiment.

FIG. 28 shows the basic configuration of the third preferred embodiment. As shown in FIG. 28, the basic configuration of this preferred embodiment is similar to that shown in FIG. 1. However, in this preferred embodiment, a nosepiece position detection unit [66] and a stage operation detection unit [67] are provided instead of the nosepiece driver circuit [29] and the XY stage driver circuit [28] shown in FIG. 1, respectively. Further more, this preferred embodiment is operated by a manual operation unit [68] which is operated by an observer directly touching a driver unit, instead of the operation unit [27] of the system control unit [44].

When an observer operates the microscope on the manual operation unit [68], for example, operates the stage [8] in the XY direction, the stage operation detection unit [67] detects that the stage has been operated. Then, the microscope control unit [34] notifies the system control unit [44] of its state.

The third preferred embodiment is characterized in that the system control unit [44] switches a display mode on the basis of this driving state of the microscope observation system. For example, it is realized by adding the processes [92] through [97] shown in FIG. 29 to the flowchart shown in FIG. 15.

When the microscope observation system is in a static state (nothing is operated), processes are performed in the order of [S11]→[S12]→[S13]→[S14] or [S15] to perform the same process as shown in FIG. 15.

Then, the operation in the case where the manual operation unit [68] or the X+ button [83]/X− button [84]/Y+ button [85]/Y− button [86] or UP button [87]/DOWN button [88] on the operation MENU [80] shown in FIGS. 11 and 24 is specified and the stage [8] of the microscope is operated is described.

The system control unit [44] recognizes that the microscope stage is currently driven, on the basis of the observation method driving state data [Data1]. If it is currently driven, during-movement exposure processes ([S93] through [S95]) dedicated for during driving are performed.

The system control unit [44] checks whether there is saved data already [93]. The saved data is an exposure control parameter immediately prior to the microscope is operated. The contents of the saved data are the same as shown in Tables 8 and 9. When this process is repeatedly performed, a process of saving the current setting state is performed only at the first time [S94].

The saved data is temporarily stored in the main memory [50] or the HDD [49] as pre-movement setting data [Data6].

Then, the during-movement exposure process [95] (that is, the flow shown in FIG. 30) is performed. Firstly, the process is selected according to its exposure state, Over or Under.

During microscope operation it can be determined that an observer is operating while watching an observation image displayed on the observation screen [79]. In that case, when a part for discontinuously adjusting the amount of light such as an ND filter and the like is operated, the brightness of the screen rapidly changes and visibility deteriorates.

Therefore, in the third preferred embodiment, the priority of operating a mechanism whose brightness discontinuously changes such as an ND filter and the like and a mechanical driver unit that takes time in its switching/modifying operations is lowered and control is performed. Since the control operation is the same as that in the first preferred embodiment, the same step reference numerals are attached to them and their descriptions are omitted.

(Control Priority in the Case of During-Movement and Under Exposure)[S100]
(1) Gain control→(2) Accumulation time control [sMax]→ (3) Binning control→(4) AS control→(5) ND control→(6) Gain control [<gMax]→(7) Accumulation time control [>sMax]
(Control Priority in the Case of During-Movement and Over Exposure)[S101]

In the first and second preferred embodiments, the control priority of Over exposure is reverse to that of Under exposure. However, in the third preferred embodiment, even in case of Over exposure, control is performed while the priority of adjustment parts whose amount of light discontinuously changes and mechanical driving parts is left lowered, without greatly changing the priority as follows.
(1) Accumulation time control [>sMin]→(2) Gain control→ (3) Accumulation time control [<sMin]→(4) Binning control→(5) AS controls (6) ND control In this case, Min in step [S99] indicates the minimum accumulation time, that is the minimum accumulation time of the electronic shutter mode of the CCD [36].

Figure 30:
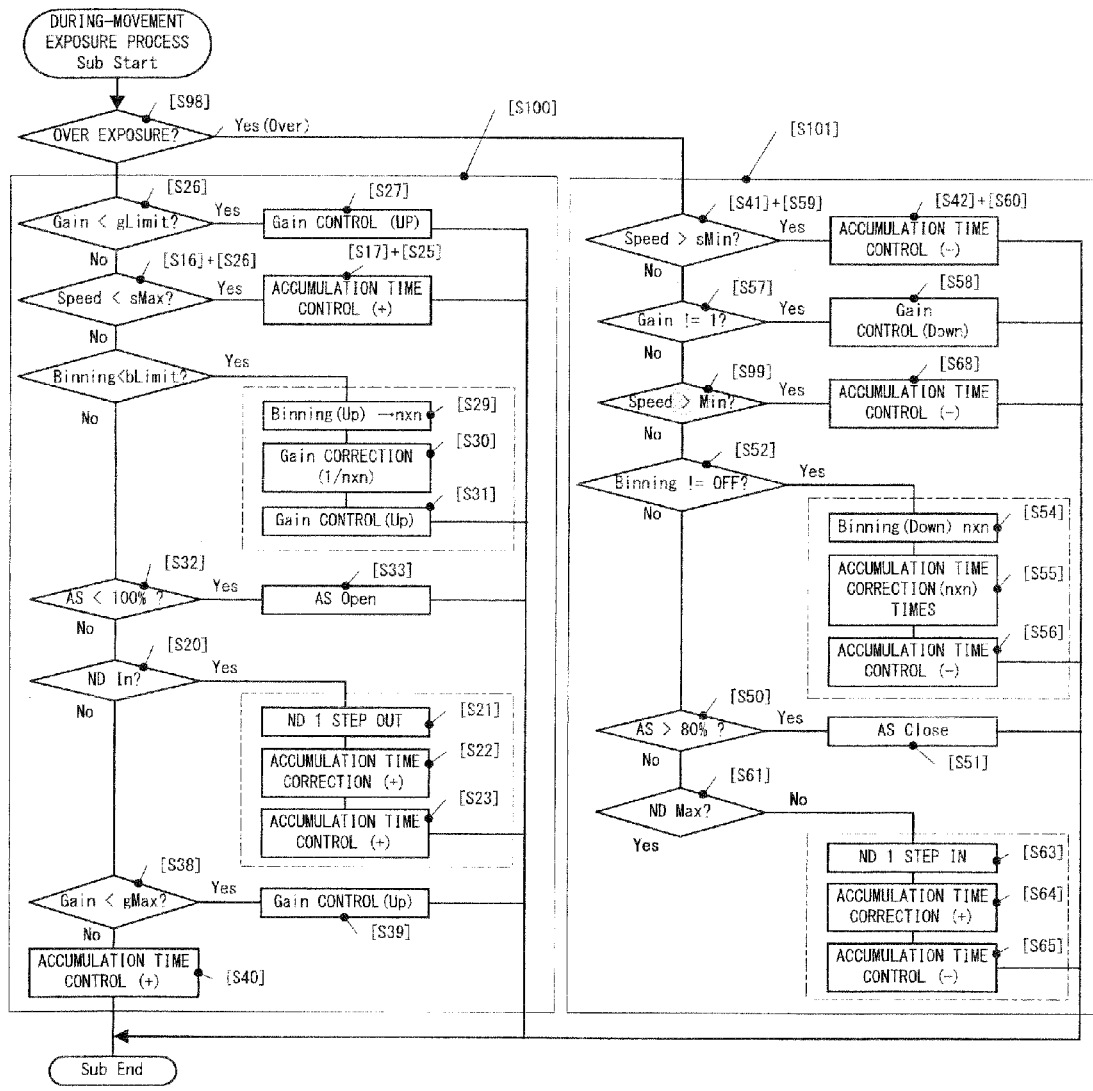
FIG. 30 is the flowchart of the process in the third preferred embodiment (process during movement).

In this way, only during the microscope operation the processes shown in FIGS. 17, 20 and 25 in the first and second preferred embodiments are replaced with [S100] shown in FIG. 30 and the processes shown in FIGS. 18, 21 and 26 are replaced with [S101] shown in FIG. 30.

Then, after the microscope operation is completed, the mode must be restored to a normal mode, that is, the optimum display mode of the current observation method or a display mode specified by the observer.

Figure 29:
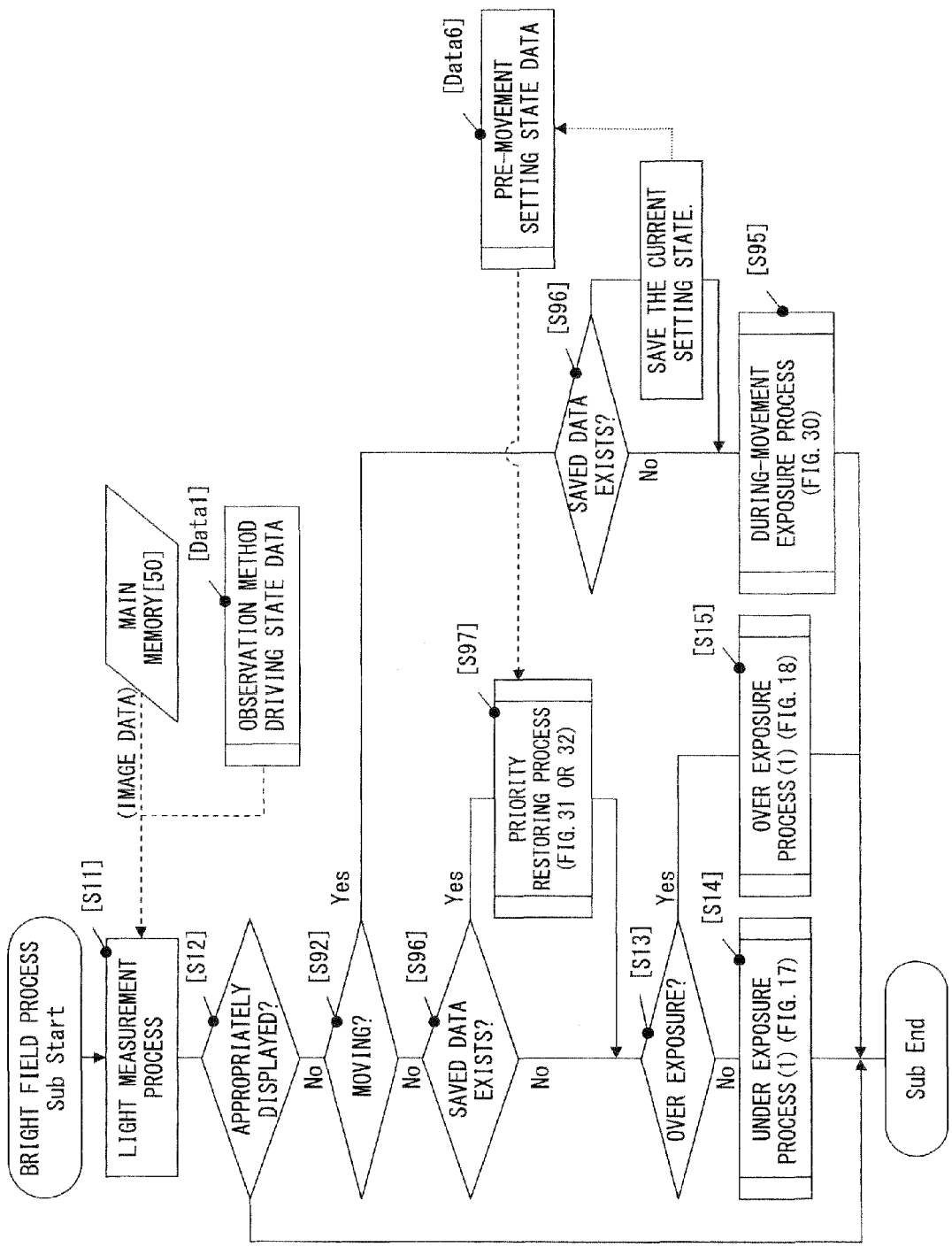
FIG. 29 is the flowchart of the process in the third preferred embodiment (process in bright field observation).

Back to FIG. 29, if the microscope (stage) is not moving in step [S92] and the saved data is being stored in step [S96], a priority restoration process [S97] (FIG. 31 or 32) is performed to optimize the display mode.

Figure 31:
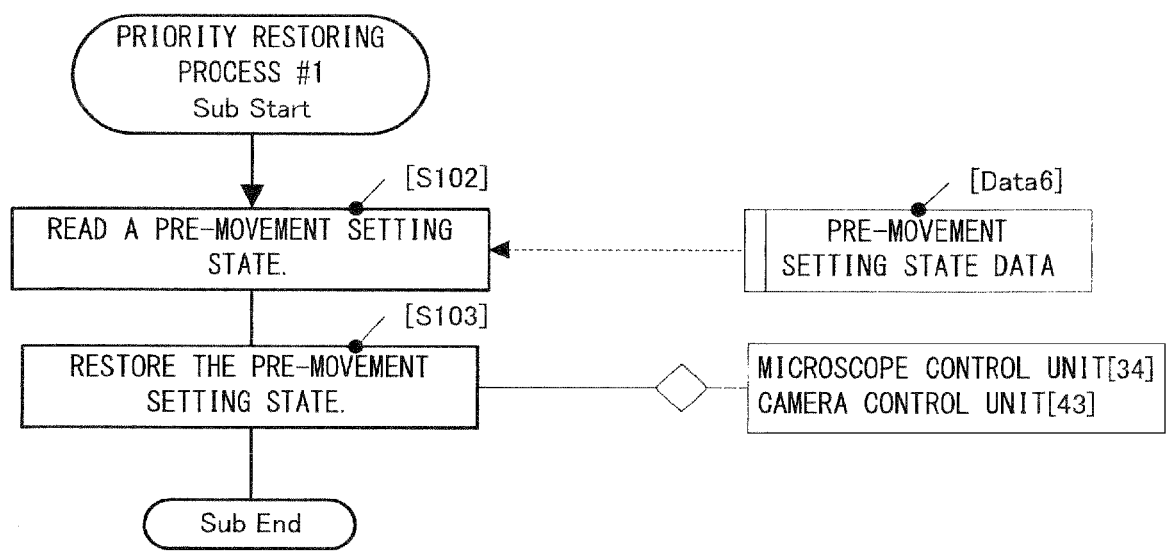
FIG. 31 is the flowchart of the process in the third preferred embodiment (priority modification process No. 1).

FIG. 31 is the flowchart of the process in the third preferred embodiment (priority modification process No. 1). The process shown in FIG. 31 is simplest. Setting state data [Data6] before the microscope (stage) moves (optimum exposure state setting data at that moment) is read in [S102] and the setting is temporarily restored to the pre-movement setting state [S103]. Then, by controlling exposure again in normal sequence in the current specimen state and observation state, control is completed with desired priority and a display state can be optimized.

Figure 32:
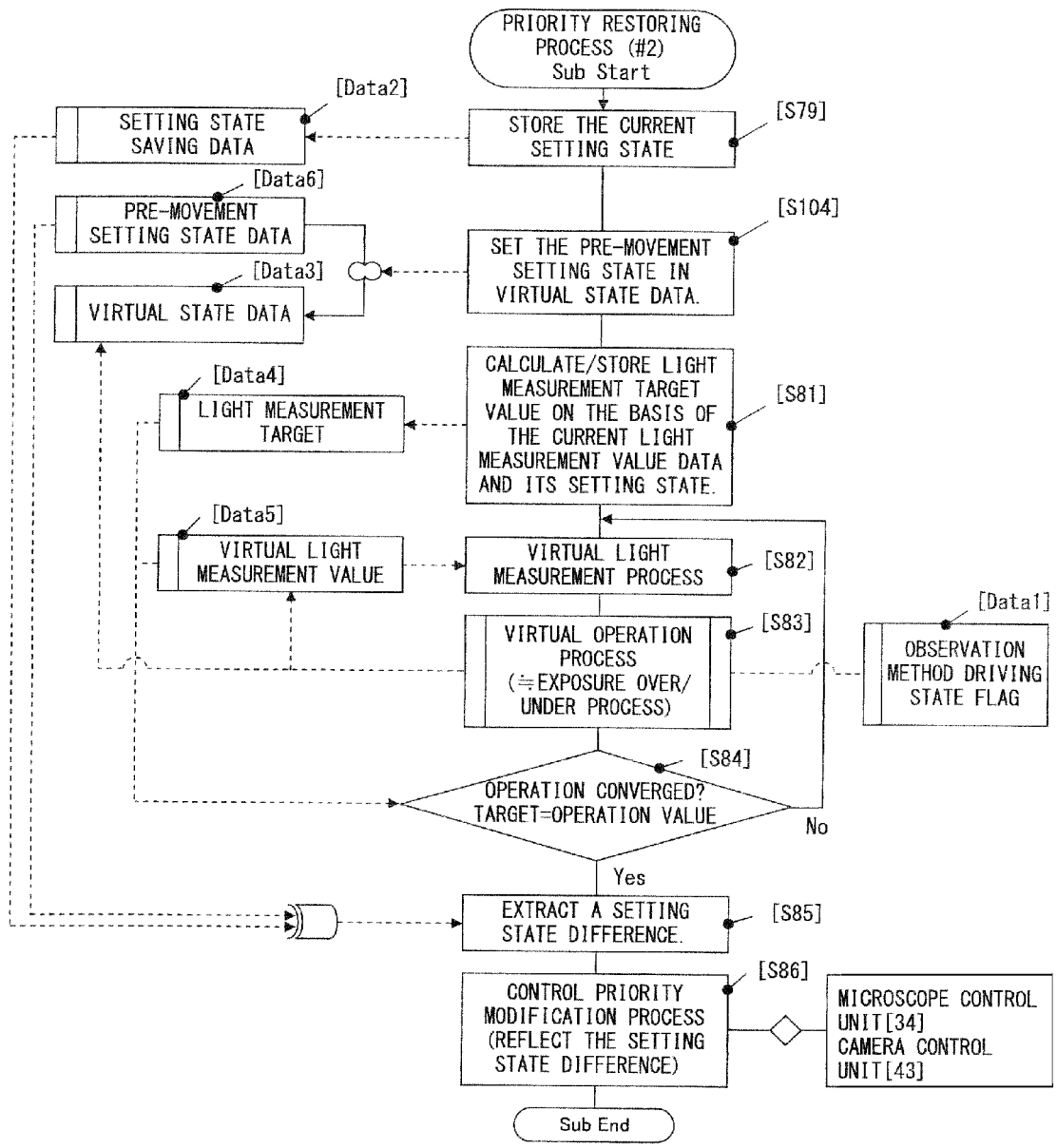
FIG. 32 is the flowchart in the third preferred embodiment (priority modification process No. 2).

Alternatively, the restoring process can be performed by the process shown in FIG. 32.

FIG. 32 is the flowchart in the third preferred embodiment (priority modification process No. 2). The process (FIG. 14) whose basic operation is almost the same as that in the case where an observation method is changed is performed. The same reference numerals are attached to the same process contents as in FIG. 14 and only their differences are described.

In [S80] shown in FIG. 14, a virtual state is reset as the initial value of the virtual state data. However, in this preferred embodiment, instead of resetting the virtual state, the pre-movement setting state data stored in [Data6] is copied [S104]. Then, the virtual operation process [S83] starts from this state and adjustment parts to be altered are extracted. Then, only the adjustment parts needed to be altered are operated and a display mode is optimized.

When performing exposure adjustment control while an operator is operating the microscope, the control priority of the control target adjustment parts is modified by the above-described operation. Thus, the rapid brightness change of an observation image displayed on the observation screen [79] can be suppressed. Thus, a display state having good visibility can be maintained and a smooth observation state can be provided.

The Fourth Preferred Embodiment

In this preferred embodiment, in addition to the above-described preferred embodiments, the light-amount adjustment of an observation image while taking transfer speed into consideration in the case where a picked-up image is transferred to the system control unit [44] is described.

Figure 33:
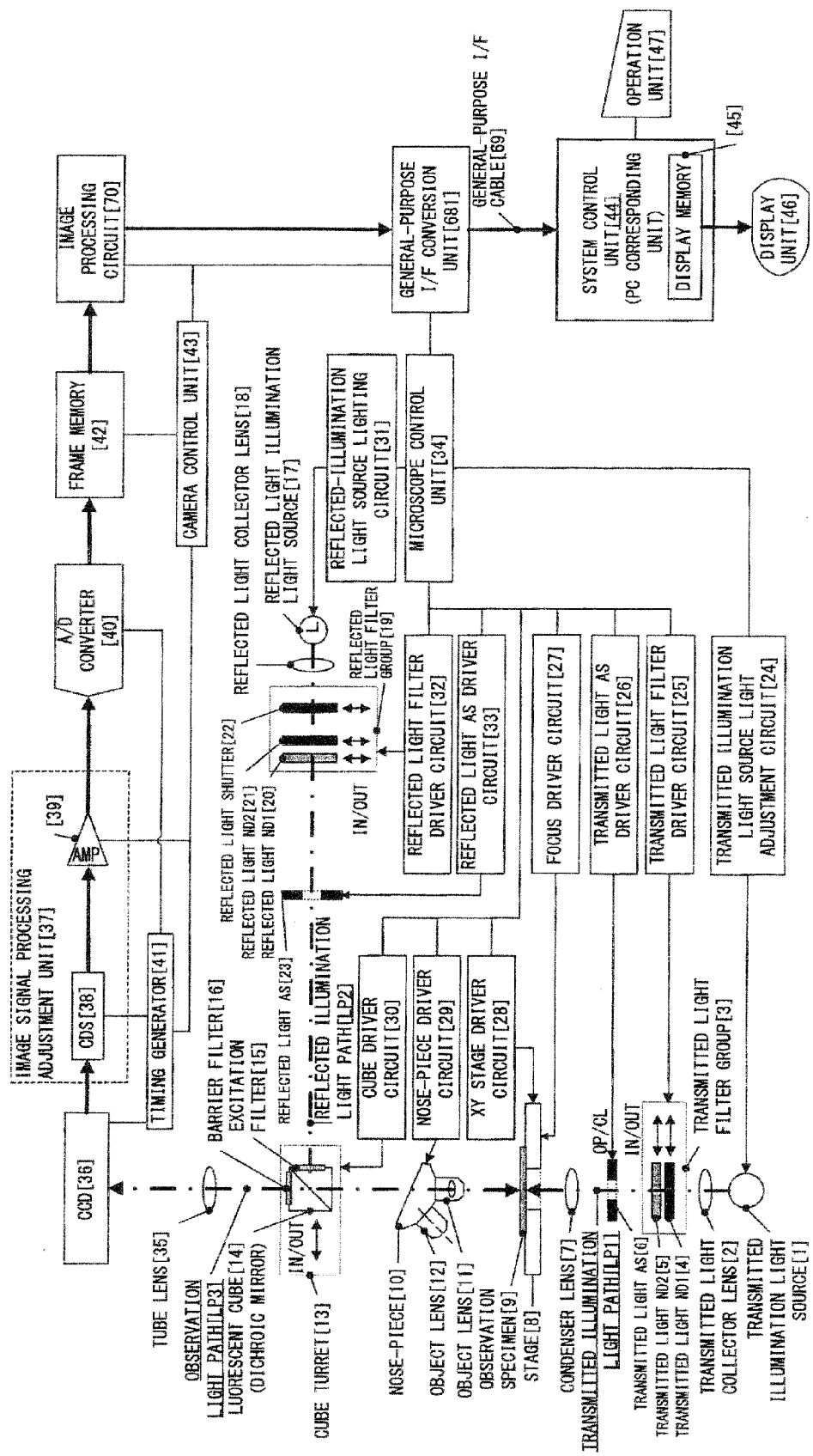
FIG. 33 shows the basic configuration of the fourth preferred embodiment.

FIG. 33 shows the basic configuration of the fourth preferred embodiment. Its microscope part and camera part are the same as those shown in FIG. 1. However, the fourth preferred embodiment differs from the above-described preferred embodiments in that a general-purpose I/F is used to transfer image data from the microscope control unit [34], the camera control unit [43] and image processing circuit [70].

The general-purpose I/F is a general communication unit used to connect components to PC, such as a well-known USB2 communication, IEEE1394 communication or the like. A general-purpose I/F conversion unit [681] is provided in order to transmit/receive data by this general-purpose I/F, and the microscope is connected to the system control unit [44] by a general-purpose I/F cable [69] via the above-described general-purpose I/F conversion unit [681].

When transmitting the data of the CCD [36] to the system control unit [44], the amount of image data becomes enormous. The general-purpose I/F has a limit in the amount of data to transmit depending on communication speed and the speed varies depending on its type. Here, the description is continued using USB2 as a general-purpose I/F.

The communication speed of USB2 is 480 Mbps, which is assumed to be [ComMax]. Actually, data cannot be transferred at its maximum speed when taking into consideration the control of a protocol, accompanied data, the communication condition of the other equipments connected to a general-use I/F. However, in this preferred embodiment, it is assumed that data is transferred at its maximum speed for convenience' sake.

If the number of gradations of each pixel is 8 (Dp=8 [bit]) when a device whose number of pixels is 5 M is used as a CCD [36](Pix=5M[bit]), observation image data that can be transferred for one minute can be calculated as follows.

$$\text{Number of frames} = \text{ComMax}/(Pix*Dp) = 480M/(5M*8) = 12 \quad (10)$$

According to this simple calculation, only the maximum speed of 12 [fps] can be secured. This frame rate is based on the amount of data in the case of mono-chromatic CCD. Therefore, in the case of a color CCD or if the number of gradations of one pixel increases, a frame rate becomes slower.

Even when an image of resolution with which images can be usually displayed on a PC is considered, the amount of its data is 21 Mbit (=1,280(H)*1,024(V)*8(Bit)*3(RBG)). Therefore, according to Equation (10), only data for 24 pieces of images per second can be transmitted at most. If a far slower I/F is used, the amount of data that can be transferred becomes less.

It is general that in order to improve this communication rate, data is compressed by a well-known compression method and is transferred. However, when targeting physical and chemical equipment which belongs to the technical field of the present invention, sometimes it cannot be said that this compression method is suitable from the viewpoint of reliability of data at the time of reproduction.

Therefore, in this preferred embodiment, the speed of taking in data from the CCD [36] is determined taking this communication speed into consideration. It is characterized that data is not taken in faster than needed, the reliability of data and the operability is secured while obtaining data whose noise is reduced.

Its operation control method is the same as in the first through third preferred embodiments. In this case, control is performed using the maximum transfer speed [sMin] calculated according to Equation (10) instead of the monitor display limit speed of the display unit [46].

Thus, there becomes no need to take in data at higher speed than needed, the heat generation of the CCD [36] is reduced and its life can be extended. Simultaneously, operability can be secured.

The Fifth Preferred Embodiment

In this preferred embodiment, the case where observation is accompanied by stage movement and a limit is set in the maximum moving speed of the stage according to the data taking interval (accumulation time) of the CCD is described.

The basic configuration of this preferred embodiment is the same as in the first preferred embodiment. However, its process contents differ from that of the first preferred embodiment. This preferred embodiment is featured by the process in the case where the microscope control unit [34] controls the stage [8] ([S4] shown in FIG. 12).

Figure 34:
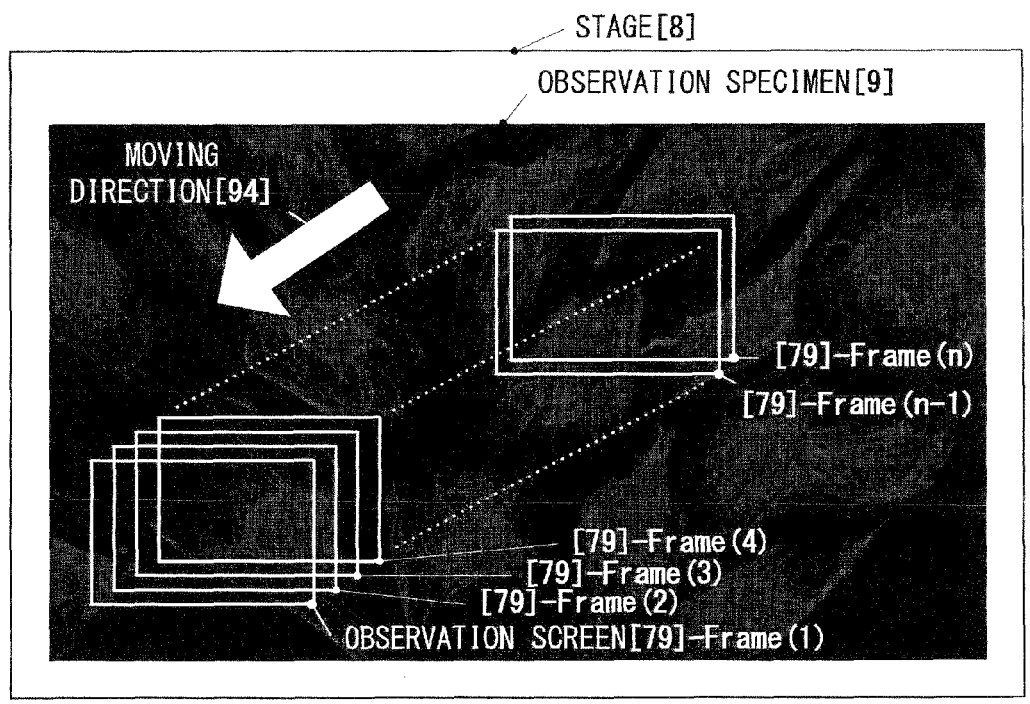
FIG. 34 explains the display contents change of the observation screen [79] in the case where the stage [8] is moved in the fifth preferred embodiment (No. 1).

When the moving speed of the stage [8] and the data taking speed (display interval in the case where images are continuously displayed on the display unit [46]) of the CCD [36] are optimum, image data is displayed as shown in FIG. 34.

FIG. 34 explains the display contents change of the observation screen [79] in the case where the stage [8] is moved in the fifth preferred embodiment (No. 1). FIG. 34 shows the state in which the observation specimen [9] is mounted on the stage [8] and the area of the observation screen [79]-Frame (1) is displayed on the observation screen [79] of the display unit [46].

When moving the stage [8] in the moving direction [94], frames are displayed on the observation screen [79] in the order of observation screen [79]-Frames (2) through (n).

However, if the moving speed of the stage [8] is fast or the taking speed of the CCD [36] is slow, the previously displayed images completely disappear from the observation screen [79] when displaying a subsequent frame as shown in FIG. 35 and there is a possibility that an observation point may become unclear. Therefore, it is preferable that at least ¼ of the previously displayed image remains on the observation screen [79], as shown in FIG. 36.

In this preferred embodiment, when driving the stage [8], a limit is set in the maximum moving speed according to the data taking interval (accumulation time) of the CCD [36].

Figure 37:
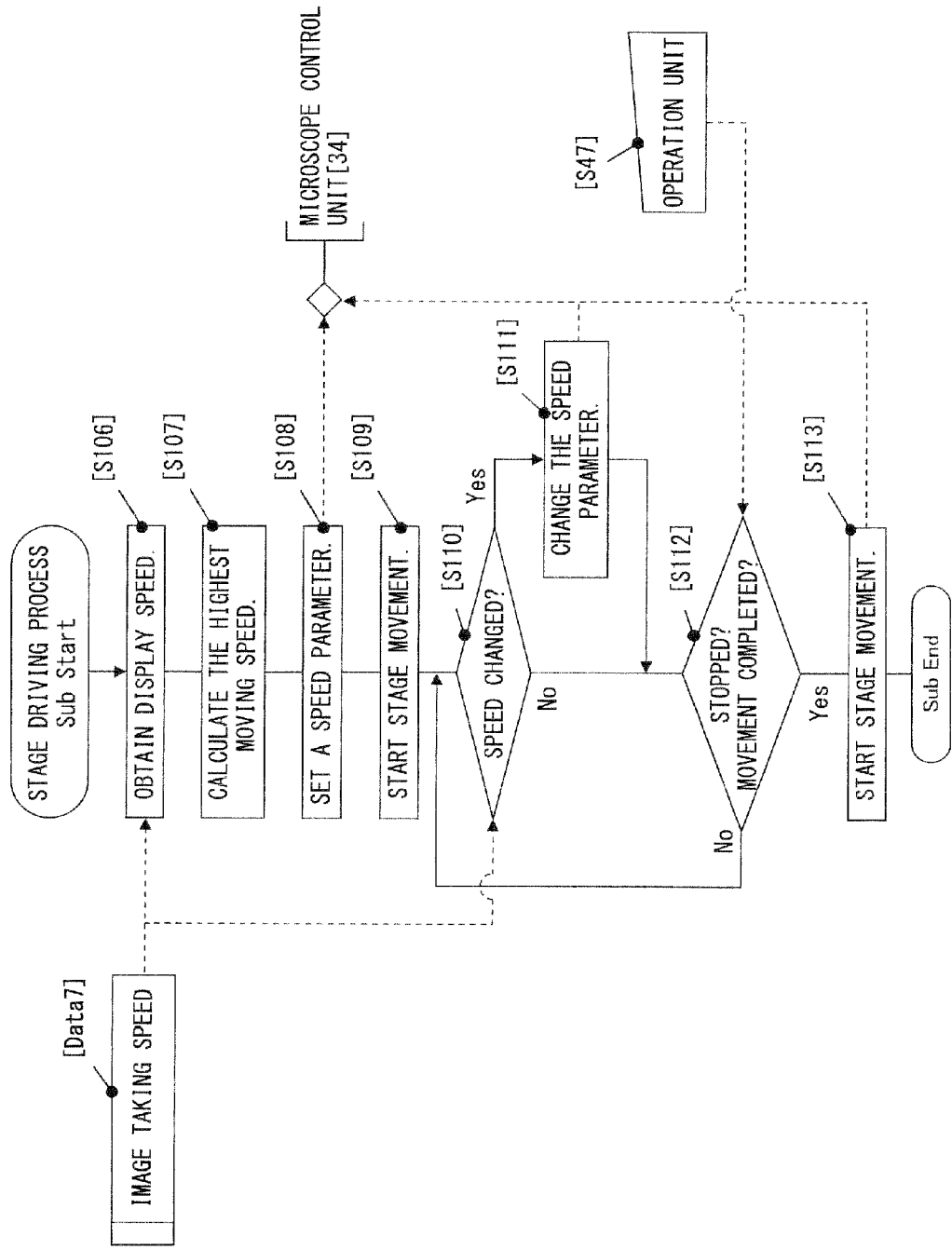
FIG. 37 is the flowchart of the process in the fifth preferred embodiment (process during stage movement).

FIG. 37 shows the flowchart of the stage driving process as one example of the microscope driving process [S4]. The stage moving operation in the XY direction is specified by the stage moving buttons (X+ [83]/X− [84]) of the operation MENU [80].

The system control unit [44] obtains the current image taking speed from [Data7] [S106]. It is assumed that the image taking speed [Data7] is written in also when controlling the accumulation time of the CCD [36]. For example, it is simultaneously updated when performing [S17], [S25] and [S40] shown in FIG. 17.

Then, the maximum moving speed in the case where the stage is driven is calculated [S107]. Firstly, the length in the X direction of the observation specimen [9] currently displayed on the observation screen [79] of the display unit [46] is calculated.

Suppose that the image forming magnification of the tube lens [35] and the magnification of the object lens [11] are 1[x] and 10 [x], respectively, and that the effective pixel range of the CCD [36] is 8 [mm]*6 [mm]. In this case, the range displayed on the observation screen in the X direction becomes 800[μm]. As described earlier, when leaving the display of the previous frame as shown in FIG. 36, the maximum movable distance becomes half of 800 [μm] (=400 μm). The maximum speed in the case of stage drive can be calculated by dividing this value by the taking speed obtained from [Data7].

If it is assumed that images are taken in at 4 [fps], the maximum speed of stage movement becomes 1.6 [mm/sec] This value is converted into the speed parameter of a driver device, such as the motor and the like, for actually driving the stage [8], which is given to the microscope control unit [34] as setting data [S108].

After the parameter setting is completed, stage movement is started [S109]. If image taking speed changes during the stage movement so that the parameters needs to be modified, parameter modification [S111] is performed to modify the parameter.

After the movement of a specified distance is completed or when it is determined that the drive is stopped by the operation of the operation unit [47] or the like, the movement of the stage [8] is stopped [S113] and the process is terminated.

According to this preferred embodiment described above, stage moving speed can be restricted by the display speed (update interval) of an observation image displayed on the display unit [46]. Therefore, an observation point is prevented from being lost at the time of observation.

The Sixth Preferred Embodiment

In this preferred embodiment, if the movement of a specimen is detected by comparing an image picked up this time with an image picked up previously, the light-amount adjustment is not optimized until the movement stops.

In the third preferred embodiment, the movement of a specimen is detected by the operating state of the microscope. However, in the sixth preferred embodiment, the movement of a specimen is directly detected and exposure is adjusted. The basic configuration of this preferred embodiment is the same as those of the above-described preferred embodiments (FIGS. 1, 28 and 33).

Its basic program process is also almost the same as that shown in FIG. 13. However, only its control of the bright field process [S9] (FIG. 15) and the fluorescence process [S10] (FIG. 16) differ from those shown in FIG. 13. For example, its fluorescence process [S10] is modified as shown in FIG. 38, whose operation is described below.

Figure 38:
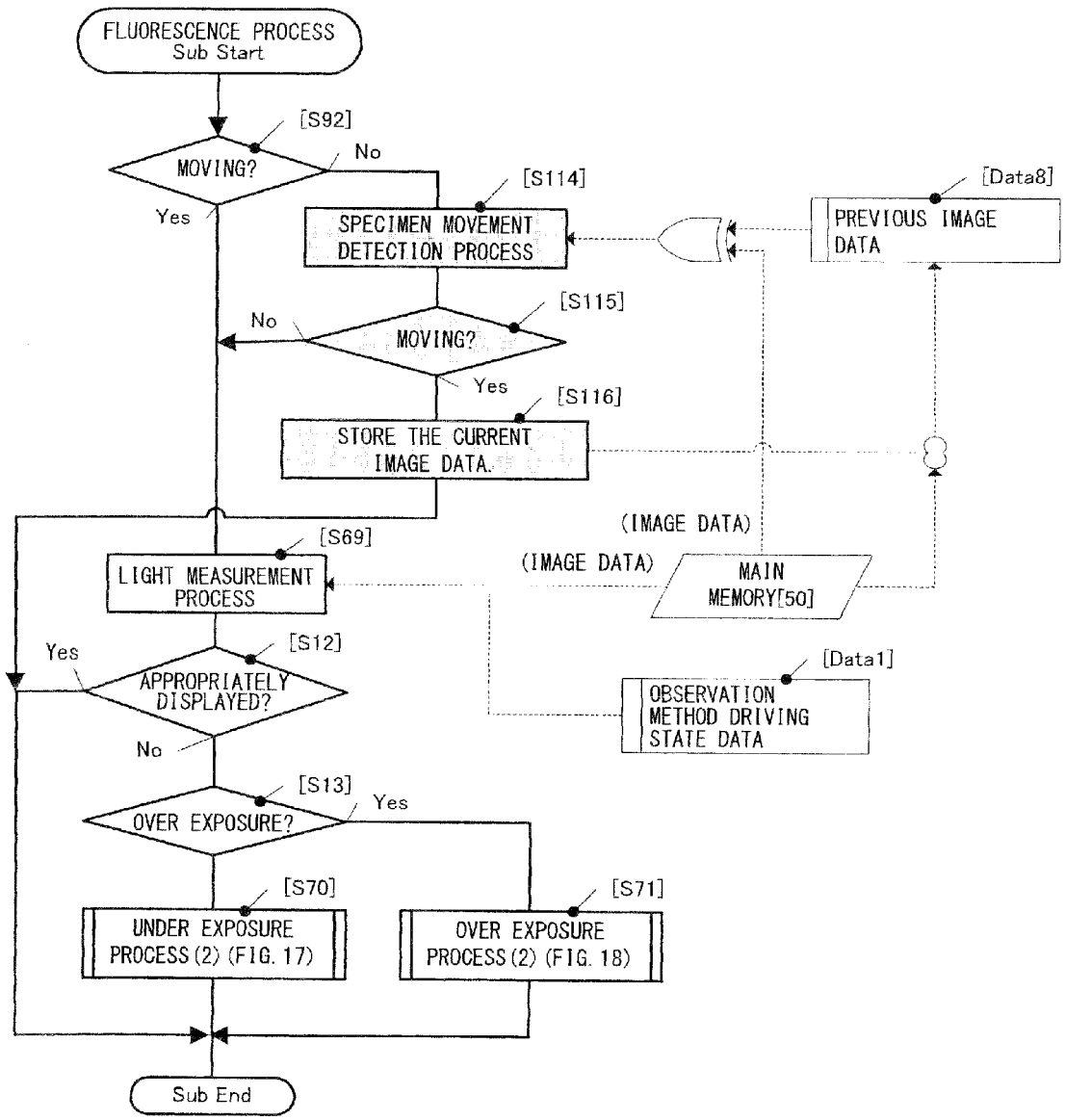
FIG. 38 is the flowchart of the process in the sixth preferred embodiment (process during specimen movement).

FIG. 38 is the flowchart of the process in the sixth preferred embodiment (process during specimen movement).

Firstly, in the same process as the [S92] of the third preferred embodiment shown in FIG. 29 it is determined whether the microscope is currently operated. If the microscope is currently operated in [S92], a normal process (the same process as the first preferred embodiment) is performed and the process is terminated.

If the microscope is not currently operated in [S92], it is checked whether the specimen itself is not moving [S114].

Figure 39:
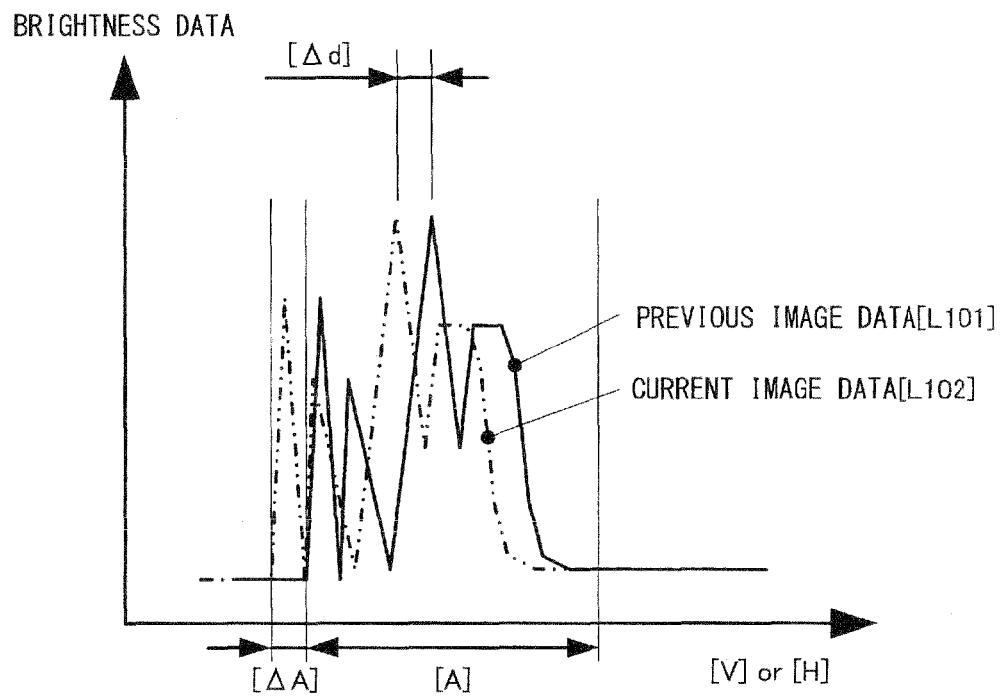
FIG. 39 shows the concept of specimen movement detection in the sixth preferred embodiment.

The detection is computed by a well-known correlative deviation detection method by comparing the latest image data being a light measurement target this time (in the main memory [50]) with image data computed/detected previously. For example, as shown in FIG. 39, the line profile of the brightness data of the previous image data [L101] and image data of this time [L102] are created and their correlation Δd is calculated. If it is determined that there is any deviation or deviation more than a specific value between both on the basis of the correlation Δd, it is recognized that the specimen has moved.

If the movement of a specimen is not detected, the flow returns to a normal process and the light measurement process [S69] is performed. When a specimen moves, image data of this time is stored in [Data8] in order to use in a next time comparison and the process is terminated. Namely, the light measurement process [S69] is not performed and the current exposure control state is maintained. Then, the process is terminated.

In this case, light measurement is performed in a part other than the part need to be observed when a moving specimen (cell) goes out of an area where light is currently measured, and the exposure of a part desired to actually be observed becomes insufficient or excessive. Therefore, the above process is performed in order to prevent this.

For example, it is assumed that the exposure of a specimen having brightness distribution as shown in FIG. 39 is adjusted to become optimum in the range of a light measurement area [A]. At the time of the previous light measurement process, the area [ΔA] shown in FIG. 39 was included in the light measurement area. However, this time, the area [ΔA] shown in FIG. 39 goes out of the light measurement area and is put out of its operation target. If the operation is performed in that state, the light measurement reference value deviates, the brightness of the specimen differs from the previous one and the specimen brightness flickers. In order to prevent this, the previous exposure adjustment value is maintained and the brightness is stabilized.

Thus, when observing a moving cell, the brightness of observation target parts can be maintained stable and the visibility in specimen observation is improved.

The Seventh Preferred Embodiment

The seventh preferred embodiment is featured by adding the following points to the sixth preferred embodiment. In the sixth preferred embodiment, when a specimen moves, a light measurement process is not performed. However, in this preferred embodiment, even when a specimen moves, exposure is adjusted.

FIG. 40 is the flowchart of the process in the seventh preferred embodiment. Since the processes up to [S116] are the same as in the sixth preferred embodiment, their descriptions are omitted.

It is determined whether a specimen is moving and it is the first detection right after its movement [S117]. If it is the first detection, the current setting state of exposure adjustment is saved in [Data6]. Then, in order to control exposure with priority suitable for specimen movement, a priority modification process [S118] is performed.

The process contents of the priority modification process [S118] are almost the same as those shown in FIG. 14. The process contents of the priority modification process [S118] differ from those shown in FIG. 14 only in Over/Under exposure process used in the virtual operation process [S83]. The process used for the virtual operation is shown in FIG. 41.

FIG. 41 is the flowchart of the exposure control process during specimen movement and the priority of adjustment parts that control exposure is almost the same as the control priority shown in FIG. 30. The different point is that it is limited to more than the limit value [sMin] of display speed. Namely, the control priority of adjustment parts is lowered by rote as in stage movement case. Further, the value of [sMin] differs from those of the first through sixth preferred embodiments and the current setting is changed according to the moving speed of a specimen.

In order to detect the subtle change of a specimen, it is preferable to take in images for a short exposure time as much as possible. In this preferred embodiment, control is possible in the range of [Min] to [sMin].

In the case of Under exposure, a process [S120] is performed. In the case of Over exposure, a process [S121] is performed. As to accumulation time control, control ([S122], etc.) is performed in the range not exceeding [sMin].

After the priority modification process [S118] is completed (process starts from this process at the second time and after), an actual light measurement process is performed. If exposure adjustment is necessary, exposure is adjusted.

In case that exposure is adjusted, when a specimen is found moving on the basis of the detection result in [S115] a specimen during-movement exposure process [S119] is performed. [S119] is the above-described process shown in FIG. 41. In this case, although in the priority modification process [S118] it is performed as virtual operation, this time the actual adjustment parts are controlled.

After that, while a specimen is moving, by repeating the above-described process (FIG. 40), optimum exposure control for specimen movement is performed.

Then, after the specimen movement is completed (it is determined in [S115] that a specimen is not moving), in [S92] a priority restoring process [S97] is performed and the process contents returns to normal.

As described above, according to the seventh preferred embodiment, when observing a moving cell, clear images having no display blur can be observed by modifying the control priority of exposure adjustment parts and maintaining the screen display speed more than a specific value [sMin].

The Eighth Preferred Embodiment

This preferred embodiment is applied when recording images observed in the first through seventh preferred embodiments as video image data. Specifically, in this preferred embodiment, exposure is not controlled during recording. When controlling exposure during recording, the priority of exposure adjustment parts is modified and the number of adjustment parts is limited.

It is now assumed that, as shown in FIG. 42, a recording operation MENU [95] is displayed on the operation MENU [80] of the display unit [46]. For example, it is assumed that a REC (record) button [96] for starting recording and a STOP button [97] for stopping recording are displayed.

When the REC button [96] is specified, the system control unit [44] modifies the priority of exposure adjustment parts.

As to the changing units, the switching in the first through seventh preferred embodiments is performed in the same way. For example, when the recording aims to record the brightness changing state of an observation image and so on, the changing state cannot be caught if exposure itself is adjusted. In such a case, during recording, exposure control itself is skipped by the process shown in FIG. 43.

Figure 43:
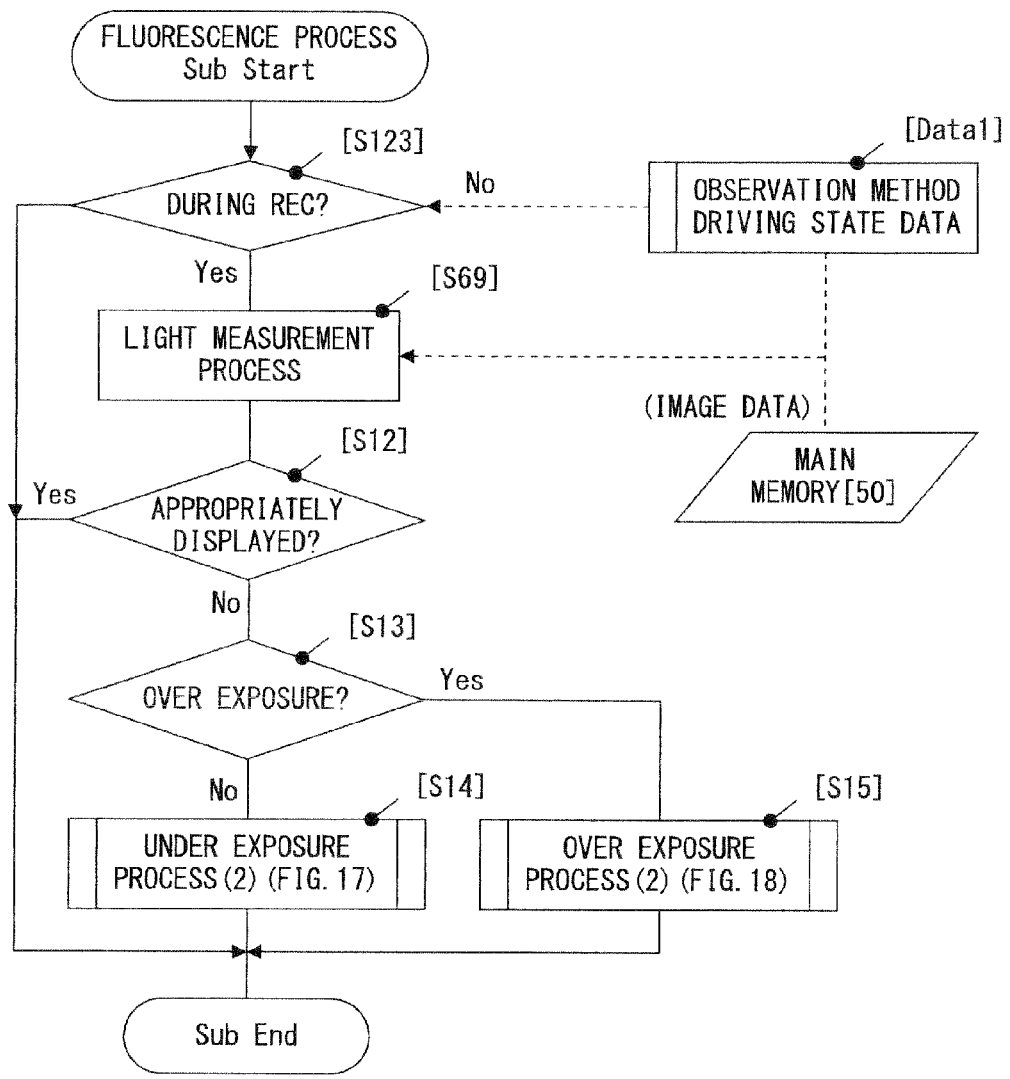
FIG. 43 is the flowchart of the process in the eighth preferred embodiment (process at the time of fluorescence observation).

FIG. 43 is the flowchart of the process in the eighth preferred embodiment (process at the time of fluorescence observation). The system control unit [44] recognizes that the REC button [96] is pushed on the operation unit [47]. Then, the system control unit [44] INPUTs the fact that images are being recorded to the observation method driving state data [Data1]. In exposure control (FIG. 43), it can be determined that images are being recorded according to the state of [Data1]. If images are being recorded, a process [S123] is performed in which exposure is not adjusted. If images are not being recorded, a normal process [S69] is performed.

Data obtained during recording is converted into a well-known video image format (AVI/MPEG, etc.) by the system control unit [44] and is stored in the HDD [49] or a recording medium, which is not shown in FIGS. 1, 28 and 33. During that time, exposure adjustment control is skipped.

After that, recording is continued until the STOP button [97] of the operation MENU [42] is specified.

However, when recording cell shape change and the like during recording and so on, sometimes it is preferable to perform some exposure adjustment. In such a case, the priority of exposure adjustment parts is switched and the number of exposure adjustment parts is limited. The control of adjustment parts whose brightness discontinuously changes or parts by adjusting which images greatly change are excluded during recording.

Since the procedure of the priority switching is the same as those of the above-described preferred embodiments, its description is omitted. Only the exposure control process during recording is shown in the flowchart shown in FIG. 44.

Figure 44:
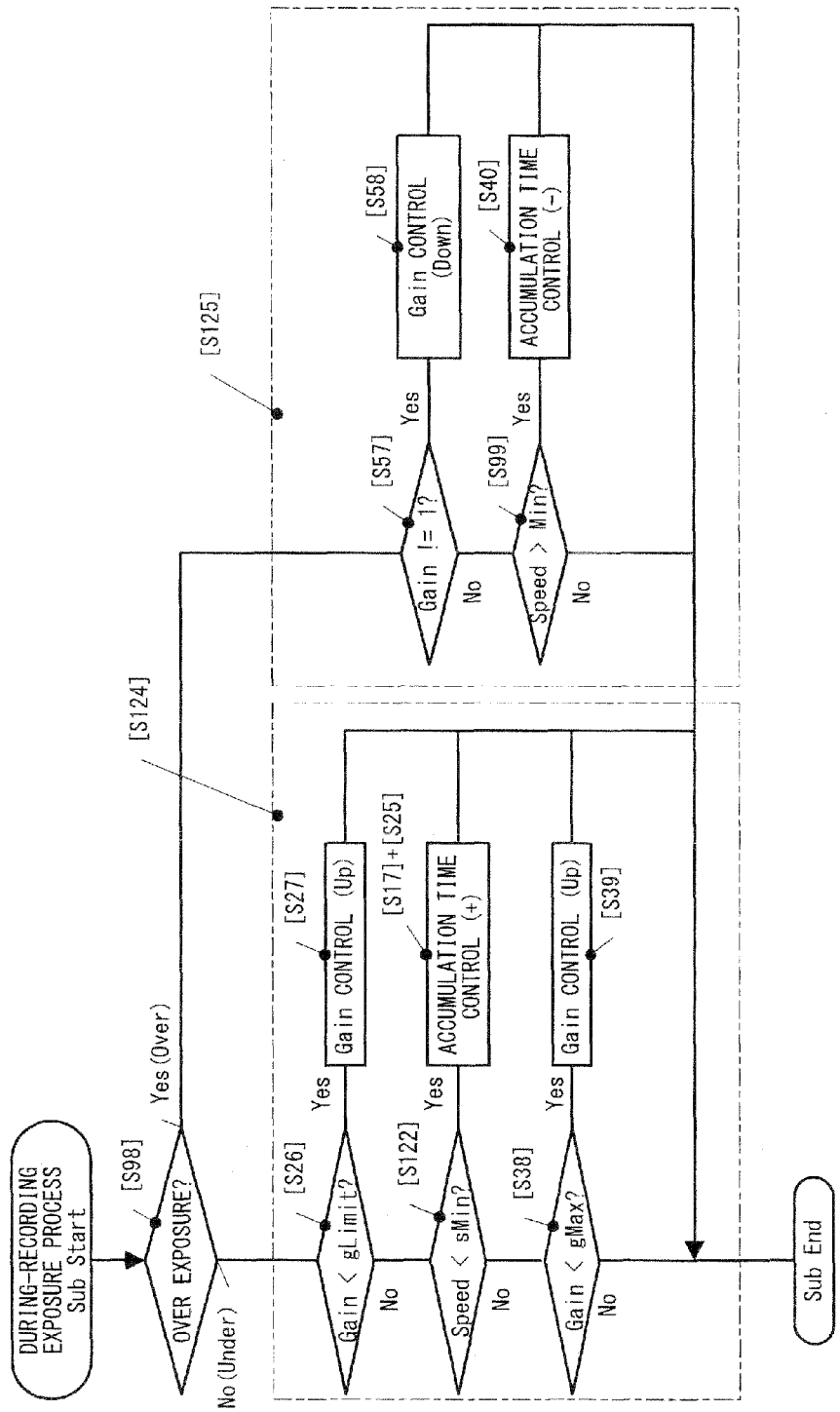
FIG. 44 is the flowchart of the process in the eighth preferred embodiment (exposure process during recording).

FIG. 44 is the flowchart of the process in the eighth preferred embodiment (exposure control process during recording). The [S124] shown in FIG. 44 is control at the time of Under exposure. The [S125] shown in FIG. 44 is control at the time of Over exposure. In both controls, priority is given to correction by gain adjustment. Then, exposure is adjusted by varying accumulation time. The other parts are excluded from its control targets and observed images are recorded in their stable states.

In this case, their state changes can be observed/recorded without missing frames by limiting the setting value of [sMin] to a video rate for actually recording (for example, 1/30 sec or more).

As described above, by switching the control method according to its recording purpose during recording, the video image recording matching with the recording purpose can be realized.

The Ninth Preferred Embodiment

The ninth preferred embodiment is characterized such that [gLimit] is not set to a prescribed value but is specified on the basis of the detection result of an S/N noise detection unit.

In the above-described preferred embodiments, it is assumed that [gLimit] is a specific value. However, in this preferred embodiment, for example, in the system initialization [S1] and [S5] performed by the microscope control unit [34] and the camera control unit [43], the noise level detection process is performed. One example of the detection process flow is shown in FIG. 45 and is described.

Figure 45:
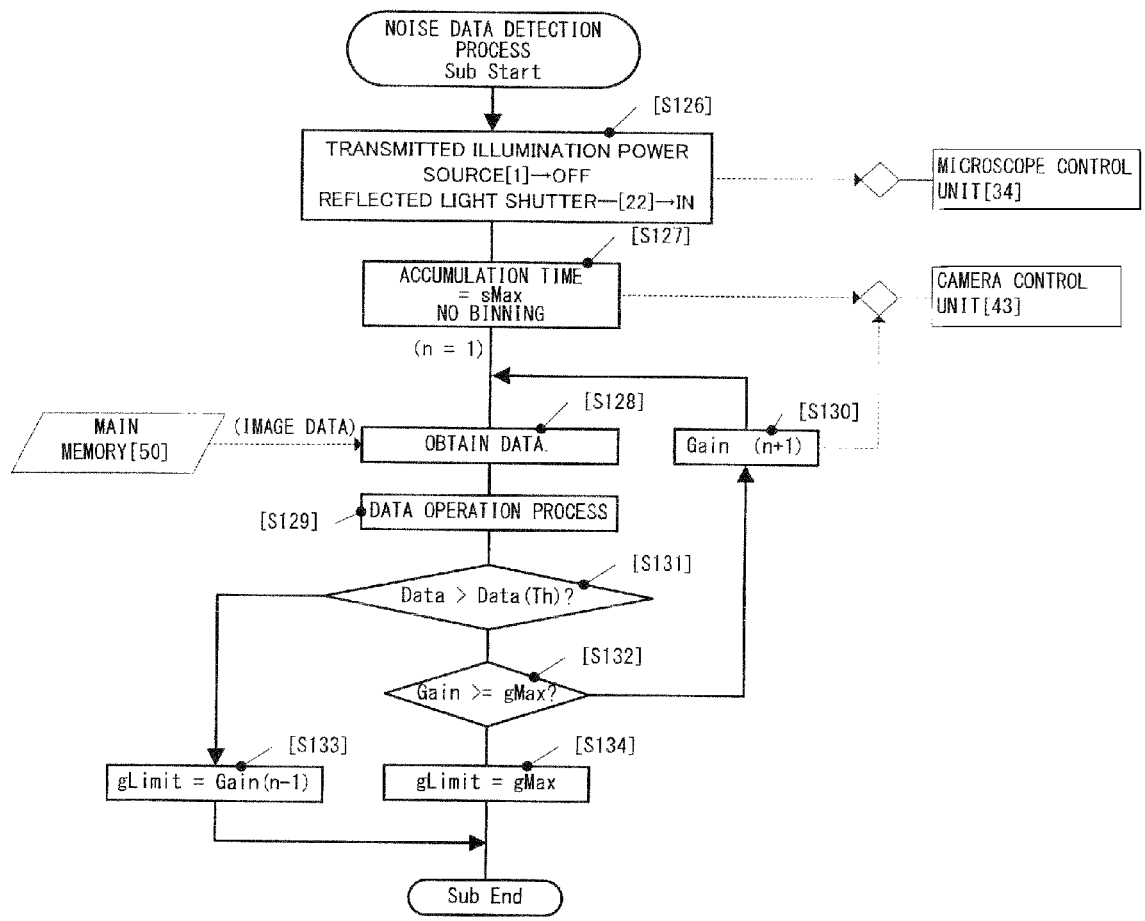
FIG. 45 is the flowchart of the process in the ninth preferred embodiment (noise data detection process).

FIG. 45 is the flowchart of the process in the ninth preferred embodiment (noise data detection process). Firstly, all formed images are removed from the CCD [36]. Then, by the microscope control unit [34] the transmitted illumination light source [1] is extinguished and the reflected light shutter [22] is inserted in the reflected illumination light path [LP2] [S126]. In this case, it is assumed that the entire system is covered with a shelter to prevent external leak light from entering it.

In this state, the accumulation time of the CCD [36] is fixed to [sMax] and no binning is selected. At that moment, image data is obtained [S128] when the gain of the AMP [39] is increased [S130] from 1x [S127]. Then, its noise level is checked [S129] and gain [gLimit] is determined.

Since a imaging process is currently performed in a light-shielded state, the camera data is equivalent to obtaining CCD reading noise plus the circuit noise of the image signal processing adjustment unit [37]. [gLimit] is determined by this signal level (noise).

The operation process [S129], for example, determines whether the average value of the output data of [Gain(1)] through [Gain(n)] shown in FIG. 46 exceeds the reference value [Data(th)]. Gain immediately prior to exceeding the reference is specified as [gLimit]. In the case of FIG. 46, since [Gain(8)] exceeds the reference value [Data(th)], [gLimit] can be set to 7[x]([gLimit]=7[x]).

In the case of such a low noise circuit that gain does not exceed [Data(th)] even if it is amplified up to [gMax], the exposure control process after that is performed assuming that [gLimit]=[gMax].

By controlling as in the first through eighth preferred embodiments on the basis of the determined [gLimit], image quality deterioration (noise level) in the case where gain is amplified can be put within a certain range. Therefore, stable images can be observed.

Circuit noise and CCD noise also varies depending on temperature change. Therefore, this detection process is performed every certain time, or alternatively, a temperature detection unit can be provided and the noise detection process is performed when temperature change is detected. Thus, more accurate noise detection becomes possible and, accordingly observation images can be stabilized.

Furthermore, when binning is performed and so on, reading noise can be reduced. Therefore, if the value of [gLimit] is respectively provided in each step of binning and by using it as the respective determination value of each process, a further effect can be obtained.

For example, in FIG. 17 the value of [gLimit] determined in [S26] is changed according to the binning setting state in [Zone-6]/[Zone-8]. Thus, the width of the adjustment range is extended, and accordingly stable observation images can be obtained.

By adding a signal noise level detection unit as above, image quality deterioration (noise level) can be put within a certain range, and accordingly stable images can be obtained.

The Tenth Preferred Embodiment

In this preferred embodiment, a microscope observation system which targets other parts than ones set by an observer as exposure adjustment parts by the system control unit is described.

Up to the ninth preferred embodiment it is configured assuming that even if an observer is unfamiliar to a microscope/an imaging equipment he/she can obtain good observation images. However, this preferred embodiment provides a system which satisfies even a skilled person. Specifically, a skilled person considers that an observer familiar to a microscope and a camera desires to set an observation image in a desired state. For example, sometimes such an observer desires to observe images in the fixed state of aperture, binning setting and the like. The tenth preferred embodiment can provide a system capable of handling such condition.

Firstly, when an observer operates the operation units which are not shown in Figs., corresponding to exposure adjustment parts (for example, aperture and an ND filter), and sets them in his/her desired state, the system control unit [44] updates the data of a list of adjustment control parts like Table 11 and excludes the set parts from its control targets. According to Table 11, currently AS is manually adjusted by an observer and is removed from the control targets.

TABLE 11

| Adjustment item | Control target |
| --- | --- |
| Gain | ○ |
| Binning | ○ |
| ND | ○ |
| AS | X |
| Accumulation time T | ○ |

The contents of Table 11 are stored in the HDD [49] of the system control unit [44], the main memory [50] or the like as adjustable/non-adjustable data [Data9].

Then, the following processes are added before the determination and control of respective adjustment parts of the above-described exposure adjustment processes (FIGS. 17, 18, 20, 21, 25, 26, 30, 41, etc.) are performed.

Figure 47:
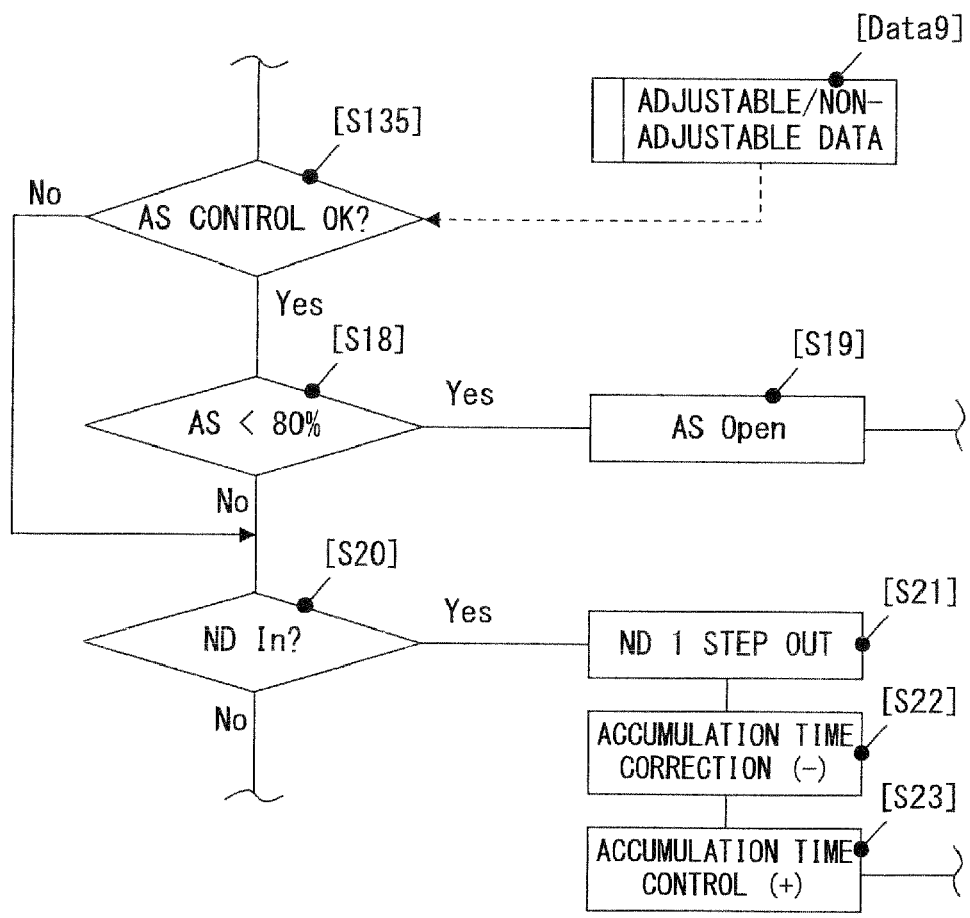
FIG. 47 is the flowchart of the process in the tenth preferred embodiment (control contents skip).

For example, the determination process [S135] shown in FIG. 47 is performed as the pre-processing of [S18] shown in FIG. 17. If it is not a targeted adjustment part based on the determination, a subsequent process ([S18] in this case) is skipped.

Thus, adjustment parts once operated by an observer are removed from the control targets. Thus, an exposure adjustment process can be performed while the preference of an observer is maintained.

However, when a plurality of adjustment parts are operated, the number of adjustment parts by which exposure adjustment is possible is decreases. In that case, the adjustment range is narrowed and there is a possibility that operability may deteriorate. In such a case, alternatively, every time an observer operates, control with lowering the priority of the operated adjustment part is possible.

For example, the priority of adjustment parts in the order of the flowchart shown in FIG. 17 is as follows.

TABLE 12

| Control priority | [A] | [B] | [C] |
| --- | --- | --- | --- |
| 1 | Accumulation time control 1 | Accumulation time control 1 | Accumulation time control 1 |
| 2 | As control 1 | ND filter | ND filter |
| 3 | ND filter | Accumulation time control 2 | Accumulation time control 2 |
| 4 | Accumulation time control 2 | Gain 1 | Gain 1 |
| 5 | Gain 1 | Binning 1 | Gain 2 |
| 6 | Binning 1 | Binning 2 | Accumulation time control 3 |
| 7 | As control 2 | Gain 2 | As control 1 |
| 8 | Binning 2 | Accumulation time control 3 | As control 2 |
| 9 | Gain 2 | As control 1 | Binning 1 |
| 10 | Accumulation time control 3 | As control 2 | Binning 2 |

After aperture is adjusted by an observer, the priority of controlling AS with the current aperture diameter is lowered to the bottom and exposure is adjusted in control order [B]. Then, after binning is operated, priority order is changed to [C].

In this way, control is performed giving priority to the adjustment value in the adjustment part operated by an observer. For example, In FIG. 47, when the priority of accumulation time control is the lowest in the step of [S22] after [S20] and [S21] are controlled, correction and control are performed using gain adjustment instead.

According to the tenth preferred embodiment, a microscope observation system having good operability and visibility that satisfies even a skilled person somewhat familiar to a microscope and a camera and desiring to adjust an observation image to his/her taste in addition to an observer unfamiliar to a microscope and a camera can be provided.

The Eleventh Preferred Embodiment

Up to the tenth preferred embodiment, adjustment parts controlled by exposure adjustment is only on the microscope or camera. However, in this preferred embodiment, the post-processing of the system control unit [44] is also included in the adjustment parts and is controlled.

As the post-processing, exposure control is performed with adding an image addition mode. The flowchart in the case of Under exposure is shown in FIG. 48.

Figure 48:
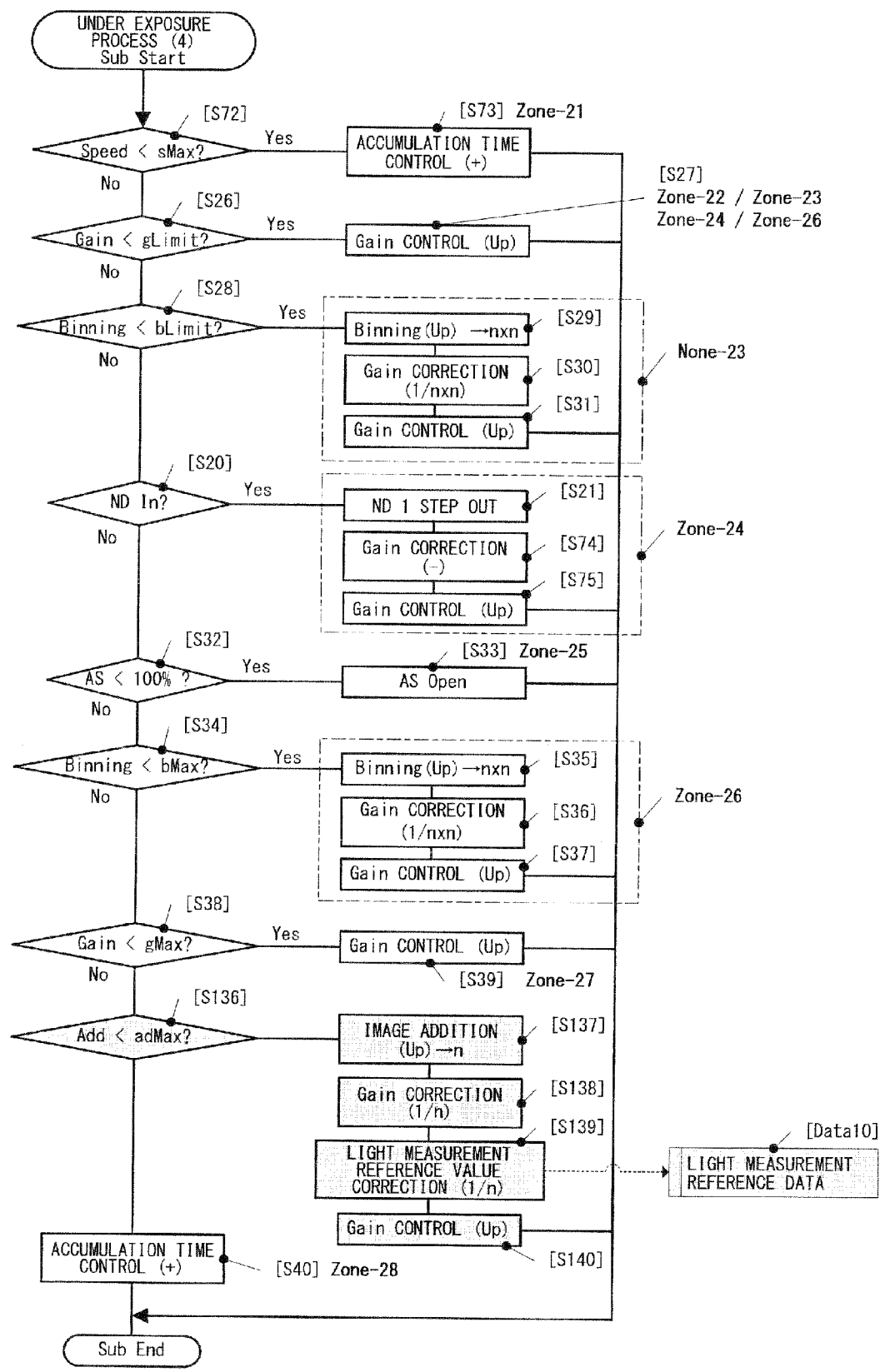
FIG. 48 is the flowchart of the process in the eleventh preferred embodiment (process in the case of Under exposure in fluorescence observation).

FIG. 48 is the flowchart of the process in the eleventh preferred embodiment (process in the case of Under exposure in fluorescence observation). Since its basic process is almost the same as that in the flowchart shown in FIG. 20, the same reference numerals are attached to the same processes and their descriptions are omitted.

Up to [S38], the same processes are performed. When the adjustment item of exposure adjustment becomes only accumulation time and also its frame rate exceeds comfortable operation speed (10[fps] in this preferred embodiment), a process [136] is performed.

Figure 51A:
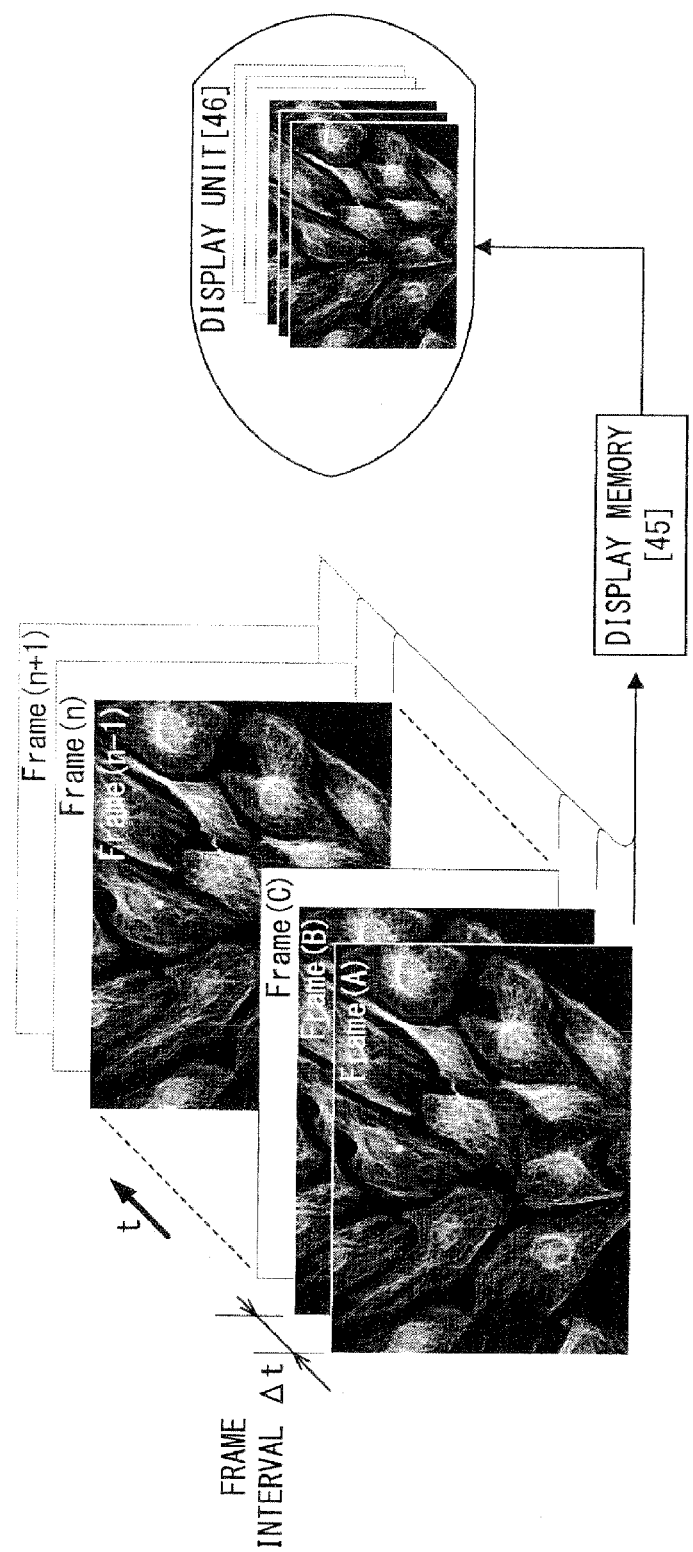
FIGS. 51A and 51B show the concept of image addition process in the eleventh preferred embodiment.

Here, [adMax] indicates the maximum addable number of pieces of image data. [Add] indicates the current added pieces of image data. For example, it is normal as shown in FIG. 51A, image data for one frame obtained from the CCD [36] is read in. Simultaneously, the image data for one frame is written in the display memory [45] and is displayed on the display unit [46]. This is the case of [Add]=1.

Usually, when the brightness of display image is not optimum even after exposure adjustment, in order to optimize it, it becomes necessary to extend its accumulation time although operability deteriorates. In such a case, the addition process of image data is performed in this preferred embodiment ([S137] shown in FIG. 48).

Figure 51B:
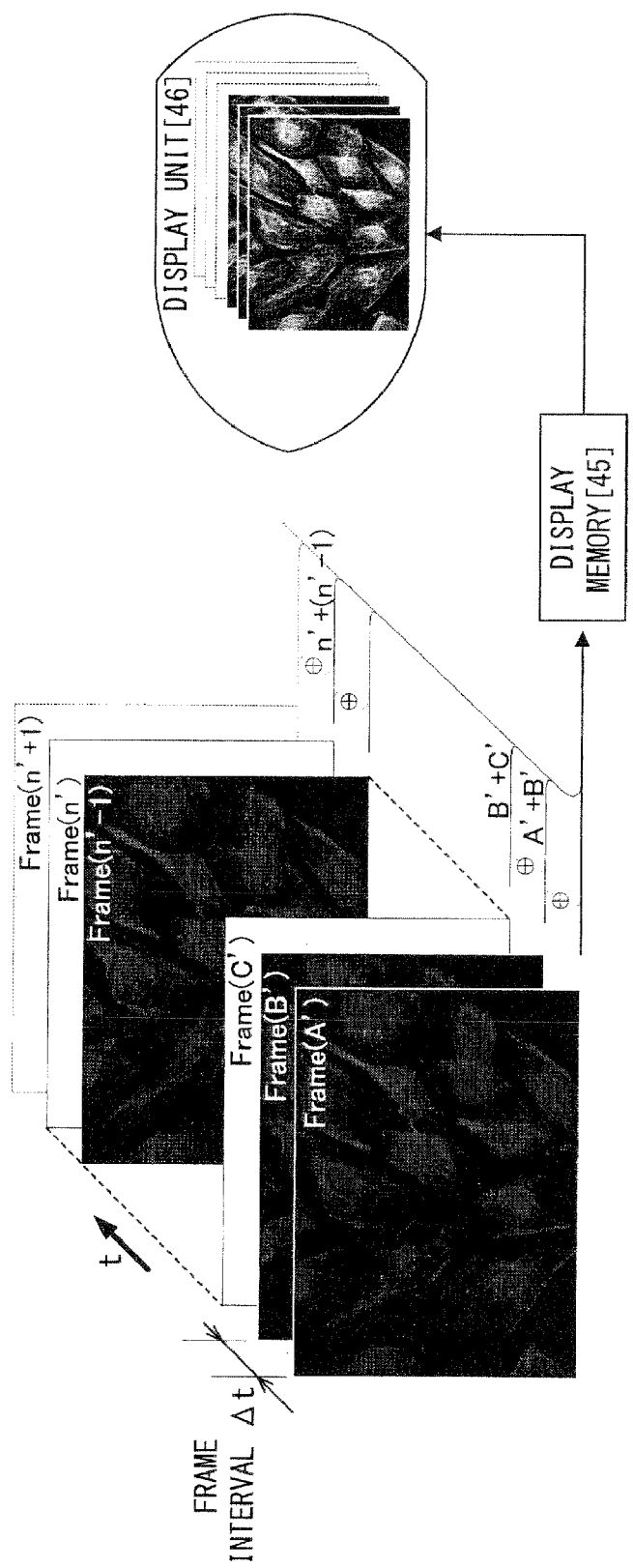

Firstly, as shown in FIG. 51B, image data of one frame before that should have been displayed (for example, data [Frame (A')]) is temporarily stored in the main memory [50]. Then, it is added to image data [Frame (B')] that should be currently displayed. This added result is written into the display memory [45]. Thus, the display brightness of image data becomes double (A'+B'). By applying (adding) this process a specified times, the display brightness cab ne adjusted according to a specified times. In the case of [Add]=3, data outputted at C' becomes [Frame(A')+Frame(B')+Frame(C')].

Back to FIG. 48, if [adMax] is not the maximum value, the system control unit [44] increases the number of adding pieces of image. When image addition is performed, the screen data and image brightness increases accordingly (at least double or more) and also increases gradually. Therefore, even in this preferred embodiment, gain correction [S138] which is performed also in ND control and binning control is performed. Since data is increased in the post-processing, when light measurement is performed, it must be determined whether the state is optimum taking this condition into consideration. Thus, the current addition data is stored in light measurement reference value data [Data10] in such a way that it is possible to be referred to at the time of light measurement operation evaluation. As shown in FIG. 50, when performing the light measurement [S69], the light measurement reference value data [Data10] is referenced and a subsequent process is performed according to this result. For example, when the number of added pieces of image data is two, the light measurement reference value data [Data10] becomes its half.

Lastly, exposure is adjusted by gain adjustment [S140] and an Under exposure process is performed.

Figure 49:
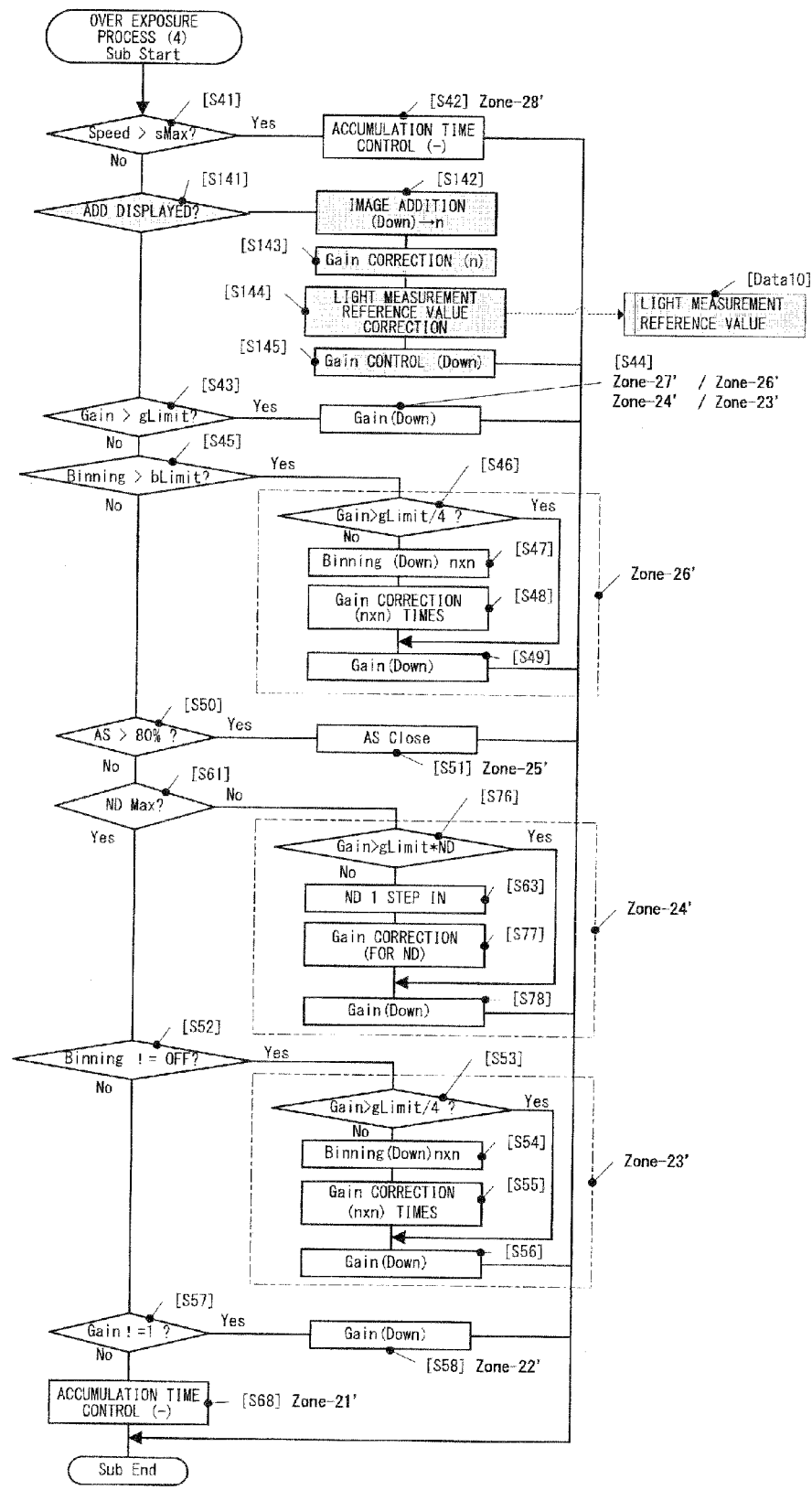
FIG. 49 is the flowchart of the process in the eleventh preferred embodiment (process in the case of Over exposure in fluorescence observation).

In the case of Over exposure (FIG. 49), priority is given to the release of the image addition process. After it is released first, the same processes ([S141] through [S145]) as shown in FIG. 21 are performed.

As described above, display brightness is controlled by the post-processing on the display side. Thus, although there is display delay by several frames, display brightness can be increased without damaging a frame rate apparently. Therefore, the comfortable operation range can be extended.

The Twelfth Preferred Embodiment

In this preferred embodiment, a microscope observation system for adjusting the display size of image data on the basis of the resolution of a monitor is described.

The twelfth preferred embodiment relates to a method for displaying image data on the display unit [46] in the first through eleventh preferred embodiments. Since the system configuration of this preferred embodiment is the same as that of the first preferred embodiment (FIG. 1), its description is omitted.

In the first through eleventh preferred embodiments, data loss at the time of binning, the determination method of [bLimit] and a control method by it are described. However, in the first through eleventh preferred embodiments, how to display the data is not specified.

When the taken image data is displayed on the display unit [46] in its original image size, there is no problem if the display size of the observation screen [79] of the display unit [46] is the same as the size of image data, as shown in FIG. 52A. However, if the image data size is smaller than the display size, blank is caused on the observation screen, as shown in FIG. 52B. If the image data size is larger than the display size, only a part of image data can be displayed, as shown in FIG. 52C.

Figure 53:
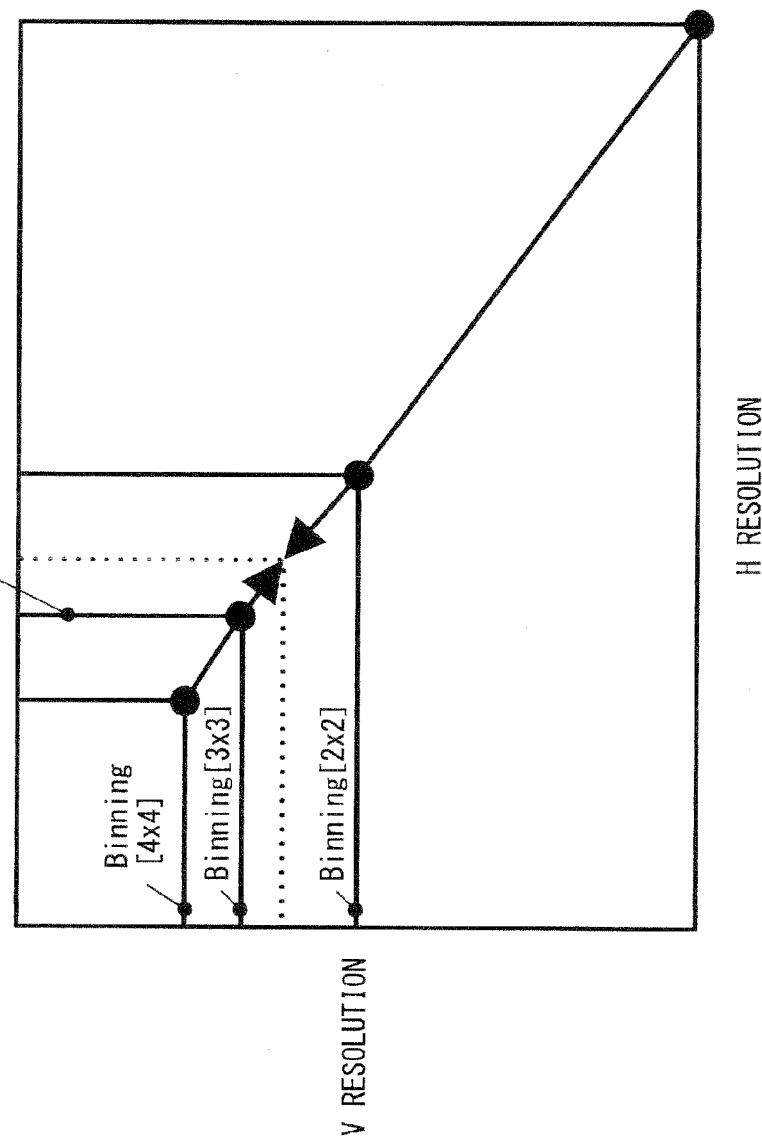
FIG. 53 shows the concept of image size magnification/reduction in the twelfth preferred embodiment.

Therefore, when transferring image data to the display memory [45], the size of image data must be adjusted in such a way as to match the size of the observation screen [79]. As shown in FIG. 53, when performing binning, an enlargement/compression process is needed according to monitor resolution (the display size of the observation screen [79]). In the case of no binning (full resolution) and Binning [2×2], a size compression process is performed. In the case of Binning [3×3] and [4×4], an enlargement process is performed. The display process is shown in FIG. 54.

FIG. 54 is the flowchart of the process in the twelfth preferred embodiment (image size changing process). The resolution of a currently used monitor (the display unit [46]) is obtained from the display driver [74] and the current size of the display area on the observation screen is calculated [S16].

Then, the size of image data stored in the main memory [50] is checked [S147] and compares the display area size and the image data size. If the image data size is larger than the monitor display size, a well-known image compression process [S149] is performed. If the image data size is smaller than the monitor display size, a well-known image enlargement process [S150] is performed. The size-adjusted image data is transferred to the display memory [45] and a display process is performed [S151].

This process is performed for each frame and a continuous image display process is performed. Thus, even when a binning process is performed and the image size is changed, the image can be observed without the change of image size.

If the current size of image data is determined using [bLimit] as the reference, the process time can be reduced.

The Thirteenth Preferred Embodiment

In this preferred embodiment, a microscope observation system which continues to display an image immediately prior to the exposure adjustment until the exposure adjustment is completed at the time of exposure adjustment in the case the exposure state changes is described.

Its configuration is the same as those of the above-described preferred embodiments as shown in FIG. 1. In this preferred embodiment, advanced method of exposure adjustment has been contrived for adjusting each adjustment part.

Figures 55A, 55B:
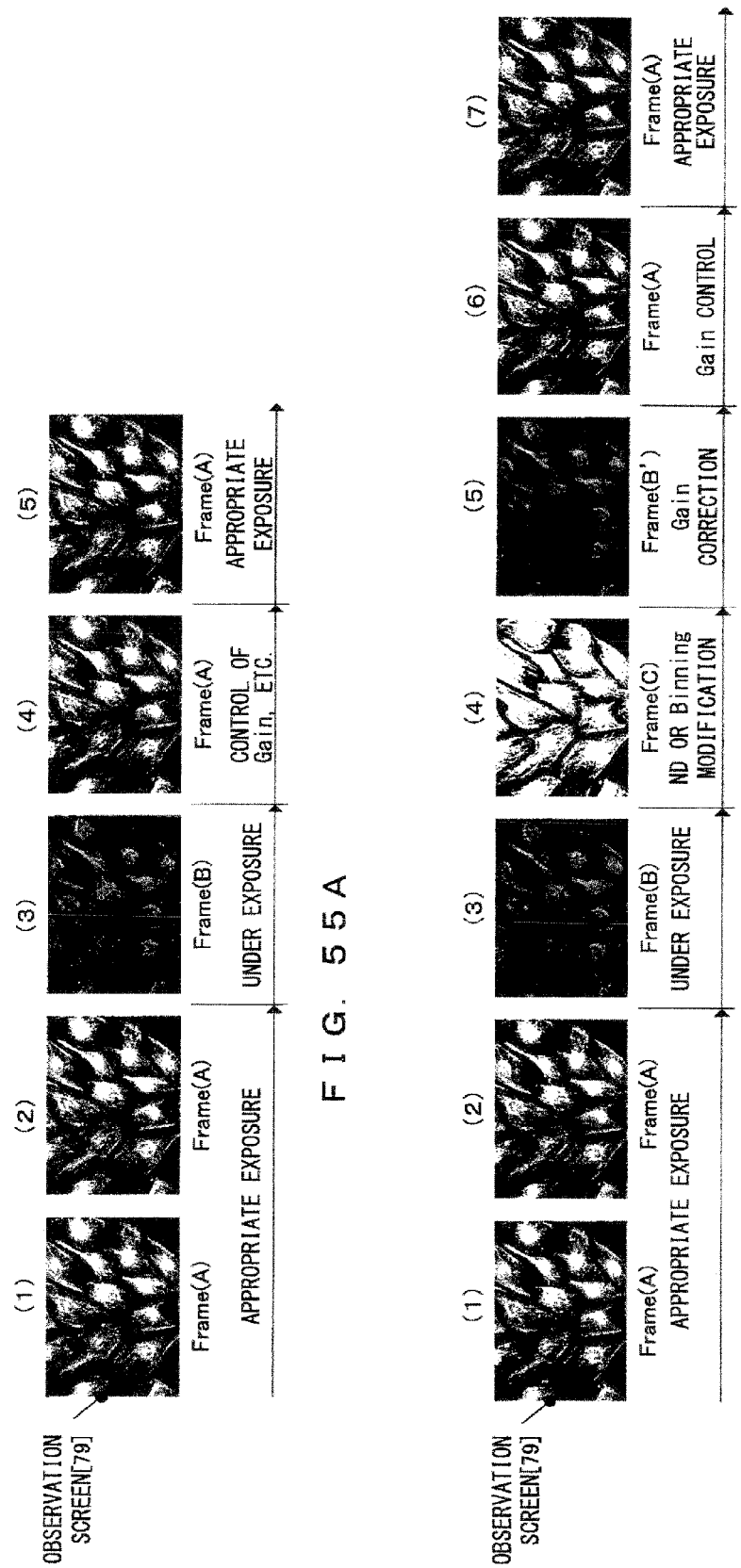
FIGS. 55A, 55B and 55C explain the concept of the brightness change of screen display due to the difference of exposure control in the thirteenth preferred embodiment.

Firstly, FIG. 55A shows the case where the adjustment parts to which continuous adjustment can be applied, such as gain control, accumulation time control or the like (exposure can be adjusted in somewhat fine steps) is adjusted. Figs. up to FIG. 55A (2) show the state where exposure is optimally adjusted ([Frame(A)] in FIG. 55A) and it is assumed that the brightness of a specimen changes to Under exposure state in FIG. 55A(3) ([Frame(B)] in FIG. 55A). Then, exposure adjustment is applied to the image in FIG. 55A(3) and in FIG. 55A(4) the state returns to the original state where exposure is optimally adjusted ([Frame(A)] in FIG. 55A), thus the brightness of the observation image [79] hardly changes.

However, when exposure is controlled by an adjustment part in which the amount of light discontinuously changes, such as an ND filter, binning control and the like, as shown in FIG. 55B (4), an image immediately after control becomes very bright like [Frame (c)] in FIG. 55B (dark in the case of Over exposure). Therefore, it becomes very difficult to observe the image. In the case of binning control, switching is completed after several frames. However, it takes much time to control the mechanical adjustment of an ND filter and the like. Furthermore, when a plurality of filters is inputted/outputted and so on, the transition state in control is also displayed on the observation screen [79]. Then, in FIG. 55B (5), an image after accumulation time correction (−) ([Frame (B')] in FIG. 55B having the same brightness as [Frame(B)] in FIG. 55B) is also displayed as it is.

Therefore, in this preferred embodiment, when controlling exposure adjustment parts which are discontinuously adjusted, a complementary process is added. Its flowchart is shown in FIG. 56.

FIG. 56 is the flowchart of the process in the thirteenth preferred embodiment (complementary process control). FIG. 56 shows only the differences (a complementary control portion) from the first preferred embodiment (FIG. 17). Its entire control flow is very similar to that shown in FIG. 17.

Before controlling the discontinuously adjustment parts (ND filter control [Zone-3] in this preferred embodiment), a complementary process is started [S152].

Usually when nothing is done, the image data of the main memory [50] is sequentially transferred to the display memory [45] and is displayed on the display unit [46]. This transfer operation is temporarily stopped. Thus, the lastly transferred image (the last image determined to be Under exposure ([Frame(B)] in FIG. 55C) is displayed on the display unit [46].

Then, the adjustment parts in which the amount of light discontinuously changes (an ND filter and binning control) are controlled in this state ([S21] through [S23]). When this control is completed, the complementary process is terminated [S153]. Then, the transfer to the display memory [45] is re-started leaving from the transfer-stopped state.

Figure 55C:
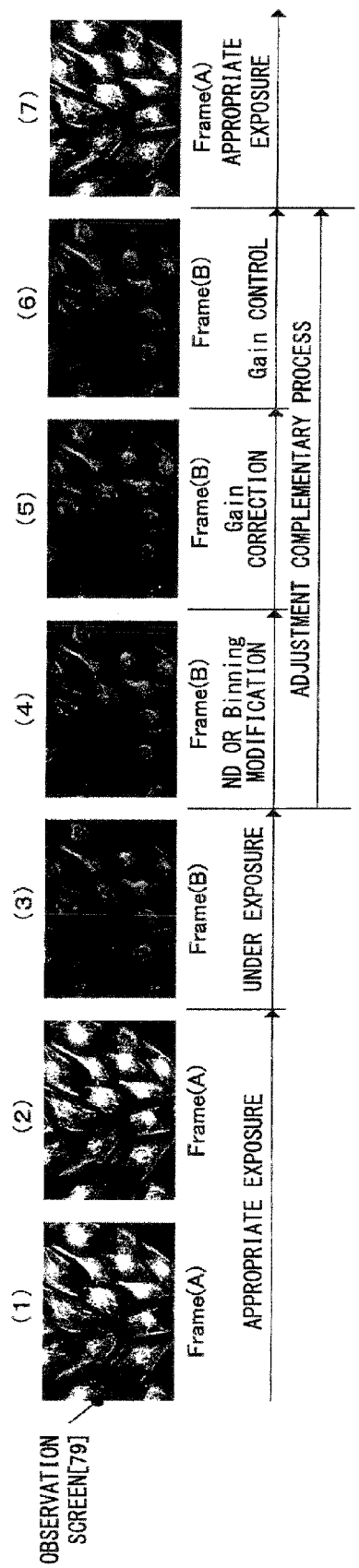

Thus, while exposure control is performed ((4) through (6) in FIG. 55C), the image [Frame(B)] in FIG. 55C continues to be displayed on the observation screen [79] of the display unit [46]. Then, a subsequently displayed image becomes an image in an optimum exposure state after control ((7) [Frame (A)] in FIG. 55C).

The above-described complementary process is also applied to the case where adjustment control of discontinuously changing exposure is performed (for example, [Zone-3], [Zone-6] and [Zone-8] shown in FIG. 17, [Zone-3'], [Zone-6'] and [Zone-8'] shown in FIG. 18 etc.). Alternatively, when the specimen is moving according to the movement of the stage [8], the adjustment complementary process can be applied.

Due to the function of the above-described preferred embodiment, even when performing adjustment in which the amount of light (amount of exposure adjustment) discontinuously changes, the brightness of the observation screen [79] does not remarkably change and an image having a good visibility can be always displayed.

The Fourteenth Preferred Embodiment

The configuration and function of this preferred embodiment are the same as those of the thirteenth preferred embodiment. In the thirteenth preferred embodiment, image data immediately prior to controlling the discontinuous adjustment parts is displayed on the display unit [46]. However, in this preferred embodiment, the displayed image differs from that in the thirteenth preferred embodiment.

In particular, when the frame rate is fast, sometimes image data to which a light measurement process is applied differs from actually stored data (image data to be displayed during control). Therefore, in this preferred embodiment, image data used in a light measurement process is stored in the display unit [46].

Figure 57:
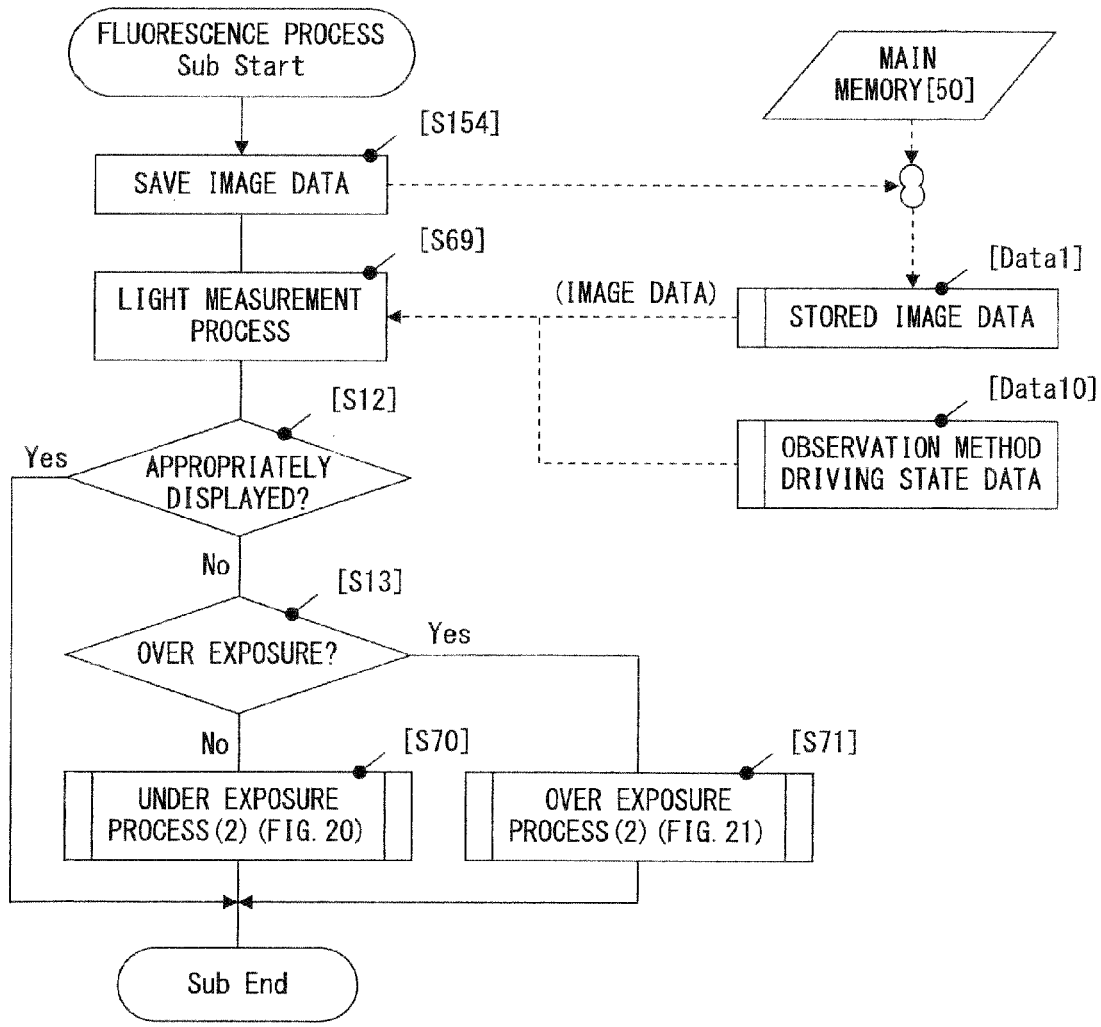
FIG. 57 is the flowchart of the process in the fourteenth preferred embodiment (overall flow).

For example, as shown in FIG. 57 (obtained by adding the configuration of this preferred embodiment to FIG. 17), in [S154], image data used for light measurement is stored in the maim memory [50], the HDD [49] or the like as stored image data [Data11]. The light measurement process [S69] is performed using this stored image data [Data11].

Then, a complementary process is performed as in the thirteenth preferred embodiment. The flow of the thirteenth preferred embodiment is shown in FIG. 58 (a variation of FIG. 56).

Figure 58:
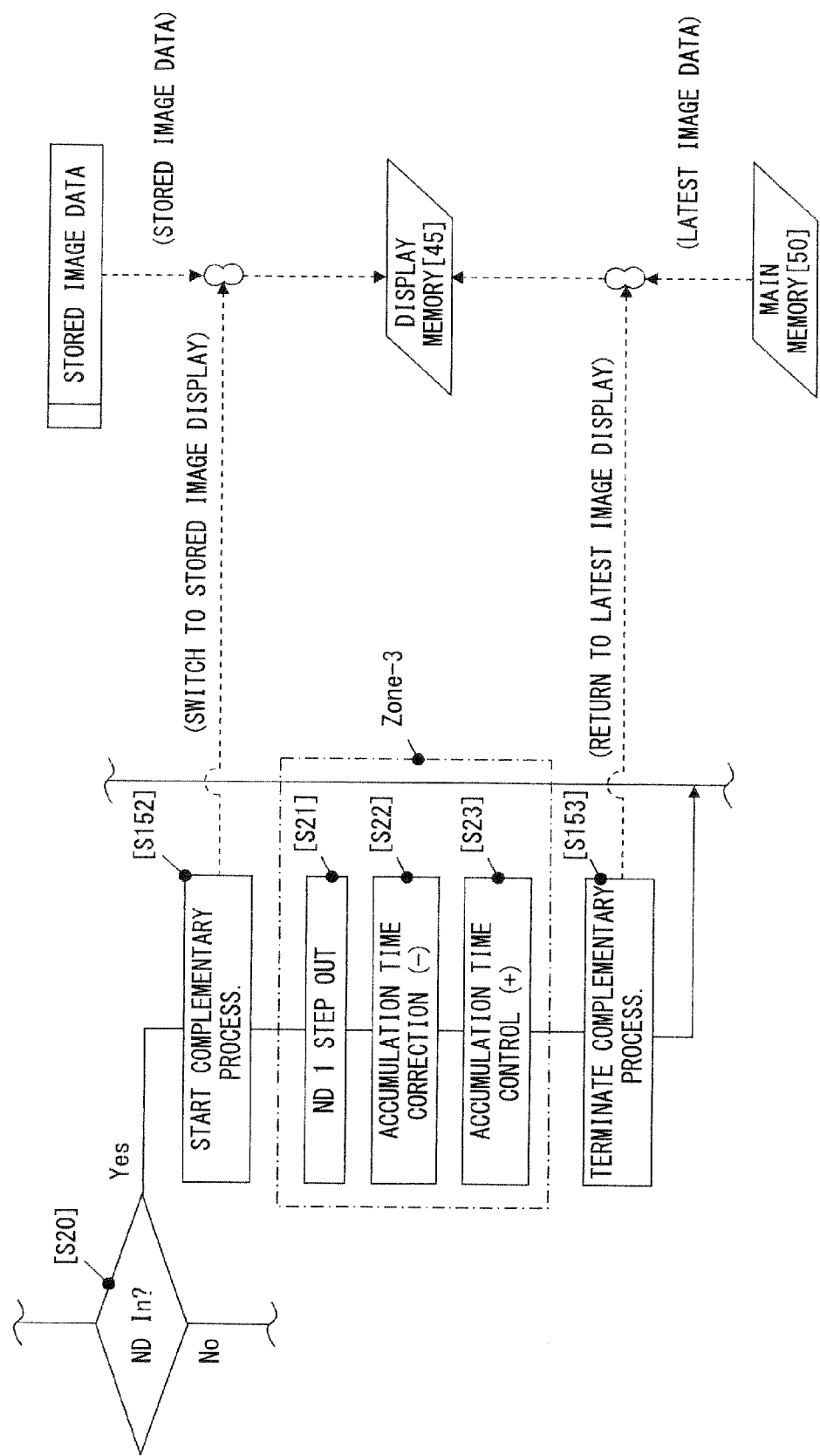
FIG. 58 is the flowchart of the process in the fourteenth preferred embodiment (complementary process control).

FIG. 58 is the flowchart of the process in the fourteenth preferred embodiment (complementary process control). At the start time of the complementary process [S152], data to be transferred to the display memory [45] is switched to the stored image data [Data11] saved at the time of light measurement. Then, when the complementary process is terminated [S153], it is restored to the latest regular image data in the main memory.

By the above-described process, the brightness change of an observation image can be suppressed further than that in the thirteenth preferred embodiment. Furthermore observation is possible in good visibility.

Besides, the present invention is not limited to the above-described preferred embodiments and it can be variously transformed in its application as long as its intention is not deviated.

The above-described preferred embodiments also include inventions in various steps and various inventions can be extracted from the appropriate combination of a plurality of disclosed components. For example, even when several components are removed from all the components shown in the preferred embodiments, the configuration from which these components are removed can be extracted as a new invention configuration as long as the effect described on the problems to be solved by the present invention is obtained.

Furthermore, each unit described as its component can also be transformed as long as its intention is not deviated. For example, the following variations are possible.

(1) As to the CCD [36], the circuit configuration and operation of an interline type CCD are described. However, various types of CCD, such as a frame inter-line type, a frame transfer type, can also be used. It is not only limited to a CCD, but CMOS and the like can be also used.

(2) AS to an ND filter, the amount of light is reduced by combining filters having different transmittances. In this case, naturally, the amount of light can also be reduced by a plurality of ND filters having the same transmittance. Also, ND filters whose transmittance can be continuously changed can also be used. For example, a filter whose light amount transmittance can be changed by evaporating ND having different transmittances in a disk shape and rotating the disk, is used. Although, in this preferred embodiment, an ND filter is classified as an adjustment part whose amount of light is discontinuously adjusted, it can be also used as an adjustment part whose amount of light can be continuously adjusted according to the above reason.

(3) Conversely, aperture has been described as a continuous adjustment part assuming diaphragm structure. However, for example, a component provided with a plurality of openings having different aperture diameters in a disk shape (turret shape) is rotated so that aperture can be discontinuously adjusted.

(4) The stage operation in the fifth preferred embodiment has been described as that of an XY stage. However, the stage operation of the XY stage can also be used in focus drive for focusing. The reference of moving speed in that case (display screen size in the fifth preferred embodiment) is the focal depth of an object lens.

(5) The system control unit [44] has been described as a PC. However, the system control unit [44] can also be comprised of a well-known CPU circuit or the like. In that case, the camera control unit [43], microscope control unit [34] and the like can also be collected into one.

(6) In the description of the preferred embodiments, an object lenses are attached to the nose-piece [10]. However, as magnification changing unit, a zoom lens whose magnification can be continuously changed or the like can also be used.

(7) As to an observation method, the switching between bright field observation and fluorescence observation is described. However, a plurality of other observation methods can also be prepared and can also be switched. In that case, as in the above-described preferred embodiment, priority is attached to exposure adjustment parts for each selected observation method and control can be performed by switching the priority for each observation method.

(8) The variations in the case where its several components are removed also include such conditional selection as no priority change, no exposure adjustment or the like at the time of observation method switching. For example, in the case of bright field observation, only a well-known exposure adjustment of camera (gain adjustment and accumulation time control) can be performed. In the case of fluorescence observation, priority can also be determined including the adjustment parts on the microscope side and exposure can be adjusted. Conversely, it is also within the scope of this invention that control by priority can also be performed only at the time of fluorescence observation and dark field observation and in other cases exposure can also be adjusted by a well-known adjustment unit and so on.

(9) As one observation method, the operation switching by the selection of an illumination system is also included in the variations. In that case, it is determined which is selected, the transmitted illumination light path [LP1] or the reflected illumination light path [LP2], and control is performed according to the priority of adjustments parts set for each light path at the time of exposure adjustment.

(10) The operation and the contents of a display screen can also be changed as long as the intention of the present invention is not deviated. For example, a stage can also be controlled by the drag operation of the mouse [59] and wheel rotation.

The microscope observation system of the above-disclosed preferred embodiment comprises a microscope (1-34) having an optical system for enlarging/observing a specimen, a camera unit (36) for photo-electrically converting a specimen image obtained by the microscope to an image signal, a light-amount adjustment unit (34) for controlling an adjustment part group (3, 6, 19 and 23) included in the microscope in order to suppress the amount of reflected light of the specimen image formed on the camera unit, an camera adjustment unit (43) for controlling the adjustment part groups of the camera unit in order to adjust the image signal photo-electrically converted by the camera unit to a desired state, a light measurement unit (43) for measuring the brightness of the specimen image on the basis of the image signal, a display unit (46) for displaying a captured image generated on the basis of the image signal, a control unit (44) for controlling the light measurement unit and the camera adjustment unit to control continuous display speed indicating a continuous display interval of images continuously displayed on the display unit and at least either one of the followings, an observation position shifting unit (8, 27 and 28) for modifying an observation position or for observation magnification of the specimen, or an observation state detection unit (66, 67 and 68) for detecting the observation position or for observation magnification.

According to the above-disclosed preferred embodiment, the control unit (44) can control the continuous display speed by controlling the light measurement unit and the camera adjustment unit in such a way that the lower limit of the continuous display speed Speed [L1] may become the lowest observable and operable display speed of the display unit.

According to the above-disclosed preferred embodiment, the control unit can also control the continuous display speed by controlling the light measurement unit and the camera adjustment unit in such away that the upper limit of the smallest interval of the continuous display speed may become a display interval by the maximum frame rate of the display unit.

According to the above-disclosed preferred embodiment, the control unit can also control the continuous display speed by controlling the light measurement unit and the camera adjustment unit in such a way that the shortest time until an image is converted to data displayable on the display unit after it is photo-electrically converted by the camera unit becomes the display interval based on the maximum frame rate.

According to the above-disclosed preferred embodiment, the control unit can also control the continuous display speed by specifying the upper limit of the continuous display speed using reading speed at which an image signal photo-electrically converted by the camera unit is read out as the reference and controlling the light measurement unit and the camera adjustment unit.

According to the above-disclosed preferred embodiment, the microscope observation system further comprises an external communication unit (681) for transmitting a image signal to which a prescribed imaging process is applied after being photo-electrically converted by the camera unit, and the control unit can also control the continuous display speed by specifying the upper limit of the continuous display speed on the basis of the maximum data transfer speed of the external communication unit and controlling the light measurement unit and the camera adjustment unit.

According to the above-disclosed preferred embodiment, the control unit can also control the continuous display speed by specifying the lowest observable and operable display speed of the display unit as the lower limit of the continuous display speed and the maximum frame rate of the display unit as the upper limit of the continuous display speed and controlling the light measurement unit and the camera adjustment unit.

According to the above-disclosed preferred embodiment, the control unit can also control the continuous display speed by specifying the lowest observable and operable display speed of the display unit as the lower limit of the continuous display speed and the maximum frame rate indicated as the upper limit of speed until an image is converted to data displayable on the display unit after it is photo-electrically converted by the camera unit as the upper limit of the continuous display speed and controlling the light measurement unit and the camera adjustment unit in such a way that the continuous display speed may enter a range between the lower limit and the upper limit.

According to the above-disclosed preferred embodiment, the control unit can also recognize the change of the movement of the specimen itself when the observation position shifting unit is not operating or the moving state is not detected by the observation state detection unit and stop controlling the continuous display speed when recognizing that the specimen is moving.

According to the above-disclosed preferred embodiment, the microscope observation system comprises two or more adjustment parts in total which are controlled by the light-amount adjustment unit and by the camera adjustment unit respectively, and the control unit can also control the continuous display speed by giving priority to the adjustment order of the adjustment parts and lowering the control priority of at least either one of the followings, adjustment part in which the resolution of a captured image to be adjusted changes or the adjustment part which affects the noise level of the photo-electrically converted electric signal.

The microscope observation system comprises two or more an adjustment parts in total which are controlled by the light-amount adjustment unit and by the camera adjustment unit respectively, and the control unit can also control the continuous display speed by giving priority to the adjustment order of the adjustment parts and lowering the control priority of an adjustment part in which the amount of light applied to the specimen tends to increase.

According to the above-disclosed preferred embodiment, the microscope observation system comprises two or more adjustment parts in total which are controlled by the light-amount adjustment unit and by the camera adjustment unit respectively, and the control unit can also control the continuous display speed by giving priority to the adjustment order of the adjustment parts and lowering the control priority of the adjustment part caused by increasing the interval of the continuous display speed.

According to the above-disclosed preferred embodiment, the microscope observation system further comprises an image recording unit (49) for recording images continuously displayed, and the control unit can control the continuous display speed by controlling the light measurement unit and the camera adjustment unit in such a way that the lower limit of the continuous display speed may become a video rate for recording images on the image recording unit.

According to the above-disclosed preferred embodiment, the specimen can be observed using two or more observation methods capable of observing specimens in different optical states using the above microscope, the microscope observation system comprises two or more adjustment parts in total which are controlled by the light-amount adjustment unit and by the camera adjustment unit respectively. Furthermore, priority of adjusting the adjustment parts according to the observation method is set in the microscope observation system and the microscope observation system further comprises an observation method switching unit (81, 92, 93 and 95) for switching between the observation methods.

According to the above-disclosed preferred embodiment, the control unit can also control the continuous display speed by the observation method switching unit.

According to the above-disclosed preferred embodiment, the control unit can also measure the signal noise level of the photo-electrically converted image signal, sets the reference value of such a signal noise level as to endure the observation of an observation image deteriorated by the signal noise, determines whether the measured noise level exceeds the reference value and control the continuous display speed on the basis of the determination result.

According to the above-disclosed preferred embodiment, when the type of the observation method is bright field observation, the control unit stops controlling the continuous display speed.

According to the above-disclosed preferred embodiment, when a transmitted illumination optical system is selected as an optical system state in the microscope, the control unit also stops controlling the continuous display speed.

According to the above-disclosed preferred embodiment, when the type of the observation method is fluorescence observation or dark field observation, the control unit also can control the continuous display speed.

According to the above-disclosed preferred embodiment, the microscope observation system further comprises an adjustment input unit (47) capable of inputting information about the adjustment of the adjustment parts controlled by the light-amount adjustment unit or the camera adjustment unit, in which the control unit can control the continuous display speed as to adjustment parts other than the adjustment parts adjusted by the adjustment input unit.

According to the above-disclosed preferred embodiment, when the shortest display interval time is not reached by controlling the continuous display speed by the light-amount adjustment unit or the camera adjustment unit, the control unit can accumulate n pieces of frame image data displayed n (n: arbitrary integer) frames prior to the target image data continuously displayed on the display unit, display the accumulated image data as the current display image and simultaneously control the continuous display speed.

According to the above-disclosed preferred embodiment, when the observation position shifting unit is operating or when the observation state detection unit determines that the unit is moving, the control unit can also temporarily change the adjustment priority among the adjustment parts.

According to the above-disclosed preferred embodiment, when the shortest display interval time is not reached by controlling the continuous display speed by the light-amount adjustment unit or the camera adjustment unit, the control unit can also restrict the shifting speed of the observation position shifting unit.

According to the above-disclosed preferred embodiment, even when the size of a display image to be displayed on the display unit is changed as a result of being controlled by the camera adjustment unit, the control unit can also maintain an image displayed on the display unit in a certain size.

According to the above-disclosed preferred embodiment, when, among all of the adjustment parts, adjustment parts in which the amount of light or an images discontinuously changes is adjusted, the control unit can apply an adjustment complementary process for continuing to display the image immediately prior to the adjustment until the adjustment is completed.

According to the above-disclosed preferred embodiment, the microscope observation system further comprises a storage unit (45) for storing the image immediately prior to the adjustment, and the control unit can stop continuous display on the display unit, control the adjustment parts in which the amount of light discontinuously changes, display the image data stored in the storage unit on the display unit until the control of the adjustment parts in which the amount of light discontinuously changes is completed and re-start the continuous display after the control of the adjustment parts in which the amount of light discontinuously changes is completed.

According to the above-disclosed preferred embodiment, when the specimen is being moved by the observation position moving unit, the control unit can also apply the prescribed adjustment complementary process.

According to the above-disclosed preferred embodiment, even when the specimen is being moved by the observation position moving unit and the adjustment parts in which the amount of light discontinuously changes need to be driven, the control unit can temporarily correct at the adjustment parts where the amount of light continuously changes, apply the adjustment complementary process for maintaining the brightness of a display image constant and control the continuous display speed when the movement of the specimen stops.

By the above-described present invention, an optimum observation image can be displayed according to the purpose of observation by controlling with giving priority to the control order of exposure adjustment parts for each observation method. Therefore, a microscope observation system having good operability and visibility can be provided.

By providing means for an observer to select a display mode in person depending on the operation purpose of the observer and the type of a specimen besides the display mode set according to an observation method, a microscope observation system having better operability can be provided. Thus, a wide variety of specimens can be observed, which leads to the throughput improvement to the research result of an observer accordingly.

Furthermore, during the microscope operation, by modifying the control priority of target adjustment parts in the exposure adjustment control process, the rapid bright change of an observation image displayed on the observation screen can be suppressed. Therefore, a display state can be maintained in good visibility. A smooth observation state can also be realized.

Furthermore, there is no need to take in data at higher speed than necessary. Therefore, the heat generation of the CCD [36] can be reduced. The life of the CCD [36] can be extended. By limiting stage moving speed by the display speed (update interval) of an observation image displayed on a display unit, an observation point is prevented from being missed, which is one of the secondary merits in the present invention.

Thus, a microscope observation system in which there is no need to be conscious of an individual device such as a microscope and a camera, and which is easy to use with for an observer unfamiliar to both units can be provided.

According to such a microscope observation system, the entire system (a microscope and an observation device) can be optimally controlled with giving priority to an observation image inputted to a camera. Namely, the microscope observation system of the present invention can throw away the observation concept in which an eyepiece lens is used. In other words, the microscope observation system of the present invention can draw the performance of a camera and a microscope at its maximum according to the observation usage of an observer.

Since even an observer is unfamiliar to the handling of both a microscope and a camera can easily display a desired observation image on a monitor in the microscope observation system of the present invention, thus its operability is good.

What is claimed is:

1. A microscope observation system, comprising:
    a microscope having an optical system for observing by magnifying a specimen;
    a camera unit for photo-electrically converting a specimen image obtained by the microscope to a image signal;
    a light-amount adjustment unit for controlling an adjustment part group included in the microscope in order to suppress the amount of reflected light of the specimen image formed on the camera unit;
    a camera adjustment unit for controlling the adjustment part group of the camera unit in order to adjust the image signal photo-electrically converted by the camera unit to a desired state;
    a light measurement unit for measuring the brightness of the specimen image on the basis of the image signal;
    a display unit for displaying a captured image generated on the basis of the image signal;
    a control unit for controlling the light measurement unit and the camera adjustment unit to control continuous display speed which indicates a continuous display interval of images continuously displayed on the display unit; and
    at least either one of the followings, an observation position shifting unit for shifting an observation position or for changing observation magnification of the specimen or an observation state detection unit for detecting the observation position or for observation magnification.

2. The microscope observation system according to claim 1, wherein
    the control unit controls the continuous display speed by controlling the light-amount adjustment unit and the camera adjustment unit in such a way that a lower limit of the continuous display speed may become minimum display speed at which the display unit can be observed and operated.

3. The microscope observation system according to claim 1, wherein
    the control unit controls the continuous display speed by controlling the light-amount adjustment unit and the camera adjustment unit in such a way that an upper limit of a minimum interval of the continuous display speed may become a display interval by the lowest frame rate of the display unit.

4. The microscope observation system according to claim 1, wherein
    the control unit controls the continuous display speed by controlling the light-amount adjustment unit and the camera adjustment unit in such a way that the shortest time until an image is converted to data displayable on the display unit after the image is photo-electrically converted by the camera unit may become a display interval by the maximum frame rate.

5. The microscope observation system according to claim 4, wherein
    the control unit controls the continuous display speed by controlling the light-amount adjustment unit and the camera adjustment unit, specifying a upper limit of the continuous display interval on the basis of reading speed at which an image is photo-electrically converted by the camera unit and is read as image signals.

6. The microscope observation system according to claim 4, further comprising an external communication unit for transmitting image signals to which a prescribed image processing is applied after the image signals are photo-electrically converted by the camera unit to the control unit, wherein the control unit controls the continuous display speed by controlling the light-amount adjustment unit and the camera adjustment unit, specifying an upper limit of the continuous display speed on the basis of the maximum data transfer speed of the external communication unit.

7. The microscope observation system according to claim 1, wherein the control unit controls the continuous display speed by specifying the lowest observable and operable display speed of the display unit as a lower limit of the continuous display speed, specifying the maximum frame rate of the display unit as an upper limit of the continuous display speed and controlling the light-amount adjustment unit and the camera adjustment unit in such a way that the continuous display speed may be within a range between the lower limit and the upper limit.

8. The microscope observation system according to claim 1, wherein the control unit controls the continuous display speed by specifying the lowest observable and operable display speed of the display unit as a lower limit of the continuous display speed, specifying the maximum frame rate shown from an upper limit of speed until an image is converted to data displayable on the display unit after the image is photo-electrically converted as an upper limit of the continuous display speed, and controlling the light-amount adjustment unit and the camera adjustment unit in such a way that the continuous display speed may be within a range between the lower limit and the upper limit.

9. The microscope observation system according to claim 1, wherein the control unit identifies a change of a movement of the specimen itself while the observation position shifting unit is not operating or while the observation state detection unit has determined that the specimen is not moving, and does not control the continuous display speed when it is recognized that the specimen is moving.

10. The microscope observation system according to claim 1, comprising two or more adjustment parts controlled by the light-amount adjustment unit and adjustment parts controlled by the camera adjustment unit in total, wherein the control unit sets priority to adjustment order of the adjustment parts, lowers control priority of at least one of the adjustment parts in which resolution of a captured image to be adjusted may change and the adjustment parts which may affect a noise level of photo-electrically converted electric signals and controls the continuous display speed.

11. The microscope observation system according to claim 10, which can observe images using two or more observation methods capable of observing specimens in different optical system states by the microscope, comprising:

two or more adjustment parts controlled by the light-amount adjustment unit or adjustment parts controlled by the camera adjustment unit in total and an observation method switching unit in which priority of adjusting the adjustment parts according to the observation method is set, for switching the observation methods.

12. The microscope observation system according to claim 11, wherein the continuous display speed is controlled according to the observation method switching unit.

13. The microscope observation system according to claim 12, wherein the control unit measures a signal noise level of the photo-electrically converted image signal, sets a reference value of a signal noise level at which an operator is endurable to observe an observation image deteriorated by the signal noise, determines whether a noise level measured by the measurement unit exceeds the reference value and controls the continuous display speed on the basis of the determination result.

14. The microscope observation system according to claim 13, wherein when a type of the observation method is bright field observation, the control unit does not control the continuous display speed.

15. The microscope observation system according to claim 14, wherein when a transmitted illumination optical system is selected as an optical system state in the microscope, the control unit does not control the continuous display speed.

16. The microscope observation system according to claim 13, wherein when a transmitted illumination optical system is selected as an optical system state in the microscope, the control unit does not control the continuous display speed.

17. The microscope observation system according to claim 12, wherein when a type of the observation method is bright field observation, the control unit does not control the continuous display speed.

18. The microscope observation system according to claim 17, wherein when a transmitted illumination optical system is selected as an optical system state in the microscope, the control unit does not control the continuous display speed.

19. The microscope observation system according to claim 12, wherein when a transmitted illumination optical system is selected as an optical system state in the microscope, the control unit does not control the continuous display speed.

20. The microscope observation system according to claim 12, wherein when a type of the observation method is fluorescence observation or dark field observation, the control unit does not control the continuous display speed.

21. The microscope observation system according to claim 11, wherein the control unit measures a signal noise level of the photo-electrically converted image signal, sets a reference value of a signal noise level at which an operator is endurable to observe an observation image deteriorated by the signal noise, determines whether a noise level measured by the measurement unit exceeds the reference value and controls the continuous display speed on the basis of the determination result.

22. The microscope observation system according to claim 21, wherein
when a type of the observation method is bright field observation, the control unit does not control the continuous display speed.

23. The microscope observation system according to claim 22 wherein
when a transmitted illumination optical system is selected as an optical system state in the microscope, the control unit does not control the continuous display speed.

24. The microscope observation system according to claim 21, wherein
when a transmitted illumination optical system is selected as an optical system state in the microscope, the control unit does not control the continuous display speed.

25. The microscope observation system according to claim 1, comprising
two or more adjustment parts controlled by the light-amount adjustment unit and adjustment parts controlled by the camera adjustment unit in total, wherein
the control unit sets priority to adjustment order of the adjustment parts, lowers control priority of the adjustment parts in which the amount of light inputted to the specimen tends to increase and controls the continuous display speed.

26. The microscope observation system according to claim 1, comprising
two or more adjustment parts controlled by the light-amount adjustment unit and adjustment parts controlled by the camera adjustment unit in total, wherein
the control unit sets priority to adjustment order of the adjustment parts, lowers control priority of the adjustment parts caused by prolonging an interval of the continuous display speed and controls the continuous display speed.

27. The microscope observation system according to claim 1, further comprising
an image recording unit for recording the continuously displayed images, wherein
the control unit controls the continuous display speed by controlling the light-amount adjustment unit and the camera adjustment unit in such a way that a lower limit of the continuous display speed may become a video rate of the image recording unit.

28. The microscope observation system according to claim 1, further comprising
an adjustment input unit capable of inputting information about adjustment of the adjustment parts controlled by the light-amount adjustment unit or the camera adjustment unit, wherein
the control unit controls the continuous display speed of adjustment parts other than the adjustment parts adjusted by the adjustment input unit.

29. The microscope observation system according to claim 1, wherein
if the continuous display speed does not reach the shortest display interval time even when the continuous display speed is controlled by the light-amount adjustment unit or the camera adjustment unit, the control unit accumulatively adds n pieces of frame image data of n frames prior images to the target image continuously displayed on the display unit and displays the added image data as a current display image, and simultaneously controls the continuous display speed.

30. The microscope observation system according to claim 1, wherein
when the observation position shifting unit is in operation or when the observation state detection unit has determined that the specimen is moving, the control unit temporarily modifies priority of adjustment order of the adjustment parts.

31. The microscope observation system according to claim 1, wherein
if the continuous display speed does not reach the shortest display interval time even when the continuous display speed by the light-amount adjustment unit or the camera adjustment unit is controlled, the control unit limits shifting speed of the observation position shifting unit.

32. The microscope observation system according to claim 1, wherein
even when a size of a display image to be displayed on the display unit changes as a result of being controlled by the camera adjustment unit, the control unit maintains an image displayed on the display unit in a certain size.

33. The microscope observation system according to claim 1, wherein
when adjustment in which the amount of light or an image discontinuously changes in the adjustment parts is performed, an adjustment complementary process for continuing to display an image immediately prior to the adjustment is performed until the adjustment is completed.

34. The microscope observation system according to claim 33, further comprising
a storage unit for storing an image immediately prior to the adjustment, wherein
the control unit stops continuous display on the display unit, controls the adjustment parts in which amount of light discontinuously changes, displays image data stored in the storage unit on the display unit until control of the adjustment parts in which amount of light discontinuously changes is completed and re-starts continuous display after control of the adjustment parts in which amount of light discontinuously changes is completed.

35. The microscope observation system according to claim 33, wherein
when the observation position shifting unit has determined that the specimen is moving, the control unit performs the adjustment complementary process.

36. The microscope observation system according to claim 35, wherein
the control unit performs the adjustment complementary process for maintaining the brightness of a display image by temporarily applying correction to adjustment parts for continuous changing even when the observation position shifting unit has determined that the specimen is moving and there occurs a need to control to drive the adjustment parts in which light-amount discontinuously changes and controls the continuous display speed when the movement of the specimen stops.

* * * * *